United States Patent
Novak et al.

(10) Patent No.: US 9,036,515 B2
(45) Date of Patent: May 19, 2015

(54) MULTIPLEXING SCHEMES FOR OFDMA

(75) Inventors: Robert Novak, Ottawa (CA); Hang Zhang, Nepean (CA); Sophie Vrzic, Nepean (CA); Mo-Han Fong, L'Orignal (CA); Kelvin Kar-Kin Au, Ottawa (CA); Jianglei Ma, Kanata (CA); Peiying Zhu, Kanata (CA); Wen Tong, Ottawa (CA)

(73) Assignee: APPLE INC., Cupertino, CA (US)

( * ) Notice: Subject to any disclaimer, the term of this patent is extended or adjusted under 35 U.S.C. 154(b) by 215 days.

(21) Appl. No.: 13/616,195

(22) Filed: Sep. 14, 2012

(65) Prior Publication Data

US 2013/0022020 A1 Jan. 24, 2013

Related U.S. Application Data

(62) Division of application No. 12/090,964, filed as application No. PCT/CA2006/001738 on Oct. 23, 2006, now abandoned.

(60) Provisional application No. 60/805,670, filed on Jun.

(Continued)

(51) Int. Cl.
*H04L 1/00* (2006.01)
*H04L 5/00* (2006.01)
(Continued)

(52) U.S. Cl.
CPC ............ *H04L 1/0067* (2013.01); *H04L 1/0013* (2013.01); *H04L 5/0064* (2013.01); *H04L 1/14* (2013.01); *H04L 1/1614* (2013.01);
(Continued)

(58) Field of Classification Search
CPC .. H04L 1/0067; H04L 1/0013; H04L 27/2676

USPC .................................. 370/473, 476–478, 482
See application file for complete search history.

(56) References Cited

U.S. PATENT DOCUMENTS 5,297,143 A 3/1994 Fridrich et al.
5,513,176 A 4/1996 Dean et al.
(Continued)

FOREIGN PATENT DOCUMENTS

| WO | 01/08294 | 2/2001 |
| WO | 03/077499 | 9/2003 |
| WO | 2005/088886 | 9/2005 |

OTHER PUBLICATIONS

Supplementary European Search Report for corresponding European Patent Application No. 06790884, issued on Jan. 21, 2013, 9 pages.

(Continued)

*Primary Examiner* — Redentor Pasia
(74) *Attorney, Agent, or Firm* — Fay Kaplun & Marcin, LLP

(57) ABSTRACT

Methods and systems are provided for allocating resources including VoIP (voice over Internet Protocol) and Non-VoIP resources. In some embodiments, multiplexing schemes are provided for use with OFDMA (orthogonal frequency division multiplexing access) systems, for example for use in transmitting VoIP traffic. In some embodiments, various HARQ (Hybrid Automatic request) techniques are provided for use with OFDMA systems. In various embodiments, there are provided methods and systems for dealing with issues such as Handling non-full rate vocoder frames, VoIP packet jitter handling, VoIP capacity increasing schemes, persistent and non-persistent assignment of resources in OFDMA systems.

17 Claims, 24 Drawing Sheets

Related U.S. Application Data 23, 2006, provisional application No. 60/820,683, filed on Jul. 28, 2006, provisional application No. 60/822,018, filed on Aug. 10, 2006, provisional application No. 60/824,848, filed on Sep. 7, 2006, provisional application No. 60/825,360, filed on Sep. 12, 2006, provisional application No. 60/828,312, filed on Oct. 5, 2006, provisional application No. 60/728,848, filed on Oct. 21, 2005, provisional application No. 60/820,705, filed on Jul. 28, 2006, provisional application No. 60/758,743, filed on Jan. 13, 2006, provisional application No. 60/829,426, filed on Oct. 12, 2006.

(51) Int. Cl.
*H04L 1/14* (2006.01)
*H04L 1/16* (2006.01)
*H04L 1/18* (2006.01)
*H04L 29/06* (2006.01)

(52) U.S. Cl.
CPC .............. *H04L1/1867* (2013.01); *H04L 5/0007* (2013.01); *H04L 5/0037* (2013.01); *H04L 5/0042* (2013.01); *H04L 5/0046* (2013.01); *H04L 29/06027* (2013.01); *H04L 2001/0093* (2013.01); *H04L 65/607* (2013.01); *H04L 65/80* (2013.01)

(56) References Cited

U.S. PATENT DOCUMENTS

| | | | |
|---|---|---|---|
| 5,832,437 | A | 11/1998 | Nishiguchi et al. |
| 6,363,425 | B1 * | 3/2002 | Hook et al. ............ 709/226 |
| 6,697,331 | B1 | 2/2004 | Riihinen et al. |
| 7,613,242 | B2 | 11/2009 | Bykovnikov |
| 2002/0154612 | A1 | 10/2002 | Massie et al. |
| 2003/0189918 | A1 | 10/2003 | Das et al. |
| 2004/0081195 | A1 * | 4/2004 | El-Maleh et al. ......... 370/465 |
| 2005/0070293 | A1 | 3/2005 | Tsukiji et al. |
| 2005/0107036 | A1 | 5/2005 | Song et al. |
| 2005/0226173 | A1 * | 10/2005 | Strawczynski et al. ....... 370/278 |
| 2006/0072533 | A1 | 4/2006 | Smee et al. |
| 2007/0076784 | A1 | 4/2007 | Zhou et al. |
| 2007/0230412 | A1 * | 10/2007 | McBeath et al. ............ 370/338 |
| 2007/0242653 | A1 * | 10/2007 | Yang et al. ............ 370/342 |

OTHER PUBLICATIONS

O'Neill et al.; "Multicarrier TDD Systems Using Channel State Feedback Information;" Vehicular Technology Conference, May 1997, vol. 3; pp. 1822-1826.

International Search Report in related Application No. PCT/CA2006/001738, Feb. 15, 2007, pp. 3-4.

\* cited by examiner

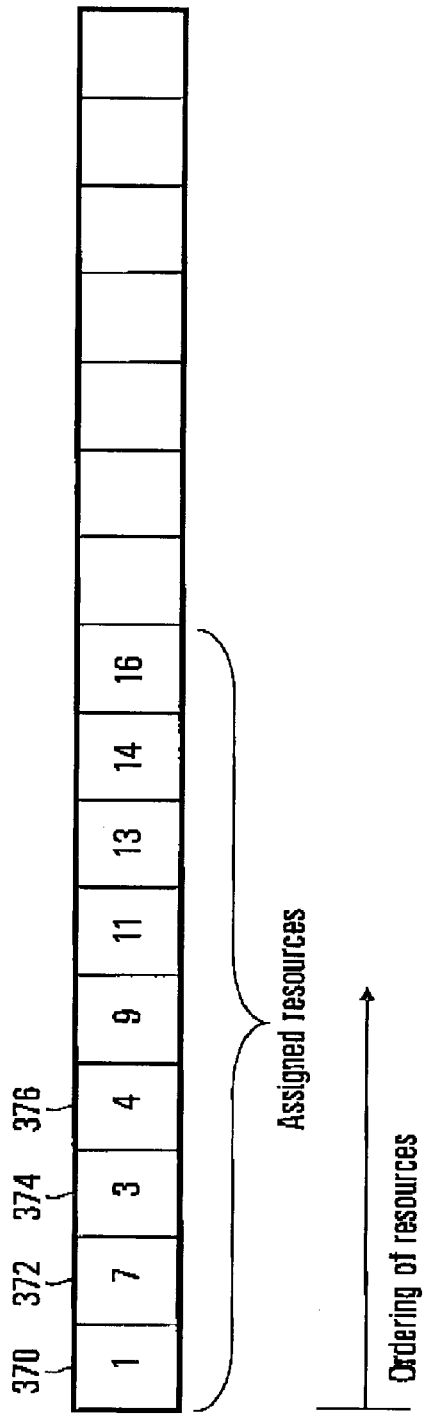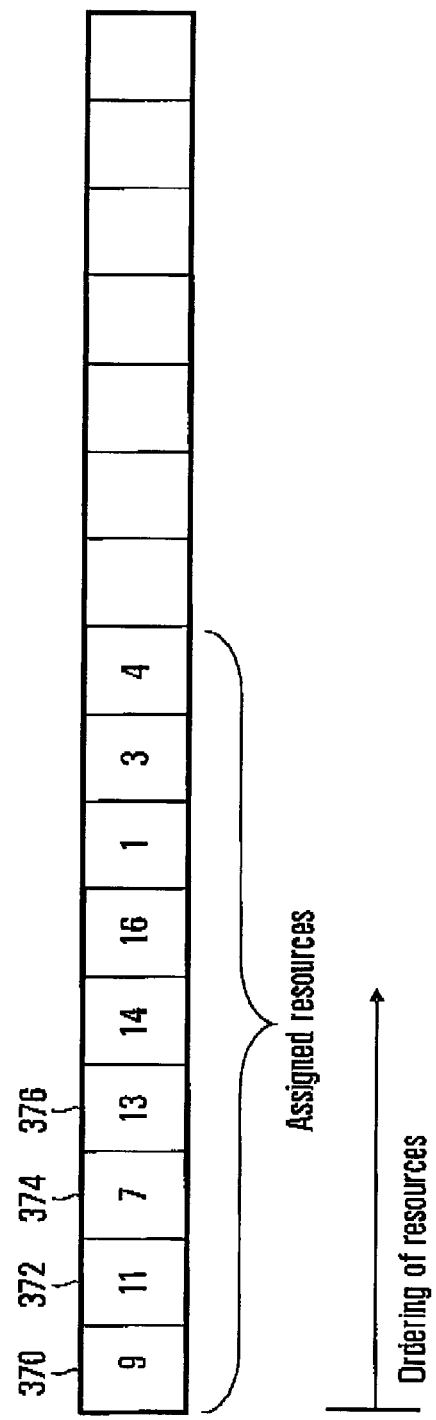
FIG. 12
FIG. 13

| 1 | 9 | 13 | 14 | 3 | 7 | 11 | 4 | 16 |

Assigned resources

Ordering of resources

FIG. 14

| 1 | 9 | 13 | 14 | 3 | 7 | 11 | 4 | 16 |

Assigned resources

Ordering of resources

FIG. 15

Primary Assignment
Transmission #
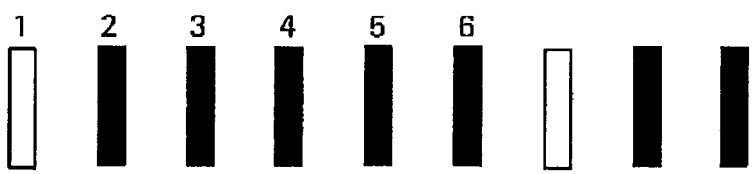
Secondary Assignment
Transmission #
New packet #2
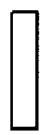 = persistent assignment
FIG. 19

Bitmap (may be equal to number of users, K, in group)

| 1 | 0 | 1 | 1 | 0 | 0 | 1 | 1 | 0 | 0 |
|---|---|---|---|---|---|---|---|---|---|

FIG. 22

| VoIP_IE{ | |
|---|---|
| Extended-2 DIUC | 4 (use different DIUC to differenciate MIMO or non- MIMO) |
| Length | 4 |
| VoIP_Group_ID | 4 |
| Traffic_Indication bitmap | 8 |
| For each "1" in the bitmap { | |
| Packet Size | 2 (VoIP packet MAP PDU shall be small) |
| VoIP_DIUC | 3 (8 DIUC, combined repetition) |
| ACID | 2 (up to 4 ARQ Channels) |
| AI_SN | 1 |
| } | |
| } | |

FIG. 23

| VoIP allocation in a frame | 8 | 16 | 32 |
|---|---|---|---|
| 802.16e | 14 | 22 | 37 |
| New IE (Fully dynamic) | 7 | 7 | 15 |
| New IE (hybrid) (~30% overhead reduction assumed) | 5 | 5 | 11 |

| First Tx | Fully Synchronized | | | Fully Asynchronized | |
|---|---|---|---|---|---|
| | First Tx | Retx | First Tx | | Retx |
| Scenario 1:<br>First tx: 36<br>Second tx: 10<br>Third tx: 4 | Num of assign: 7<br>For each assign:<br>Node ID: 8<br>User ID: 10<br>MCS: 3<br>Total: 36x21+7=763 | 0 | Num of assign: 7<br>For each assign:<br>Num of BAU: 7<br>User ID: 10<br>MCS: 3<br>H-ARQ info: 3<br>Total<br>=36x23+7=835 | | Num of assign: 7<br>For each assign:<br>Num of BAU: 7<br>User ID: 10<br>MCS: 3<br>H-ARQ info: 3<br>Total<br>=14x23+7=329 |
| | Estimated:<br>763x130%=992 | | Total: 1164 | | |
| | Total: 992 | | | | |
| Scenario 2:<br>First tx: 27<br>Second tx: 13<br>Third tx: 6<br>Fourth tx: 3<br>Fifth tx: 1 | Num of assign: 7<br>For each assign:<br>Node ID: 8<br>User ID: 10<br>MCS: 3<br>Total: 27x21+7=574 | 0 | Num of assign: 7<br>For each assign:<br>Num of BAU: 7<br>User ID: 10<br>MCS: 3<br>H-ARQ info: 3<br>Total<br>=27x23+7=628 | | Num of assign: 7<br>For each assign:<br>Num of BAU: 7<br>User ID: 10<br>MCS: 3<br>H-ARQ info: 3<br>Total<br>=23x23+7=536 |
| | Estimated:<br>574x130%=746 | | | | |
| | Total: 746 | | Total: 1164 | | |

| Hybrid | | | | |
|---|---|---|---|---|
| Method 1 - User ID | | | Method 2 - ACK/NACK Echo | |
| First Tx | Retx | | First Tx | Retx |
| Num of first Tx: 7<br>For each assign:<br>Num of BAU: 7<br>User ID: 10<br>MCS: 3<br>Total: 35x20+7=727 | Num of second Tx: 7<br>For each second Tx:<br>User ID: 10<br>Num of third Tx: 7<br>For each third Tx:<br>User ID: 10<br>Total:<br>7x2+14x10=154 | | Num of first Tx: 7<br>For each assign:<br>Num of BAU: 7<br>User ID: 10<br>MCS: 3<br>Total: 7+36x20=727 | Num of second Tx: 7<br>For each second Tx:<br>Bitmap: 36<br>Num of third Tx: 7<br>For each third Tx:<br>Bitmap: 10<br>Total:<br>7x2+36x10=60 |
| Total: 881 (89% of that of full synch;<br>76% of that of full asynch) | | | Total: 787 (79% of that of full synch; 68% of that<br>of full asynch; 76% of that of method 1 of hybrid) | |
| Num of first Tx: 7<br>For each first assign:<br>Num of BAU: 7<br>User ID: 10<br>MCS: 3<br>Total: 27x20+7=547 | Num of second Tx: 7<br>For each second Tx:<br>User ID: 10<br>Num of third Tx: 7<br>For each third Tx:<br>User ID: 10<br>Num of fourth Tx: 7<br>For each fourth Tx:<br>User ID: 10<br>Num of fifth Tx: 7<br>For each fifth Tx:<br>User ID: 10<br>Total:<br>7x4+23x10=258 | | Num of first Tx: 7<br>For each first assign:<br>Num of BAU: 7<br>User ID: 10<br>MCS: 3<br>Total: 27x17+7=547 | Num of second Tx: 7<br>Bitmap: 27<br>Num of third Tx: 7<br>Bitmap: 13<br>Num of fourth Tx: 7<br>Bitmap: 6<br>Num of fifth Tx: 7<br>Bitmap: 3<br>Total:<br>27+13+6+3+7x4=77 |
| Total: 805 (108% of that of full synch;<br>69% of that of full asynch) | | | Total: 624 (84% of that of full synch; 54% of that<br>of full asynch; 77% of that of method 1 of hybrid) | |

FIG. 27B

MULTIPLEXING SCHEMES FOR OFDMA

PRIORITY CLAIM

This application is a divisional of U.S. patent application Ser. No. 12/090,964, filed on Oct. 6, 2008, which is a National Phase Entry of PCT Application No. PCT/CA2006/001738 filed Oct. 23, 2006, which claims the benefit of prior U.S. Provisional Application Nos.
60/805,670 filed Jun. 23, 2006,
60/820,683 filed Jul. 28, 2006,
60/822,018 filed Aug. 10, 2006,
60/824,848 filed Sep. 7, 2006,
60/825,360 filed Sep. 12, 2006,
60/828,312, filed Oct. 5, 2006
60/728,848 filed Oct. 21, 2005,
60/820,705 filed Jul. 28, 2006,
60/758,743 filed Jan. 13, 2006, and
60/829,426 filed Oct. 12, 2006, which are all incorporated herein by reference, as if set forth fully and completely herein.

FIELD OF THE INVENTION

The invention relates to multiplexing schemes for use with OFDMA (orthogonal frequency division multiplexing access) systems, for example for use in transmitting VoIP (voice over Internet Protocol) traffic.

BACKGROUND OF THE INVENTION

There are several proposals to 3GPP2 for OFDMA VoIP implementations, one of which defines numerology such that an OFDMA resource consisting of a set of 340 sub-carriers in frequency over OFDM symbol durations in time is divided into 20 ms VoIP frames, each containing 24 slots, each slot containing 10 OFDM symbols. The resources of each slot are further subdivided into distributed resource channels (DRCH), each comprising 81 subcarrier locations distributed across the 10 symbols of a slot for a total of 40 DRCHs per slot allowing for pilots and other overhead that might be present.

Transmission for a given user occurs at different rates or frame sizes. For example, the EVRC (Enhanced Variable Rate Codec) codec generates voice frames with four different rates or frame sizes: full, ½, ¼ and ⅛ with probabilities of 29%, 4%, 7% and 60% respectively. The particular rate is typically determined as a function of a voice activity factor.

For a given user, a single packet is nominally expected to be delivered within one VoIP frame. Current definitions allow for an initial attempt to deliver the packet and three subsequent attempts. Any attempt, including the initial or subsequent, is referred to herein as a sub-packet.

A few variations of H-ARQ transmission/operation schemes exist. One variation is unicast H-ARQ in which each encoded packet includes data from one user. This can be fully asynchronous in which case the modulation and code rate (MCS (modulation and coding scheme), transmission time (slot/frame) and resource allocation are independent for each transmission of an encoded packet (first and all re-transmissions). Assignment signalling is used to describe the resource allocation, MCS and user IDs for each transmission and re-transmission. While this approach allows adaptation to real time channel conditions, it incurs large signalling overhead. Unicast H-ARQ can alternatively be fully synchronous. In this case, the MCS scheme for transmissions (first and all retransmissions) is the same, resource allocation (location) remains the same for first and all retransmissions (the transmission location must be the same as the first transmission). The transmission interval is fixed, and assignment signalling is required only for the first transmission. This enables lower signalling overhead for retransmission, but can cause significant scheduling complexity and signalling overhead for the first transmission due to the irregular vacancies of resources that occurs since some resources need to be reserved for retransmissions that may not be necessary.

Another H-ARQ variant is multicast H-ARQ in which each encoded packet includes data for multiple users. The worst CQIs (channel quality indicators) among multiple users are considered for selecting MCS. The entire packet is retransmitted if one or more users could not decode it successfully, even though some of the users may have successfully decoded the packet. Multi-cast H-ARQ can be implemented using fully asynchronous and fully synchronous schemes.

SUMMARY OF THE INVENTION

According to a first aspect of the invention, there is provided a method comprising: transmitting full rate vocoder frames using an amount of OFDM time/frequency resource; for at least one non-full rate vocoder frame, transmitting a first sub-packet transmission of each non-full rate vocoder frame using the same amount of OFDM time/frequency resource as used for full rate vocoder frames; matching vocoder frame size to the amount of OFDMA time/frequency resource by employing an increased coding rate (compared to the full rate frame) and/or repetition factor.

In some embodiments the method further comprises using resources freed up due to a higher probability of success for first sub-packet transmission of non-full rate frames for allocation to other wireless stations.

In some embodiments the different coding rate and/or repetition factor used for full rate, and non-full rate are predetermined and known to a wireless station.

In some embodiments the method is applied for downlink transmission from a base station to a plurality of wireless stations, the method further comprising: at least one wireless station using blind rate detection to detect an actual frame rate transmitted by the base station.

In some embodiments the at least one non-full rate comprises rates ½ and ¼.

According to a second aspect of the invention, there is provided a method comprising: persistently allocating an OFDM transmission resource to a wireless station; blanking a minimum rate sub-packet within the persistently allocated OFDM transmission resource; and using the unused retransmission resource for allocation to other wireless stations.

In some embodiments the method is applied for downlink transmission from a base station to a plurality of wireless stations, the method further comprising: the base station receiving a NAK from the wireless station in response to blanking the sub-packet; the base station echoing receipt of the NAK with an ACK to indicate no resource is being assigned for retransmission.

In some embodiments echoing receipt of the NAK with an ACK to indicate no resource is being assigned for retransmission to that wireless station comprises transmitting an ACK-NAK-echo bitmap indicating ACK/NAK status.

In some embodiments the method further comprises transmitting keep-alive reduced rate frames.

In some embodiments the method further comprises: using a same amount of frequency/time resource for the minimum rate frames as for full rate frames so as to increase probability of successful transmission, and using freed up retransmission resources for allocation to other wireless stations.

In some embodiments the minimum rate is ⅛ rate.

According to a third aspect of the invention, there is provided a method of transmitting sub-packets within VoIP frames comprising: persistently allocating a resource to a wireless station while there are non-blanked sub-packets to send/receive to/from that wireless station; when there are no non-blanked sub-packets to send/receive for a given wireless station, re-assigning the unused resource to other wireless stations, or a different data stream for the same wireless station, in a non-persistent manner.

In some embodiments the resource assignment is identified by specific resource/channel/node index or OFDMA sub-carrier and symbol indices.

In some embodiments the method is applied for downlink transmission from a base station to a plurality of wireless stations, the method further comprising: an original wireless station with a persistent allocation of the blanked transmission decoding the sub-packet transmitted on its persistent resource allocation, and if successfully decoded using a layer 2 protocol to detect a mismatch on a user ID and discarding the sub-packet; the base station ignoring any HARQ ACK/NAK received from the original wireless station with the persistent allocation.

In some embodiments the method further comprises: if the wireless station with the non-persistent allocation occupying the unused persistent resource does not require HARQ retransmission, at the retransmission slot, the transmitter sending an ACK indication to indicate there is no resource assigned to the wireless station with the persistent allocation for HARQ transmission; using an unused retransmission resource for other wireless stations.

In some embodiments sending an ACK indication comprises setting a corresponding bit in a ACK-NAK-echo bitmap to 'ACK'.

In some embodiments the method is applied for downlink transmission from a base station to a plurality of wireless stations, the method further comprising, if the wireless station with the non-persistent allocation occupying the unused persistent resource requires HARQ retransmission: retransmitting the sub-packet for the wireless station with the non-persistent allocation using a different resource than the previous sub-packet, and explicitly signalling the new resource; the transmitter sending an ACK indication in respect of the persistently allocated resource; reallocating the unused persistently allocated resource for other wireless stations.

In some embodiments the method is applied for downlink transmission from a base station to a plurality of wireless stations, the method further comprising, if the wireless station with the non-persistently allocated resource occupying the unused persistent resource requires HARQ retransmission: retransmitting the sub-packet for the wireless station with the non-persistently allocated resource using the same resource as the previous sub-packet without using any explicit signalling for the retransmission; the transmitter setting an ACK indicator to 'NAK' to indicate that a resource assigned to the wireless station with the persistent allocation is being used for retransmission.

According to a fourth aspect of the invention, there is provided a method of transmitting OFDM signals containing sub-packets within frames comprising: if there is no packet for a given wireless station at a frame boundary, blanking a persistent allocation for that wireless station; allocating blanked resources to other wireless stations.

In some embodiments the frames are VoIP frames and a frame boundary is a VoIP frame boundary.

In some embodiments the method further comprises delivering a packet that arrives after the VoIP frame boundary by: transmitting a sub-packet for the packet in a lower MCS format intended for a reduced number of retransmission trials.

In some embodiments the method further comprises delaying packets arriving after a predefined number of retransmission slots until the next VoIP frame.

In some embodiments the method further comprises delivering a packet that arrives after the VoIP frame boundary by: delaying the packet transmission until the next VoIP frame; combining delayed and current VoIP packets into a composite packet.

In some embodiments the method further comprises: supplementing a persistent allocation with additional non-persistent resources for the next VoIP frame.

In some embodiments the method further comprises transmitting the composite packet using assigned persistent resources by changing the MCS accordingly.

In some embodiments the method further comprises using the "missed frame" to trigger blind detection of MCS for the composite packet in the next frame.

In some embodiments the method further comprises delivering a packet that arrives after the VoIP frame boundary by: delaying the packet transmission until resources become available; continuing to send packets in sequence without combining multiple voice packets into composite packets; emptying a layer 2 buffer during blanked transmission times.

In some embodiments the method further comprises a base station adding a 'de-jitter' delay to every VoIP packet that arrives at the layer 2 buffer such that the probability of a packet available at every VoIP frame boundary is above a predefined threshold.

According to a fifth aspect of the invention, there is provided a method of transmitting sub-packets within frames comprising: transmitting frames using OFDM, each frame occupying a plurality of OFDM symbols; allocating first sub-packet transmission for a set of wireless stations in a staggered manner throughout a frame.

In some embodiments the frames are VoIP frames and a frame boundary is a VoIP frame boundary.

In some embodiments each VoIP frame is comprised of a plurality of slots each containing a respective plurality of OFDM symbols and wherein allocating first sub-packet transmission for a set of wireless stations in a staggered manner throughout a VoIP frame comprises allocating first sub-packet transmission on an approximately statistically equal basis across slots of the VoIP frame.

According to a sixth aspect of the invention, there is provided a method of transmitting sub-packets within frames comprising: transmitting frames using OFDM, each occupying a plurality of OFDM symbols; dividing wireless stations into a plurality of different classes, each class having a respective different number of maximum HARQ retransmissions such that wireless stations with more reliable CQI estimates are grouped together and allowed fewer re-transmissions; transmitting the frames containing first sub-packets and retransmission sub-packets subject to the maximum number of HARQ retransmissions for each wireless station.

In some embodiments the frames are VoIP frames and a frame boundary is a VoIP frame boundary.

In some embodiments the method further comprises: if a packet fails after a reduced number of transmissions, the wireless station sending a NAK: if that wireless station is intended to have only the reduced number of transmissions the transmitter sets an ACK indicator to 'ACK' to indicate no further resource is being allocated for the remainder of the frame such that it is not necessary to signal to each wireless station what class the wireless station belongs to.

According to a seventh aspect of the invention, there is provided a method of transmitting sub-packets within frames comprising: transmitting frames using OFDM, each frame occupying a plurality of OFDM symbols; for some wireless stations, allocating resources over multiples of nominal frames; for wireless stations being allocated resources over multiples of nominal frames, combining multiple packets into composite packets, and allocating these composite packets with a larger number of retransmissions for improved reliability.

According to an eighth aspect of the invention, there is provided a method comprising: transmitting frames using OFDM, each frame occupying a plurality of OFDM symbols; for some wireless stations, allocating resources over multiples of nominal frames; for some wireless stations, transmitting an original sub-packet for a first packet during a first frame, with retransmission sub-packets following as necessary; transmitting a next original sub-packet for another packet for that wireless station immediately, possibly during the first frame, following the successful reception of the first packet, with retransmissions as necessary which may cross a frame boundary.

In some embodiments the frames are VoIP frames.

According to a ninth aspect of the invention, there is provided a method of transmitting sub-packets within frames comprising: transmitting frames using OFDM, each frame occupying a plurality of OFDM symbols; transmitting to each wireless station with a respective resource allocation size, and a respective MCS; implicitly indicating MCS to each receiver by employing a unique mapping of MCS to resource allocation size.

In some embodiments the frames are VoIP frames.

In some embodiments the following MCS to resource allocation size mapping is employed:
QPSK, code rate ⅓—first resource allocation size;
QPSK, code rate ⅔—second resource allocation size;
16 QAM, code rate ⅔—third resource allocation size.

According to a tenth aspect of the invention, there is provided a method comprising: for nominal operating conditions, transmitting an ACK-NAK-echo bitmap or any type of ACK/NAK echo echoing the NAK(s) or ACK(s) sent by one or more wireless stations; in some instances, transmitting the ACK-NAK-echo bitmap with an ACK to echo a NAK transmitted by the wireless station, or with an NAK to echo an ACK transmitted by the wireless station for the purpose of signalling something to the wireless station.

According to an eleventh aspect of the invention, there is provided a method of performing resource assignment comprising: sending a bitmap (or other signalling) containing a respective location for each of a plurality of wireless stations, with each wireless station's relative position in the bitmap (or other signalling) being associated with some OFDM resource allocation; wherein a value at a position in the bitmap (or other signalling), indicates whether or not a resource has been assigned to the receiver associated with that bitmap (or other signalling) position.

In some embodiments for at least some wireless stations, the bitmap (or other signalling) allows each wireless station that has been assigned a non-persistent resource to derive what resource has been non-persistently assigned.

In some embodiments a persistent allocation is used for a first transmission for each wireless station.

In some embodiments the relative wireless station' positions in the bitmap (or other signalling) are also associated with a group of wireless stations, such that wireless stations belonging to a specific group can be uniquely identified by their position in the bitmap (or other signalling).

In some embodiments the wireless stations of a given group include wireless stations that have their first HARQ sub-packet transmission occurring in the same slot within a HARQ interlace.

In some embodiments the method further comprises transmitting multiple bitmaps (or other signalling), and assigning wireless stations to a common bitmap (or other signalling) on the basis of commonality among factors such as long-term channel condition, modulation and coding scheme (MCS), resource allocation size, etc.

In some embodiments the bitmap (or other signalling) positions for different wireless stations in the same group are separated by the total of possible start points for a given HARQ interlace.

In some embodiments the bitmap (or other signalling) positions for different wireless stations in the same group are separated by a total number of transmissions allowed per sub-packet.

In some embodiments the bitmap is used to indicate non-persistent assignments.

In some embodiments the method comprises at a transmitter or other element where allocation is being performed: creating the bitmap (or other signalling) indicating which wireless station will be assigned resources in the an allocation period; the bitmap (or other signalling) is processed by starting at the position of the first wireless station of a first group of wireless stations; if indicated by the bitmap (or other signalling), the first resource is allocated to this wireless station whereas if the bitmap (or other signalling) does not indicate a resource allocation to the wireless station, the resource is available to be assigned to the next wireless station; the next position processes is that of the second wireless station belonging to the first group of wireless stations; if the first resource was assigned via the bitmap (or other signalling) in the previous step, the next resource (second) is assigned to this wireless station whereas if resources were not assigned to the first wireless station, then the second wireless station is assigned the first resource; each wireless station from the first group of wireless stations is assigned resources in this manner.

In some embodiments the method further comprises adding further groups of wireless stations to the bitmap (or other signalling), each further group being assigned resources in the manner as the first with those wireless stations assigned resources will occupy the "next" resources after the last assigned resources, this process continuing until all wireless stations from all groups have been processed.

In some embodiments the method further comprises: defining each group of wireless stations to be a group of wireless stations that have their first HARQ sub-packet transmission during a same scheduling period; wherein the first group of wireless stations consists of wireless stations in a group of wireless stations that is receiving its first HARQ sub-packet transmission in the current scheduling period.

In some embodiments the method further comprises: defining a first group of wireless stations each of which is to be allocated a respective persistent resource; using the bitmap (or other signalling) to indicate for each wireless station of the first group of wireless stations whether or not a sub-packet is to be transmitted to them on their persistent resource; re-assigning persistent resources that are not used by the first to other wireless stations.

In some embodiments the first group is a different group for each scheduling period.

In some embodiments the first group for each scheduling period is each a group of wireless stations that have their first HARQ sub-packet transmission during that scheduling period.

In some embodiments the method further comprises: for each wireless station receiving a resource allocation according to the bitmap (or other signalling), transmitting at least one resource allocation parameter.

In some embodiments at least one resource allocation parameters comprises at least one of:
resource start position;
modulation and coding scheme;
MIMO mode indication;
size indication;
ARQ channel identifier.

In some embodiments the method further comprises: grouping wireless stations with roughly the same arriving time, and/or similar channel conditions, and/or same or similar MCS in a common bitmap (or other signalling), identified collectively by a Group_ID.

In some embodiments the method further comprises: using a respective signalling channel containing resource assignments to each of a plurality of groups of wireless stations, the groups of wireless stations being grouped according to common distance from the transmitter and/or channel conditions.

In some embodiments the method further comprises: signalling resource allocations for HARQ retransmissions in the same manner as original transmissions.

In some embodiments the method further comprises: defining at least one group VoIP wireless stations, and one or more groups are for non-VoIP wireless stations.

In some embodiments the method further comprises: using a first set of MCS for VoIP wireless stations, and a second set of MCS for non-VoIP wireless stations.

In some embodiments the method further comprises: transmitting a second bitmap (or other signalling) with a respective entry for each wireless station assigned resources by the first bitmap to indicate if the transmission is an original sub-packet or a re-transmission sub-packet.

In some embodiments the method further comprises: scheduling resource allocations with a fully dynamic resource allocation.

In some embodiments the method further comprises: scheduling resource allocations with a hybrid resource allocation that combines dynamic resource allocation and static resource allocation.

According to a twelfth aspect of the invention, there is provided a method in a wireless station of determining its resource assignment comprising: receiving a bitmap (or other signalling); determining whether resources have been assigned to the wireless station on the basis of the bitmap (or other signalling); if so, performing at least one of: processing a persistent resource assignment; processing a non-persistent resource assignment determined by the position of the wireless station in the bitmap (or other signalling), and the number of assignments to other wireless stations.

In some embodiments each wireless station is allocated a persistent resource assignment for first HARQ sub-packet transmissions with other resource assignments being non-persistent.

In some embodiments processing a persistent resource assignment comprises: determining if the wireless station is to receive a resource allocation from the bitmap (or other signalling); if the bitmap (or other signalling) indicates that wireless station is to receive a resource allocation, processing a persistently allocated resource; and processing a non-persistent resource assignment comprises: determining if the wireless station is to receive a resource allocation from the bitmap (or other signalling); if the bitmap (or other signalling) indicates that wireless station is to receive a resource allocation determining from the bitmap (or other signalling) the resources allocated to persistent wireless stations and to previous allocations to non-persistent wireless stations, and processing a next resource that has not been allocated as the non-persistently allocated resource for that wireless station.

In some embodiments the method further comprises adding wireless stations to the bitmap (or other signalling) in a way that does not impact the bitmap (or other signalling) positions of wireless stations who have previously been assigned a position.

In some embodiments at least some new wireless stations are added to the end of the bitmap (or other signalling).

In some embodiments at least some new wireless stations are added into vacant bitmap (or other signalling) positions created by wireless station leaving (or being deleted from) the bitmap (or other signalling).

In some embodiments the method further comprises: performing a temporary allocation of resources associated with a bitmap (or other signalling) to at least one wireless station that is not part of the bitmap (or other signalling) when the resources are not all required by wireless stations that are part of the bitmap (or other signalling).

In some embodiments performing temporary allocation of resources associated with a bitmap (or other signalling) to at least one wireless stations that is not part of the bitmap (or other signalling) comprises: determining a particular wireless station that is part of the bitmap (or other signalling) does not require resources in a given scheduling period and allocating the resources to at least one wireless station that is not part of the bitmap (or other signalling); signalling the resource allocation to the at least one wireless station that is not part of the bitmap (or other signalling).

According to a thirteenth aspect of the invention, there is provided a method comprising: transmitting frames using OFDM, each frame occupying a plurality of OFDM symbols; performing full persistent resource allocation for at least one wireless station by allocating resources persistently for both original sub-packet transmissions and retransmission sub-packets.

In some embodiments the frames are VoIP frames.

In some embodiments the method comprises: performing full persistent resource allocation for some of wireless stations and performing first transmission persistent allocation by allocating a resource persistently only for first transmissions for remaining wireless stations.

In some embodiments the method further comprises using a combined bitmap (or other signalling) to signal resource allocation both for wireless stations having full persistent resource allocation and for wireless stations having first transmission persistent allocation.

In some embodiments using a combined bitmap (or other signalling) to signal resource allocation both for wireless stations having full persistent resource allocation and for wireless stations having first transmission persistent allocation comprises: designating wireless stations with full persistent allocation as a special user group in the bitmap (or other signalling).

In some embodiments the method further comprises segmenting wireless stations with full persistent allocation into groups that have different HARQ sub-packet start points.

In some embodiments the method further comprises allocating resource locations for the first transmission persistent allocations immediately after the resource locations of the wireless stations with persistent allocation for all transmissions.

In some embodiments the method further comprises re-packing and reassigning resources that were not used by one or both of a) the wireless stations with persistent allocation for all transmissions and b) the wireless stations with persistent allocation for the first sub-packet transmission.

In some embodiments the method further comprises: reassigned wireless stations determining what resources are not assigned to persistent wireless stations by reading the bitmap (or other signalling), and deriving the location of the free resources.

In some embodiments the method further comprises using a resource shifting pattern for full persistent resources.

In some embodiments the resource shifting pattern is a cyclic shift.

According to a fourteenth aspect of the invention, there is provided a method comprising: transmitting frames using OFDM, each frame occupying a plurality of OFDM symbols; for at least one OFDM resource, allocating the resource as a persistent resource allocation to a group of more than one wireless stations with only one wireless station being given the resource in a given slot.

In some embodiments the frames are VoIP frames.

In some embodiments the method further comprises transmitting a bitmap (or other signalling) in which each of the wireless stations which have the same persistent resource have an individual entry, with multiple positions in the bitmap (or other signalling) referring to the same resource.

In some embodiments the method further comprises for each persistent resource allocation to a group of more than one wireless stations, each wireless station of the group of more than one wireless stations attempting to decode the resource, and discarding a result if it is not for that wireless station.

In some embodiments the method further comprises: for at least one persistent resource allocation to a group of more than one wireless stations, reassigning the persistent resource if it is not assigned to any wireless station of the group of wireless stations to other wireless stations not receiving a persistent allocation.

In some embodiments for wireless stations being reassigned persistent resources, the resource location is derived from the bitmap (or other signalling).

In some embodiments the same resource can be persistently allocated to multiple wireless stations only for a first HARQ transmission.

In some embodiments the same resource is persistently allocated to multiple wireless stations for multiple HARQ transmissions.

According to a fifteenth aspect of the invention, there is provided a method comprising: transmitting frames using OFDM, each frame occupying a plurality of OFDM symbols; signalling resource allocation to multiple groups of wireless stations using multiple bitmaps (or other signalling); re-assigning unused resources available for at least one of the bitmap (or other signalling)s to another of the bitmaps (or other signalling).

In some embodiments the frames are VoIP frames.

In some embodiments the method further comprises wireless stations that are receiving such unused resources reading their own bitmap (or other signalling) and the bitmap (or other signalling) of others to determine where their resources are.

In some embodiments the method further comprises: starting resource allocation with the bitmap (or other signalling) associated with wireless stations with the worse channel conditions, and then in sequence according to channel conditions until concluding with the allocation for the bitmap (or other signalling) associated with receives with the best channel conditions.

In some embodiments the method further comprises performing resource allocation of a next bitmap (or other signalling) beginning with unused resources of the previous bitmap (or other signalling).

In some embodiments only those wireless stations not receiving persistent allocation are repacked into unused resources of another bitmap (or other signalling).

In some embodiments the method further comprises: for some wireless stations, allocating resources that are repacked from resources available to be assigned by bitmap (or other signalling) of those wireless stations, and making available unused resources for assignment to non-persistent wireless stations that are not part of the bitmap (or other signalling) signalled by some other method.

In some embodiments the method further comprises: allocating a first wireless station to a resource from which a subset is removed due to its having been assigned to other wireless stations by a bitmap (or other signalling) signalling; the first wireless station deriving which resources are already assigned to other wireless stations from knowledge of the first resource allocation and the bitmap (or other signalling) that signals the subset to be removed.

In some embodiments the method further comprises: signalling to the first wireless station to indicate whether or not the wireless station must also read the bitmap(s) (or other signalling) signalling intended for other wireless stations, in order to derive which resources have already been assigned to other wireless stations.

In some embodiments signalling comprises sending a single bit to indicate either 1) the wireless station is allocated all resources specified excluding those allocated to other wireless stations or 2) the bitmap (or other signalling) does not need to be read as all resources specified are assigned to the wireless station.

According to a sixteenth aspect of the invention, there is provided a method comprising: transmitting frames using OFDM, each frame occupying a plurality of OFDM symbols; performing persistent and/or non persistent OFDM resource allocation to multiple wireless stations; capping a maximum transmit power to a given wireless station at a level related to the longer term channel conditions.

In some embodiments the frames are VoIP frames.

In some embodiments capping a maximum transmit power to a given wireless station at a level related to the longer term channel conditions comprises capping the maximum transmit power according to an inverse relationship to average signal to noise ratio or geometry (path loss and shadowing conditions), of the wireless station.

In some embodiments capping the maximum transmit power according to an inverse relationship to average signal to noise ratio or geometry (path loss and shadowing conditions), of the wireless station comprises setting the maximum transmit power to a wireless station during power control operation to a fixed value above the inverse of geometry of the wireless station.

According to a seventeenth aspect of the invention, there is provided a method comprising: transmitting frames using OFDM, each frame occupying a plurality of OFDM symbols; sending a first bitmap (or other signalling) to indicate which wireless stations are being allocated an OFDM resource during a given scheduling period; sending a second bitmap (or other signalling) to indicate the size of resources and/or MCS's of wireless stations assigned by the first bitmap (or other signalling).

In some embodiments the frames are VoIP frames.

In some embodiments the second bitmap (or other signalling) contains an entry for each wireless station that is actively being assigned by the first bitmap (or other signalling).

In some embodiments each entry is a single bit that indicates small or large resource assignment.

In some embodiments the second bitmap (or other signalling) contains entries for persistently assigned wireless stations, regardless of whether or not they are assigned, the method further comprising other wireless stations deriving their resource allocations taking into account the second bitmap (or other signalling).

In some embodiments the second bitmap (or other signalling) does not contain entries for persistently assigned wireless stations.

According to an eighteenth aspect of the invention, there is provided a method comprising: transmitting frames using OFDM, each frame occupying a plurality of OFDM symbols; transmitting a respective bitmap (or other signalling) for each of a plurality of HARQ interlaces.

In some embodiments the frames are VoIP frames.

In some embodiments the method further comprises: for at least some wireless station, assigning multiple positions in one or more bitmaps (or other signalling) in one or more user groups, a user group comprising a set of wireless stations having the same start position of the first HARQ transmission of a sub-packet for a given interlace.

In some embodiments the comprises for at least some wireless stations: assigning wireless stations to a bitmap (or other signalling), and possibly a user group, for a primary assignment, and another position on another or the same bitmap (or other signalling), in another or the same user group, for the purpose of a secondary assignment.

In some embodiments the first transmission is persistently assigned for either the primary or secondary assignments, or both.

In some embodiments the secondary assignment may be shared by more than one wireless station while the primary assignment is unique.

In some embodiments start slots and interlaces may be different for the primary and secondary interlaces.

In some embodiments, a packet that begins transmission for the primary assignment continues all re-transmissions using the allocations for the primary assignment; a packet that begins transmission for the secondary assignment continues all re-transmissions using the secondary assignment.

In some embodiments the method further comprises: starting transmission of a packet using the primary assignment and switching to the secondary assignment after some number of re-transmissions.

In some embodiments the method further comprises persistently assigning resources to the first transmission of the primary and secondary assignments, where the first transmissions of the secondary assignment is not allowed to be the first transmission of the packet.

In some embodiments resources are persistently assigned to the first transmission of the primary assignment but not the secondary assignments.

In some embodiments, some user groups of a given bitmap (or other signalling) refer to wireless stations with start positions of the first HARQ transmission of a sub-packet in a given slot, and may be persistently assigned, while other user groups in the same bitmap (or other signalling) may not be persistently assigned.

In some embodiments the presence of a secondary first slot persistent assignment requires the wireless station to monitor the secondary channel.

In some embodiments the secondary assignment is only used when needed due to re-transmissions being exhausted on the primary assignment.

According to a nineteenth aspect of the invention, there is provided a method comprising: assigning a non-shared OFDM transmission resource to a wireless station; assigning a shared OFDM transmission resource to a wireless station with information from a shared resource allocation scheme.

In some embodiments assigning a non-shared OFDM transmission resource comprises assigning a non-shared OFDM transmission resource using unicast signalling messages.

In some embodiments assigning shared resources with information from a shared resource allocation scheme comprises assigning shared resources using a bitmap.

In some embodiments assigning a shared OFDM transmission resource comprises assigning shared resources of which at least a portion of are unused resources.

In some embodiments the method further comprises assigning unused resources to one of: a wireless station notified of assignment of the unused resources by a signalling scheme; a wireless terminal that is designated to use the unused resources of a shared resource or resources; one or more wireless stations designated to use unused portions of one or more shared resources.

In some embodiments other resources in addition to the unused resources are assigned to the wireless terminal In some embodiments, if a portion of a transmission sent within the shared resource is not received and decoded by an intended wireless station, reception of the packet can proceed without it.

According to a twentieth aspect of the invention, there is provided a method comprising: assigning a shared OFDM transmission resource to a wireless station with information from one of a unicast signalling method or a part of the grouped resource allocation scheme.

According to a twenty-first aspect of the invention, there is provided a method comprising: indicating an assignment of resources with an assignment message; assigning resources from the assignment of resources indicated in the assignment message to individual users with a resource usage bitmap.

In some embodiments the assignment message and the resource usage bitmap are sent either separately or in a single bitmap.

In some embodiments when assigning resources, the resource usage bitmap indicates which resources are available for all resources or a subset of the resources.

In some embodiments indicating an assignment of resources comprises utilizing an assignment bitmap that contains entries corresponding to a wireless station or group of wireless stations.

In some embodiments indicating an assignment of resources comprises utilizing the assignment bitmap to indicate the wireless stations for which a transmission is to start.

In some embodiments the method further comprises: for the wireless stations for which a transmission is to start: determining wireless station resource locations from the resource usage bitmap and assignments to other wireless stations.

In some embodiments a wireless station is assigned to only one user group so that the wireless station is assigned one position, in a single assignment bitmap.

In some embodiments if a number of sub-packet transmissions transmitted on a assigned resource is greater then the number of first sub-packet transmission positions, a new packet transmission is started on a different resource prior to an earlier packet completing all sub-packet transmissions.

In some embodiments if a wireless station is transmitted multiple packets in the same interlace offset, the multiple packets are distributed across composite time slots of the interlace offset.

In some embodiments the method further comprises sending the assignment bitmap for user groups on different interlaces or interlace offsets.

In some embodiments the method further comprises subdividing a user group into more than one user group.

In some embodiments when indicating an assignment of resources, utilizing separate assignment messages for each user group.

In some embodiments the method further comprises transmitting one or more assignment messages along with one or more resource usage bitmaps.

In some embodiments indicating an assignment of resources comprises: in a given slot, one or more assignment bitmaps are used to indicate assigned users, and a single resource usage bitmap is used to indicate available resources based on all current assignments from bitmaps.

In some embodiments when indicating an assignment of resources, the resource usage bitmap comprises entries for a subset of resources or has entries for all resources.

In some embodiments resources are used for transmission of one or more of: broadcast, assignment, and control channel messages.

According to a twenty-second aspect of the invention, there is provided a method comprising: for when the maximum number of allowed HARQ transmissions for a packet is not an integer multiple of the number of interlace offsets: a wireless terminal recovering from possible feedback errors when a negative acknowledgement (NAK) is mistakenly received by a base station for a positive acknowledgement (ACK) or when an ACK is mistakenly received by a base station for a NAK.

In some embodiments the wireless terminal recovering from possible feedback errors comprises: when more HARQ transmissions are received than are allowed for an undecoded packet, the wireless station emptying a buffer storing previously received HARQ transmissions for the undecoded packet and using the most recently received HARQ transmission as a HARQ transmission for a new packet.

In some embodiments the allowed HARQ transmissions for a packet is five and the number of interlace offsets is three.

According to a twenty-third aspect of the invention, there is provided a method for transmitting a packet comprising: transmitting frames using OFDM, each frame occupying a plurality of OFDM symbols; allocating a first OFDM resource within a frame to an original sub-packet transmission for the packet; transmitting the original sub-packet transmission using a modulation and coding scheme; in response to reception information received from a receiver, allocating a second resource space to send a retransmission sub-packet for the packet, said second resource space being different from said first resource space; and transmitting said retransmission sub-packet using said modulation and coding scheme.

In some embodiments the step of allocating a second resource space further includes allocating a second resource space using said reception information.

In some embodiments the method further comprises: signalling a respective user ID for each retransmission.

In some embodiments the method further comprises: transmitting an ACK-NAK-echo bitmap to indicate which wireless stations are receiving allocations for retransmissions.

In some embodiments the method further comprises: transmitting original sub-packets and retransmission sub-packets with a constant frame spacing.

According to a twenty-fourth aspect of the invention, there is provided a system for transmitting a packet comprising: radio circuitry; and a controller operable to: allocate a first resource space for transmitting a first sub-packet for the packet; provision said sub-packet for transmission by said radio circuitry using a modulation and coding scheme; in response to reception information received from a receiver, allocate a second resource space to said data packet, said second resource space being different from said first resource space; and provision said a second sub-packet for the packet for transmission by said radio circuitry using said modulation and coding scheme.

In some embodiments the controller is further operable to allocate a second resource space using said reception information.

According to a twenty-fifth aspect of the invention, there is provided a base station comprising: a scheduler to schedule packets for transmission; a signalling information generator to generate signalling information based on information received from the scheduler; a frame generator to construct frames based on information from the scheduler; a transmitter to transmit the frames; a receiver to receive feedback to aid in determining whether the transmitted frames were successfully received.

In some embodiments the scheduler receives the feedback from the receiver and utilizes the feedback to schedule packets.

In some embodiments the scheduler has access to the packets either through a physical connection or access to stored memory.

In some embodiments frames generated by the frame generator include signalling information from the signalling information generator.

According to a twenty-sixth aspect of the invention, there is provided a wireless station comprising: a receiver to receiver frames; a signalling information decoder to extract signalling channels from received frame and determine whether a resource has been scheduled for the wireless terminal, and if so where; a sub-packet extraction module to extract signalling channels from the received frames; a packet decoder to decode information on the signalling channels; a transmitter to sent feedback indicating whether the transmitted frames were successfully decoded.

In some embodiments when multiple sub-packets for a given packet have been received, the multiple sub-packets are used in combination by the packet decoder to decode the information on the signalling channels.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIGS. 9 to 18 relate to methods of signalling resource assignment;

FIGS. 19 through 21 relate to resource assignment in which primary and secondary assignments are employed;

FIG. 22 shows an example of a bitmap containing a respective bit position for each of 10 wireless stations;

FIG. 23 contains an example of a downlink VoIP IE (information element) Format;

FIG. 24 shows an example of overhead estimations for a particular implementation in which the above described fully dynamic scheduling mechanism is employed compared to an implementation in which a hybrid (static plus dynamic) scheduling mechanism is employed, and also compared to the overhead for current 802.16e implementations;

FIGS. 27A and 27B contain a table comparing the overhead of a fully synchronous approach, a fully asynchronous approach, and two different hybrid approaches;

DETAILED DESCRIPTION OF THE EMBODIMENTS

Figure 1:
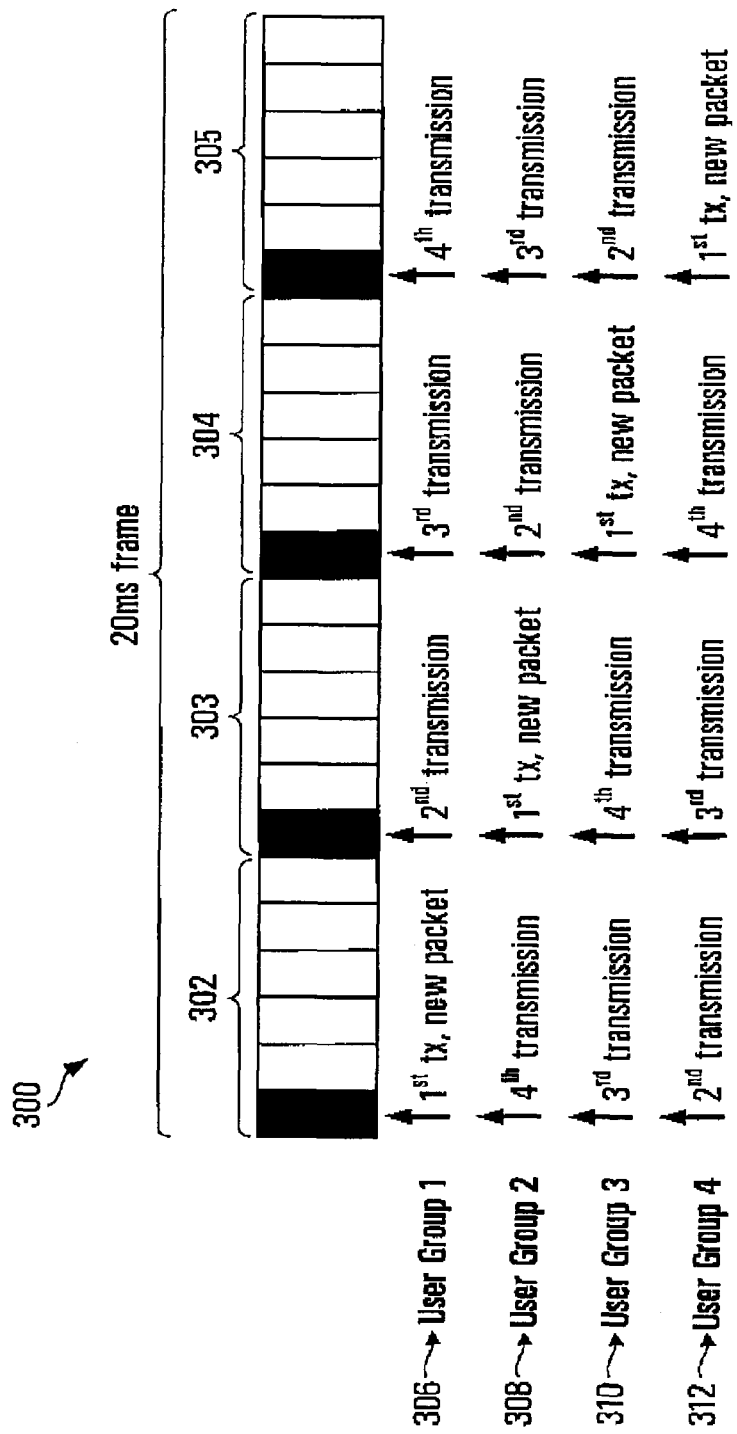
FIGS. 1 to 3 are schematic diagrams of VoIP framing methods provided by embodiments of the invention.

In accordance with embodiments of the invention various HARQ techniques are described. Specifically the embodiments presented below are intended for use in future 3GPP, 3GPP2 and IEEE 802.16 based wireless standards. The broader inventions set out in the summary, however, are not limited in this regard and are applicable to any futures wireless access standards if H-ARQ is supported.

In OFDMA, there is a transmission resource consisting of a set of sub-carriers in frequency over OFDM symbol durations in time. One or more, typically consecutive, OFDM symbols constitutes a frame. Frames may be further subdivided to form slots. A particularly suitable frame duration for VoIP is 20 ms. Having assigned OFDM symbols to frames and/or slots, channelization involves assigning respective subsets of the resource to respective channels. There are many ways that channelization can be performed. The resources of a given channel may involve contiguous and/or non-contiguous groups of sub-carriers. For the purpose of this application, any type of channelization may be used. Scheduling involves assigning the channelized resource to particular users, and performing any signalling necessary for users to know when and where their resources are being scheduled. In many cases scheduling also involves reserving future capacity to perform re-transmissions that may, for example, occur according to a HARQ protocol. There is an original packet requiring transmission. This is transmitted in a first sub-packet. Subsequent retransmission sub-packets are sent as necessary. Any retransmission scheme is contemplated. These may include some or all of the first sub-packet and/or additional redundancy to name a few examples.

Some embodiments do not employ a slot structure, but rather simply allocate resources within a frame to multiple users.

Many of the embodiments described herein refer to the use of bitmaps. A bitmap contains a respective bit for each of a plurality of users/groups of users that is used to signal that user/group of users is being scheduled. This is a specific particularly efficient example of a scheduling indicator from which users can tell whether or not they are scheduled. Another example would be to explicitly signal user IDs for the scheduled users. It is to be understood that throughout this specification, wherever a bitmap is used, the bitmap or other signalling can be employed.

Many of the embodiments described herein make use of an ACK-NAK-echo bitmap. This is a bitmap that is used to echo the ACKs and/or NAKs received by a transmitter from the various receivers in respect of previous transmissions. The ACK-NAK-echo bitmap may contain a bit for all users, or only those scheduled. For example, the bitmap might include a "1" to echo an ACK, and a "0" to echo a NAK. The ACK-NAK-echo bitmap is a particular mechanism of ACK/NAK echo. More generally, any ACK/NAK echo can be employed with this and other embodiments described herein. This includes ACK/NAK echoes intended for either a subset or all users in the system, as well as ACK/NAK echoes intended for a single user. The ACK-NAK-echo bitmap indicates whether another sub-packet is been transmitted in respect of a given packet. If a previous packet has been acknowledged, the "ACK" indicator indicates that the acknowledgement has been received by the base station (BS), and the retransmission resource will not be used. If a NAK has been received in respect of a previous packet, then the "NAK" indicator indicates that the negative acknowledgement has been received by the BS, and the next retransmission resource will be used to transmit a retransmission sub-packet for the packet.

In some embodiments, the ACK-NAK-echo bitmap is transmitted by the BTS to a group of the receivers, and contains a respective bit (or other indicator) that echoes the ACK or NAK sent by each wireless station in the group for each VoIP frame. The user group can consist of one user, a subset of all users, or all users in the system. The ACK-NAK-echo bitmap is sent as often as every slot. However, the bitmap may include a position for a given user only during a subset of the slots. Thus, if a wireless station successfully decodes a packet on the basis of one or more sub-packets received, the wireless station transmits an ACK, and this shows up in the subsequent ACK-NAK-echo bitmap transmitted by the BS. Similarly, if a wireless station fails to successfully decode a packet on the basis one or more sub-packets received, the wireless station transmits an NAK, and this shows up in the subsequent ACK-NAK-echo bitmap transmitted by the BS. One of the purposes of the ACK-NAK-echo bitmap is to allow all wireless stations to follow along with the ACK/NAK status of all wireless stations.

While a wireless station will not know what to expect in the ACK-NAK-echo bitmap as a whole, the wireless station will expect to see an echo of its own ACK/NAK. In some embodiments, the base station transmits an ACK to echo a NAK transmitted by the wireless station, or transmits a NAK to echo an ACK transmitted by the wireless station for the purpose of signalling something to the wireless station. Several specific examples of this are presented in the detailed embodiments described below.

The detailed description of the embodiments in this application for the most part reflects the implementation of embodiments of the invention on a downlink from a base station to wireless stations. More generally, uplink and downlink implementations are contemplated. An allocation of a resource to a wireless station can involve allocation of an uplink resource for transmission by the wireless station or the allocation of a downlink resource for transmission to the wireless station.

Furthermore, many of the embodiments described herein are applied to VoIP traffic, but may also find application to non-VoIP traffic or to combinations of VoIP and non-VoIP traffic. Some embodiments that are particularly suitable for VoIP traffic may also be particularly suitable for traffic that has similar characteristics to VoIP traffic, such as some video telephony.

In general, the embodiments described herein may be applicable to both unicast and multicast schemes.

Signalling Bit Suppression for VoIP Allocation

A first embodiment is particularly appropriate for VoIP traffic due to the deterministic inter-arrival time of VoIP traffic. However, other traffic that also has a deterministic inter-arrival time may also benefit from this approach.

Base stations that are transmitting VoIP packets to VoIP capable wireless stations (hereafter VoIP wireless stations, although they may have other capabilities as well) will receive traffic from the network for downlink transmission on a roughly periodic basis, for example every 20 ms, for each wireless station. The arrival time of packets arriving from the network for multiple wireless stations will typically be more or less random. In some embodiments, wireless stations with roughly the same arriving time are grouped and identified collectively by a Group_ID. Connections are set up one by one, and each time the connection is set up, it is assigned to one of the groups according to arrival time. This is but one example of a mechanism of forming groups. Other mechanisms of forming groups are described below.

For each scheduling period, a respective bitmap is transmitted for each group. Each wireless station in a group may be associated with a corresponding position in the group bitmap. If a resource is allocated to a wireless station in a group, the corresponding position for the wireless station in the bitmap may be set accordingly, for example to "1" to indicate allocation, and a "0" to indicate no allocation. FIG. 22 shows an example of such a bitmap containing a respective bit position for each of 10 users.

For each position in the group bitmap for which resources are to be allocated, corresponding resource allocation parameters are transmitted. Examples of such resource allocation parameters are given below. It is not necessary to transmit resource allocation parameters for users that are not allocated in a given bitmap.

Due to the delay limitation of VoIP traffic, multi-user diversity gain is limited, and there would likely be only a very low possibility of use of high end MCS sets. In some embodiments, a reduced set of MCS sets is allowed for VoIP traffic. This might for example be a subset of DIUC (Downlink Interval Usage Code) and repetition combinations, these being a particular example of MCS sets. For example, in a particular embodiment, only 8 MCS levels are used, and these can be signalled using 3 bits as part of the resource allocation parameters.

In some embodiments, a MIMO transmission scheme that may or may not provide diversity, such as STTD (space time transmit diversity—a MIMO transmission scheme that that does provide diversity) or BLAST (a MIMO transmission scheme that does not provide diversity) may be used. This can be signalled on a per resource allocation basis. For example, in an implementation in which the options are only non-MIMO and STTD, a single MIMO enable bit might be used to indicate whether MIMO is being employed or not for a given resource allocation. If more MIMO modes are available, additional signalling bits might be used. This is another example of a resource allocation parameter.

The resource allocated by a given resource allocation will occupy a resource including certain sub-carriers and OFDM symbol durations. In some embodiments, a limited number of valid packet sizes for VoIP traffic are employed (for example, 1, 2 or four) and the size is signalled as part of the resource allocation parameters. The amount of time/frequency OFDM resource occupied by a VoIP packet can then be derived from the MCS and the size.

For example, if the packet is 40 bytes in size, and an MCS with QPSK with ½ coding rate is being used, then the 40 information bytes become 40×8 bits=320 information bits. After coding, this becomes 640 coded bits. After QPSK, this becomes 320 symbols. Each symbol maps to one sub-carrier. Assuming each sub-channel includes 80 sub-carriers. A sub-packet for this particular packet will occupy four sub-channels.

Allocations may be one dimensional, meaning a single parameter can indicate the size of the allocation. A specific example of a one dimensional allocation is a number of sub-channels. Note that a sub-channel may occupy multiple sub-carrier locations on one or multiple OFDM symbols. Allocations may be two dimensional, meaning that two parameters are used to indicate the size of the allocation. A specific example of a two dimensional allocation is a number of sub-channels over some number of scheduling intervals, such as slots. Typically, only a one dimensional allocation is used for a given VoIP user. In some embodiments, where a one dimensional OFDM resource allocation scheme is used (for example allocation is a number of sub-channels), the size of the one dimensional OFDM resource allocation can be derived from the MCS and packet size. A specific example of this was presented above.

Due to the low arrival data rate of VoIP traffic, a small number of ARQ channels may be implemented. For example, in some embodiments 4 ARQ channels are implemented each of which can be identified with a 2 bit ACID (ARQ channel identifier). The particular ARQ channel assigned for a given sub-packet may be signalled as part of the resource allocation parameters.

For the particular examples detailed above, a total of 8 bits can be used to signal each allocation signalling namely:

3 bits MCS;
2 bits sub-packet size;
2 bits ACID (only needed when there is fully asynchronous HARQ);
1 bit MIMO mode.

Therefore, the overall signalling scheme for this example includes the group bitmaps and the resource allocation parameters for each group bitmap. The particular parameters included are implementation specific, and of course, the manner of signalling is also implementation specific. The particular order used for this signalling does not matter so long as it is known at both the transmitter and the receiver. For example, in some implementations, each group bitmap is followed immediately by the resource allocation parameters. Alternatively, all of the bitmaps can be sent, followed by the resource allocation parameters for all of the bitmaps.

For this embodiment, HARQ retransmissions are signalled in the same manner as original transmissions if a fully asynchronous approach is followed. For synchronous HARQ, the retransmissions do not need to be signalled.

In accordance with another embodiment of the invention a scheme for allocating resources, to begin, wireless stations with roughly the same arrival time as described above, and/or similar channel conditions, and/or same or similar MCS, may be grouped and identified by a Group_ID. Once again, a respective bitmap is transmitted for each group, and each wireless station in a group is associated with a respective position of the group member bitmap as in the above example. In some embodiments, one or more groups are used for VoIP users, and one or more groups are for non-VoIP users.

For each user that is being allocated resources, resource allocation parameters are transmitted. In some implementations, two different sets of MCS level signalling are used, a first set for VoIP users, and a second set for non-VoIP users. For example, MCS level signalling may be 4 bits for non-VoIP users allowing for a selection between 16 different MCS levels, and some other number of bits as low as 0 bits for VoIP users.

For non-VoIP users, the duration (size of resource region—which could be a one or two dimensional resource) and location may be derived from a signalled indication of a start point of resource allocation for a given group (for example 6 bits) in combination with a signalled allocation size (for example 6 bits) and/or sub-packet size and MCS (for example 4 bits).

For VoIP users, the duration and location may be provided as described above or derived from a signalled indication of a start point of resource allocation for a given group (for example 6 bits), and an indication of the assigned resources to a subset of the users (from bitmap); knowledge of at least one of MCS and channel size which may be available in some other manner, constant, limited to a searchable set, or implied by membership in a particular group.

Therefore, the overall signalling scheme for this example includes the group bitmaps and the resource allocation parameters for each group bitmap. The particular order used for this signalling does not matter so long as it is known at both the transmitter and the receiver. For example, in some implementations, each group bitmap is followed immediately by the resource allocation parameters. Alternatively, all of the bitmaps can be sent, followed by the resource allocation parameters for all of the bitmaps.

For this embodiment, HARQ retransmissions are signalled in the same manner as original transmissions assuming an asynchronous HARQ implementation.

For synchronous HARQ, the retransmissions do not need to be signalled. This approach may result in less signalling for re-transmissions, if the same resource size is to be used for re-transmissions is used as for original transmission.

The following is a specific example of a synchronous HARQ embodiment. To begin, wireless stations with roughly same arriving time, and/or similar channel conditions, and/or same or similar MCS, may be grouped and identified by Group_ID. Each wireless station in a group may be associated with a respective position of the group member bitmap as in previous examples.

In this embodiment, a second bitmap with a respective entry for each user assigned resources by the first bitmap is used to indicate if the transmission is a first sub-packet for a new sub-packet or a re-transmission sub-packet. In a particular example, if the resource is assigned for first sub-packet transmission to a given wireless station, the corresponding position for the wireless station in the second bitmap may be set to '1' whereas if the resource is assigned for a retransmission sub-packet, the corresponding position for the wireless station in the second bitmap may be set to '0'. The position in the second bitmap can be derived from relative position and resource assignment indications in Group_ID bitmap.

For a first sub-packet transmission, the complete set of resource allocation parameters (whatever they may be for a given implementation) are signalled.

MCS level signalling may vary by group. For example, it may be 4 bits for non-VoIP, and as low as 0 for VoIP users. Duration (size of resource region—could be one or two dimensional resource) and location may be derived from indication of start point of resources (6 bits) for Group_ID, allocation size (6 bits) and MCS (4 bits) for listed users that are assigned resources. For VoIP, resource allocation may be provided the same as described above or derived from an indication of the assigned resources to a subset of the users (from bitmap), and knowledge of at least one of MCS and channel size which may be available in some other manner, which may be constant, limited to a searchable set, or implied by membership in Group_ID.

For HARQ re-transmission assignments, the MCS and resource location need not be signalled as the resource size may remain unchanged and the location can be derived from at least a portion of the 2 bitmaps and knowledge of resource size or MCS from initial signalling. In some embodiments, the bit field sizes may change for re-transmission depending on application specifications in which case the sizes would need to be signalled.

In some embodiments, HARQ re-transmission assignments are not performed for certain users, for example for VoIP users, where it is known that the re-transmissions for these users will use the same resource as the original resource, or another known resource.

Scheduling Mechanism

In some embodiments, using one or more of the above resource allocation approaches, a fully dynamic resource allocation is employed meaning that a completely new allocation is performed for each scheduling interval. This can be based on real time CQI (channel quality indicator) fed back from individual receivers in combination with a delay bound that might exist, particularly for VoIP traffic.

In some embodiments, a hybrid (static and dynamic) allocation is employed. For this embodiment, a resource allocation can be determined and held constant for some period (for example N frames, N>1) based for example on estimated arriving data rate and average CQI. Such a static allocation may be used for first sub-packet transmissions. Dynamic resource allocation may be employed for additional resource allocation (e.g., for retransmissions).

In accordance with an embodiment of the invention FIG. 23 provides an example of a downlink VoIP IE (information element) Format. The fields include an extended-2 DIUC that is used to indicate the type of IE. More generally, there may be any message type indicator) in which different DIUC are used to differentiate MIMO or non-MIMO; length; VoIP_Group_ID identifying to which group of users this IE pertains; a traffic_indication bitmap containing a bit for each user in the group. Then, for each "1" in the bitmap, there are further fields that include a sub-packet size field, a VoIP_DIUC field that is used to signal MCS, ACID, and AI_SN (assignment indication sequence number) used to indicate whether a sub-packet is an original sub-packet or a re-transmission sub-packet.

FIG. 24 shows an example of overhead estimations in numbers of subchannel used for transmission of overhead for a particular implementation in which the above described fully dynamic scheduling mechanism is employed compared to an implementation in which the above described hybrid (static plus dynamic) scheduling mechanism is employed, and also compared to the overhead for current 802.16e implementations. The comparison is made for differing numbers of allocations, namely 8, 16, 32, this being how many VoIP users are supported in each frame. It can be seen that there is approximately a 50% to 60% overhead reduction for the fully dynamic allocation scheme, and a 60% to 70% overhead reduction for the hybrid scheme.

More generally, grouping of users into groups can be done according to any appropriate mechanism. In another example, users are grouped into groups for which a common control channel will be transmitted, for example a DCCH (dedicated control channel). Such a group can be referred to as a DCCH group. In some embodiments, this grouping is based on geometry. For example, cell coverage might be divided into three roughly annular regions each with a respective DCCH group. The uses in each of the annular region re-assigned to the respective DCCH group. A first DCCH is transmitted for reception by users in the innermost area with lowest MCS, a second DCCH is transmitted for reception by users in the middle area, and a third DCCH is transmitted for users in the outermost area with the highest MCS. In another embodiment, grouping into DCCH groups is performed based on channel quality.

For example, there might be 30 users within the coverage area of a BTS. Of these, users 1-10 that are closest to the BTS and/or have the best channel and might be put together in a first group and signalled to with a first signalling channel, e.g. DCCH-0. Users 11-20 that are next closest and/or have the next best channel and are grouped into a second group and signalled to with a second signalling channel, e.g. DCCH-1. Users 21-30 that are farthest away and/or have the worst channel and are grouped together in a third group and signalled to with a third signalling channel, e.g. DCCH-2. These signalling channels can come in any appropriate form. Note that within each of the group, further sub-division into groups based on arrival time as described previously can be performed. The signalling channels may be broadcast channels in which case all users need to be able to receive them. If only a single such channel is used, then all users in the whole cell need to be able to receive it. By dividing users as described above and using multiple signalling channels, less robustness on the signalling channel for users with good channels can be employed.

Signalling to indicate whether or not a given user is being allocated resources is done again using a bitmap. The position in the bitmap may be assigned when the user joins. For example, the bitmap may signal '1' if the user is scheduled, '0' otherwise. Users assignment to groups may be semi-static (intended to be long-term). In some embodiments, the bitmap length can be changed slowly. Each user knows whether or not it is scheduled from the bitmap. Each user that is scheduled reads the associated resource allocation parameters. In some embodiments, these include an MCS and resource size.

In some embodiments, a persistent assignment is used for first sub-packet transmissions to a given user, meaning that the assignment does not change from one scheduling period to the next, while HARQ retransmission sub-packet is transmitted on a OFDMA time/frequency resource than is different from the original persistent assignment. In some embodiments, a HARQ ACK-NAK-echo bitmap is introduced to re-pack the resource assigned to HARQ retransmissions, such that the left-over resource for other users are contiguous in a slot. This reduces the signalling overhead required to assign resources to other users. A specific example of this is described below.

In some embodiments an MCS scheme for transmissions remains the same for original transmissions and retransmission, and is signalled once for the first transmission. The resource allocation locations for retransmission may be flexibly assigned in locations that need not be the same as that for the first transmission.

This technique allows for a less complex scheduler and a reduction in signalling overhead as compared to fully asynchronous and fully synchronous approaches. In a fully asynchronous approach, signalling is employed for first and subsequent sub-packet transmissions, and different spacing and/or physical resource locations can be employed. In a fully synchronous approach, the spacing between sub-packet transmissions is fixed, and the same physical resource is used.

In some embodiments, user IDs are used to signal that retransmissions to specific users are being performed. Signalling may include only user IDs with other signalling parameters being the same as signalled previously for the original transmission.

In some embodiments, an ACK-NAK-echo bitmap is used for retransmissions. Signalling may include ACK-NAK-echo bitmap (DL).

Using the user ID approach, the signalling overhead may be less than that of full asynchronous scheme by about 25-30% while the signalling overhead is comparable or more than that of fully synchronous scheme by about 10%. Flexibility, however, is achieved as compared to the fully synchronous scheme because the resource allocation location may vary for retransmission using the hybrid H-ARQ technique.

Using the ACK-NAK-echo bitmap approach, the signalling overhead may be less than that of the fully asynchronous scheme by 32-46%. Using the second approach, the signalling overhead may be comparable to or even less than that of the fully synchronous scheme by 16-21%, and the scheduler complexity caused by the fully synchronous H-ARQ scheme may be avoided.

According to another embodiment of the invention sub-packet transmissions including the original and re-transmission sub-packets happen with a regular N slot spacing, N being some defined parameter. That is to say if the first transmission happens in slot i, the second transmission is performed in slot i+N, the third transmission in frame i+2N and so on. According to other embodiments, however, the re-transmission interval need not be fixed.

According to an embodiment of the invention, operation of a hybrid H-ARQ scheme may be provided by the following:

a) BS allocates resources sequentially. The packets with higher number of retransmissions are scheduled before the packets with lower number of re-transmissions;

b) The resources allocated for the K-th transmission are signalled by an Information Element (IE_Tx–K);

c) IE_TX–1 (for first transmission) format may include the following information:

Start BAU (basic access unit–a minimum unit of resource allocation defined in any application specific manner) index (more generally a start point into the physical resource allocation);

Number of assignments;

For each assignment:

Number of BAUs (more generally an indication of amount of resource allocation for each assignment);

User ID;

MCS (modulation and code rate);

d) IE_TX–k (k=2, . . . , maximum number of retransmission, k≠1 for re-transmissions) format may include the following information which is less than above for original transmissions:

Approach 1:
  Start BAU index
  Number of assignments
  For each assignment: User ID
Approach 2:
  Start BAU index;
  ACK-NAK-echo bitmap (the size equals the number of negative acknowledgements (e.g.'0') in the IE_TX−k−1 in frame N frames before the current frame), assuming that only users that failed a k−1$^{st}$ transmission N frames earlier will require a kth transmission in the current frame. The ACK-NAK-echo bitmap may be created by the BS based on the H-ARQ feedback from wireless stations regarding the packet decoding.

A wireless station may record the order of assignments and assignment sizes for each assignment from the IE_TX−k, k=1, . . . , maximum number of retransmissions. The wireless station may derive its resource allocation based on the this record.

As will be appreciated by one of ordinary skill in the art other signalling formats are possible without departing from the broader scope of the invention (e.g., combination index approaches).

Figure 26:
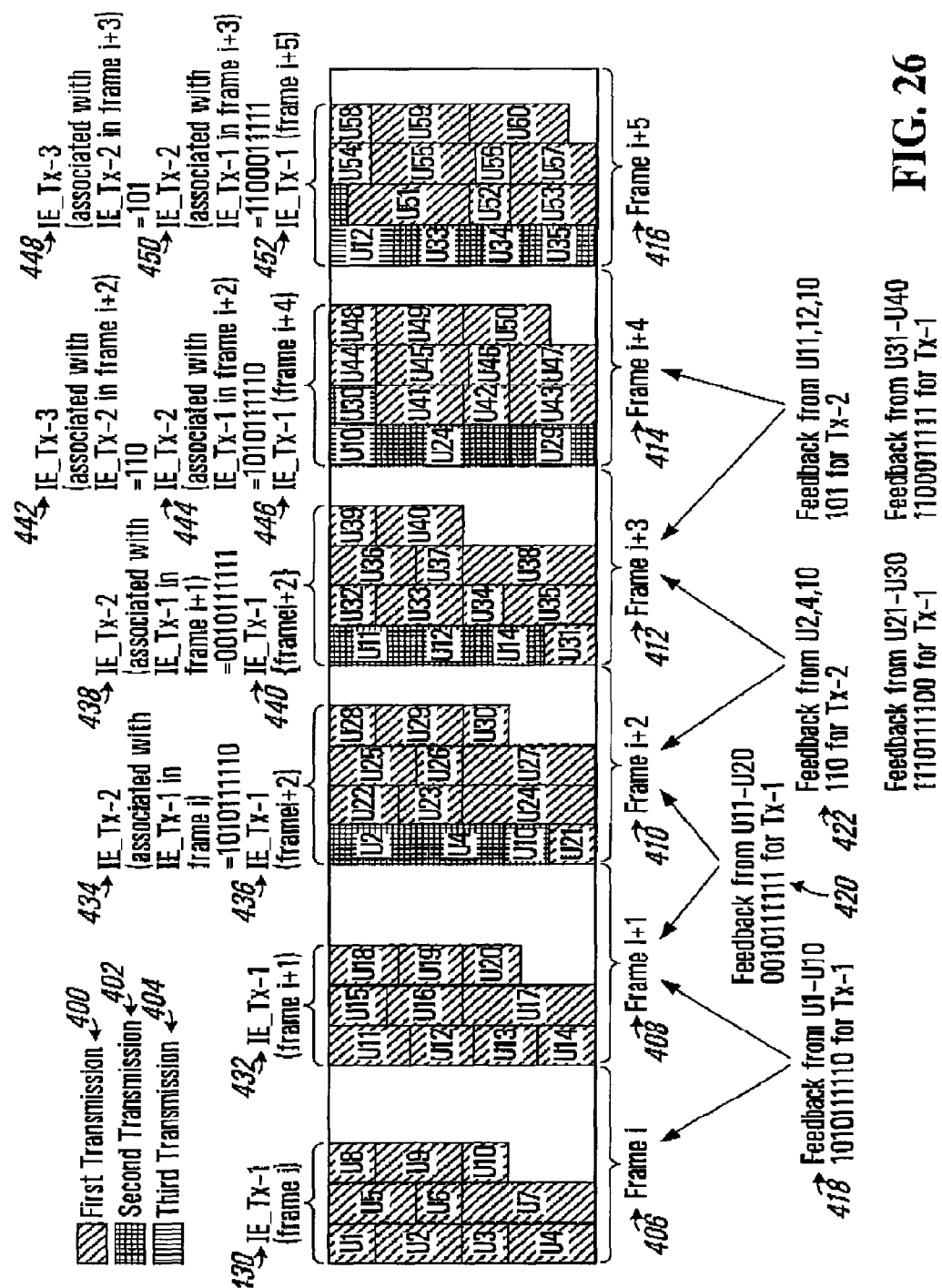
FIG. 26 contains an example of a usage scenario employing a hybrid H-ARQ scheme provided by an embodiment of the invention.

Referring now to FIG. 26, shown is an example of a usage scenario employing a hybrid H-ARQ scheme provided by an embodiment of the invention that follows the second above-identified approach, namely the user of ACK-NAK-echo bitmap to signal retransmissions. For this example, it is assumed that a maximum of two retransmissions can be performed, but this can be generalized to an arbitrary maximum number. The resource assigned for first, second (first retransmission) and third (second retransmission) sub-packet transmissions is indicated at 400,402,404, respectively. The allocation to OFDM sub-carriers is performed according to these assignments, but note that it is a logical assignment. As described for other embodiments, the actual sub-carriers may not necessarily be contiguous and may belong to multiple OFDM symbols.

During a first frame (frame i) 406, a first set of users, ten in the example, are scheduled to transmit an original sub-packet. This may pertain to VoIP and/or non-VoIP traffic. To signal this, IE_TX−1 430 is sent. Any appropriate signalling mechanism can be employed. In the next frame (i+1) 408, original sub-packets for users 11 to 20 are transmitted. To signal this, IE_TX−1 432 is sent. Meanwhile users 1-10 provide feedback—illustratively shown as a sequence of bits 418 that indicate whether a given user successfully decoded their packet, but this represents a summary of feedback coming from each wireless station separately. Feedback 418 indicates that users 2, 4, 10 did not successfully decode their packets. In the third frame (i+2) 410, retransmissions are scheduled first, followed by first sub-packet transmissions for next group of users 21 to 30. Users 2,4,10 require retransmission, and as such these are scheduled first. The signalling information is IE_TX−2 434 associated with second transmissions, and IE_TX−1 436 for the first transmissions. For the IE_TX−2, an ACK-NAK-echo bitmap is used to signal. From this bitmap, the users 1-10 understand that the first three resource allocations will be assigned to users 2,4,10 in sequence. Receivers can look at first resource assignment to understand the size of the retransmission resource, the assumption being that it will be the same. Meanwhile feedback 420 in respect of the first sub-packet transmissions to users 11 to 20 is received at 420. In the fourth frame (i+3) 412, there are retransmissions for the group of users 11-20 transmitted to during the second frame (i+1). In this case, this includes retransmissions for users 11, 12 and 14. Meanwhile, feedback from the second, fourth, and tenth users in respect of the second sub-packet transmissions is received as indicated at 422, and this is shown to indicate that the third such user (namely user 10) signals failure and requires re-transmission. In the fifth frame (i+4) 414, the allocation begins with an allocation for the third sub-packet transmission for user 10 and this is signalled with IE_TX−3 442. Another IE_TX−2 444 is used to signal second sub-packet transmissions, and another IE_TX−1 446 is used to signal first sub-packet transmissions. A similar process is shown for the sixth frame (i+5) 416 with IE_TX−3 448, IE_TX−2 450, and IE_TX−1 452. The assumption for this example is that the spacing between retransmissions is fixed, but the location within the frame can change. A contiguous resource is available for new assignments.

Figure 25:
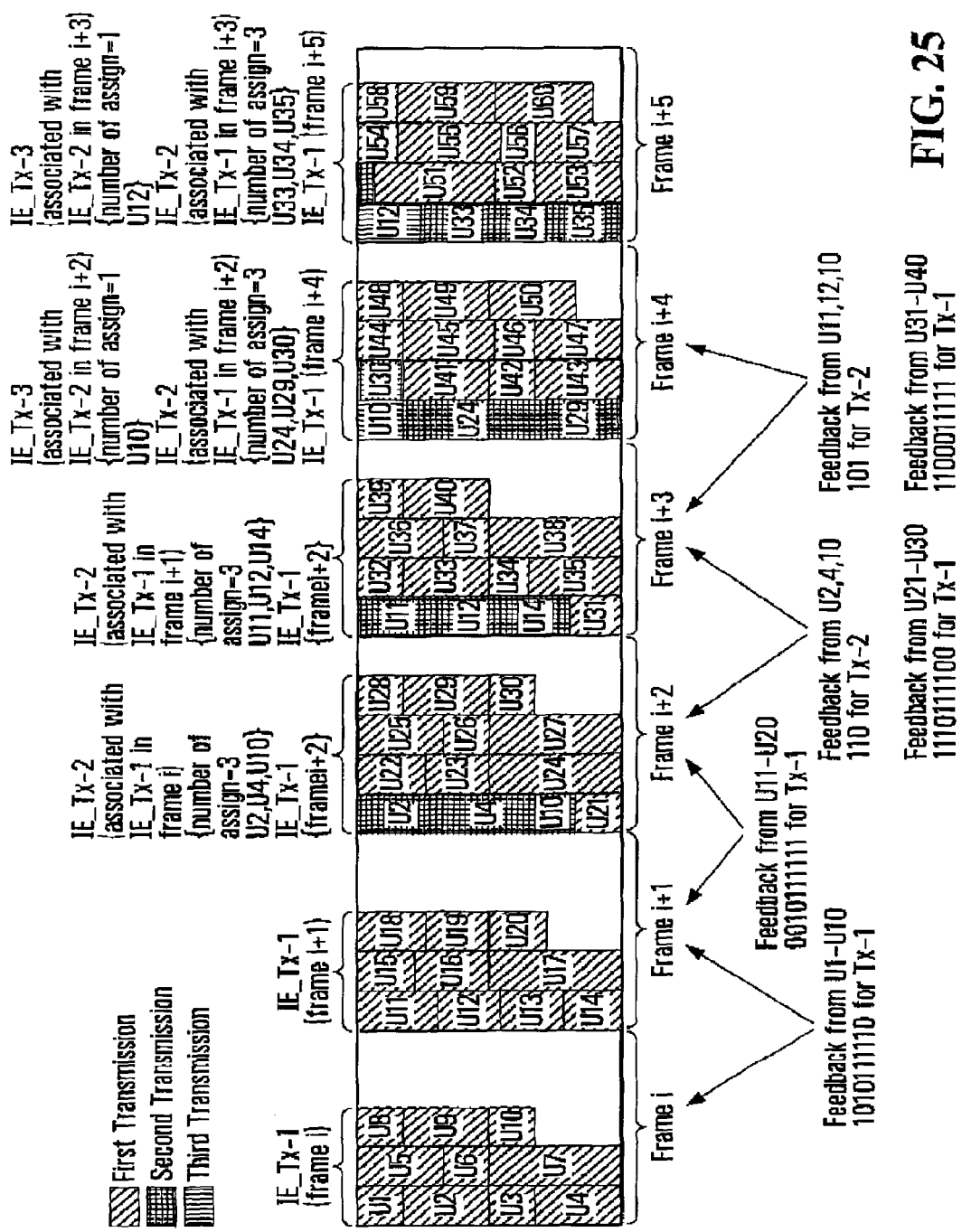
FIG. 25 contains an example of a usage scenario employing a hybrid H-ARQ scheme provided by an embodiment of the invention.

Referring now to FIG. 25, shown is an example of a usage scenario employing a hybrid H-ARQ scheme provided by an embodiment of the invention that follows the first above-identified approach, namely the use of user identifiers. This example is basically the same as the example of FIG. 26 described above except that rather than using ACK-NAK-echo bitmaps to signal retransmissions, user identifiers are used. For example, a 16 bit ID per user might be employed.

For the examples of FIGS. 25 and 26, it is assumed that 70% of packets will get through after the first sub-packet transmission; 20% get through after the second sub-packet transmission; and 10% will get through after three sub-packet transmissions. The frame space between two sub-packet transmissions for a given packet is assumed to be two frames for this example.

FIGS. 27A and 27B contains a table comparing the overhead of a fully synchronized approach, a fully asynchronous approach, and two different hybrid approaches. For the comparison, the following assumptions are made:

Number of BAUs: 128; total 50 transmissions (first and re-transmissions); Size of user ID: 10 bits; Size of MCS: 3;

30% more signalling overhead for fully synchronous scheme to account for the impact of irregular vacancies of the resource available to assign to the first transmission.

For a first scenario, represented in the top half of the table of FIGS. 27A and 27B, it is assumed that for successful decoding, 70% of packets require one transmission; 20% of packets require two transmissions; 10% of packets require three transmissions.

For a second scenario, represented in the bottom half of the table of FIGS. 27A and 27B, it is assumed that for successful decode, 50% of packets require one transmission; 25% of packets require two transmission; 15% of packets require three transmissions, 8% of packets require four transmissions; 2% of packets require five transmissions.

Handling of Non-Full Rate Vocoder Frames

To reduce signalling overhead for VoIP, persistent resource allocation can be used to assign periodic resources to VoIP users to transmit a VoIP packet every fixed time interval, e.g. 20 ms, as previously described above.

In some embodiments, the persistently assigned resource can be used for transmission of both first sub-packet and subsequent HARQ retransmission sub-packets. If HARQ early termination occurs meaning that successful packet decoding has occurred prior to the use of all of the allocations for retransmission for a given packet, the persistent resource can be assigned to other users in a non-persistent manner. In this case, the available resource to other users due to HARQ early terminated is fragmented in a slot. Alternatively, as described in other embodiments above, a HARQ retransmission sub-packet may be transmitted on a different OFDMA time/frequency resource than the original persistent assignment. In some embodiments, a HARQ ACK-NAK-echo bitmap is introduced to re-pack the resource assigned to HARQ retransmissions, such that the left-over resource for other users are contiguous in a slot. This reduces the signalling overhead required to assign resources to other users.

The above-described approaches do not specifically address the unused resource or fragmentation of a resource that occurs as a result of variable rate vocoder frames. Note that a "vocoder frame" is an example of what might be transmitted as a packet, not to be confused with the OFDM framing that might be employed in some embodiments. For example, an EVRC codec generates voice frames with four different rates or frame sizes: full rate, ½ rate, ¼ rate and ⅛ rate (which is blanked) with probabilities of 29%, 4%, 7% and 60% respectively. With variable size vocoder frames, the resource required by the first sub-packet of a VoIP packet is variable. Therefore, pure persistent resource allocation for the first sub-packet transmission may not be efficient.

In this embodiment, there is a persistent allocation for the first sub-packet transmission, but the resource allocation may or may not be used as allocated. Furthermore, mechanisms are provided to increase the likelihood of a first sub-packet resulting in a successful decoding operation at the receiver.

Half Rate and Quarter Rate Frame Transmission

For half rate, and quarter rate vocoder frames, the frame size is smaller than that of the full rate frame. However, in some embodiments, to avoid additional signalling for the first sub-packet transmission, the same OFDMA time/frequency resource is used for these reduced rate frames as for the full rate frame.

To match the vocoder frame size to the amount of OFDMA time/frequency resource, an increased coding rate (compared to the full rate frame) and/or repetition is used for the half rate and quarter rate frames.

The different coding rate and repetition factors used for full rate, half rate, quarter rate vocoder frames are predetermined and known to the wireless station.

The wireless station may use blind rate detection to detect the actual frame rate transmitted by the base station. Alternatively, this could be signalled, but this would be less efficient.

When a first sub-packet is scheduled, typically resources are made available later on for HARQ retransmission should it be necessary. However, the above-described approach will lead to a higher probability of success for first sub-packet transmission of half rate and quarter rate frames. HARQ early termination occurs when a sub-packet is successfully received using less than all of the allocated retransmission resources. The resource freed up by the persistent user due to HARQ early termination can be assigned to other users. This embodiment may employ a persistent allocation for both the original packet and retransmissions.

More generally, the above approach can be used for any non-full rate frames. For example, in implementations where ⅛ frames are not blanked, the repetition or increased coding rate approach can be employed.

⅛ Rate Frame Transmission

⅛ rate vocoder frames can be blanked without impacting the vocoder performance. In some embodiments, rather than transmitting a ⅛ frame during every persistently allocated opportunity, keep-alive ⅛ rate frames can be sent once in a while, for example in a periodic manner. The method of non-full rate frame transmission as described in the previous section can be used for the keep-alive, that approach resulting in an increased chance of successful transmission, and accordingly resulting in retransmission resources being frequently freed up. During the persistent allocations that are not used for transmitting the keep-alive ⅛ rate frames, non-persistent resources can be assigned. While this aspect has focussed on ⅛ rate frames, more generally, minimum rate frames can be treated in this manner.

When a ⅛ rate VoIP frame is blanked, the persistently allocated resource for the first sub-packet does not contain content for the originally allocated user.

Resource for First Sub-Packet Left Unused

In a first implementation, the resource for the first sub-packet is left unused meaning that it is not reallocated to another user. In this case, the wireless station having the persistent allocation receives nothing and interprets it as an erased packet. The wireless station signals a NAK to the BS.

The BS will understand that the transmission has been blanked. In the subsequent retransmission slots, the BS sets the corresponding bit in the ACK-NAK-echo bitmap to 'ACK' to indicate that there is no resource assigned to this user for HARQ retransmission. More generally, the BS signals that there will be no retransmission. The unused retransmission resource is then available to be re-packed and can be assigned to other users.

The wireless station with the blanked transmission will either a) discover that its NAK has been changed to ACK and determine it is being blanked for this frame or b) not receive the ACK-NAK-echo bitmap (for signal strength reasons, or otherwise) and follow the same procedure as in the first slot.

Resource for First Sub-Packet Assigned to Other Users

In a second implementation, the unused resource is assigned to other users in a non-persistent manner. The resource assignment may for example be identified by specific resource/channel/node index or OFDMA sub-carrier and symbol indices.

In this case, the original persistent user with the blanked transmission will unknowingly decode the packet transmitted on its persistent resource space. The decoding will most likely fail, in which case, the user signals a NAK to the base station. In the case where the user successfully decodes the packet, an ACK will be sent to the base station. The layer 2 protocol of the user will however detect a mismatch on the user ID and will discard the packet. The base station will ignore the HARQ ACK/NAK received from the original persistent user.

If the non-persistent user occupying the unused persistent resource does not require HARQ retransmission, at the retransmission slot, the BS sets the corresponding bit in the ACK-NAK-echo bitmap to 'ACK' to indicate that there is no resource assigned to the persistent user for HARQ retransmission. The unused resource is therefore re-packed and can be assigned to other users.

On the other hand, if the non-persistent user occupying the unused persistent resource requires HARQ retransmission, two different approaches are provided to setting the HARQ ACK-NAK-echo bitmap in subsequent retransmission slots:

Approach 1: The retransmission of a sub-packet for the non-persistent user occupies a different resource than the previous sub-packet. The new resource is explicitly signalled. The BS sets the corresponding bit in the ACK-NAK-echo bitmap to 'ACK' to indicate that there is no resource assigned to the persistent user for HARQ retransmission. The unused persistent resource is therefore re-packed and can be assigned to other users.

Approach 2: The retransmission of the sub-packet for the non-persistent user occupies the same resource as the previous sub-packet. No explicit signalling is required for the retransmission. The BS sets the corresponding bit in the ACK-NAK-echo bitmap to 'NAK' to indicate that there is a resource assigned to the persistent user for retransmission. The original persistent user will continue to attempt to decode the packet transmitted on the persistent resource, if it does not know its VoIP packet has previously been blanked.

In some embodiments, a timeout period is defined such that if a user has ⅛ rate frames for more than that period, the persistent allocation to that user is released. In this case, the silence period can be quite long so the persistent allocation is deassigned, and reassigned later, for example after a timeout limit.

VoIP Packet Jitter Handling

VoIP packets arrive at random intervals due to delay jitter at the wireline networks. Therefore, there is no guarantee that a VoIP packet will arrive at the layer 2 buffer at every 20 ms boundary, where the persistent resource is assigned.

In some embodiments, to address this problem, a small 'de-jitter' delay is artificially added to every VoIP packet that arrives at the layer 2 buffer such that the probability of a packet available at every 20 ms boundary is above a pre-defined threshold. If there is no packet at a 20 ms boundary, the transmission on that slot is blanked. The blanked resources are allocated to other users.

Three approaches to deliver a packet that arrives after the 20 ms boundary (i.e. late packet) are provided:

Approach 1: Transmit the packet in a lower MCS format intended for a reduced number of retransmission trials. The lower MCS format has a higher likelihood of successful transmission over the reduced number of retransmission trials. In some embodiments, packets arriving after some number of retransmission slots, for example after the second retransmission slot, maybe delayed to the next 20 ms frame.

Approach 2: Delay the packet transmission until the next 20 ms frame. In some embodiments, delayed and current VoIP packets are combined into a composite packet. In other embodiments, the delayed and current VoIP packets are not combined into composite packets.

In some embodiments, persistent allocation is supplemented with additional non-persistent resources for that 20 ms frame; only one ACK/NAK is required from the wireless station for the composite packet. Separate ACK/NAK echoes can then be used for the persistent and non-persistent allocation.

In other embodiments, the composite packet is transmitted using assigned persistent resources by changing the MCS accordingly. This involves the same persistent allocation: one ACK/NAK from the wireless station, and one ACK/NAK echo. The "missed frame" will trigger blind detection of MCS for the composite packet in the next frame.

Approach 3: Delay the packet transmission until resources become available. Packets continue to be sent in sequence without combining multiple voice packets into composite packets. As opposed to approach 2, there is no need to supplement the resource allocation with non-persistent resource. The layer 2 buffer will have a chance to be emptied out during blanked transmission times (i.e. occurrence of ⅛ rate frames).

VoIP Capacity Increasing Schemes

Conventional system frame-synchronize VoIP users to start new packets every 20 ms. This leads to an increasing probability of holes later in the 20 ms frame. This is desirable if there is a lot of non-persistent traffic to schedule, but this limits VoIP traffic.

In a first approach to improving VoIP capacity, a staggered allocation scheme is provided by an embodiment of the invention. VoIP transmission to users begins with equal or similar probability in each slot. Over time, loading per slot will be approximately constant (some user early terminate, others start first transmissions). It is possible to allocate some non-persistent resources to VoIP temporarily in case of resource emergency. This supports "over-loading" without having to drop or delay packets. A specific example is illustrated in FIG. 1. Note that re-transmissions preceding the "$1^{st}$ $tx_1$ new packet" are in respect of a previous packet. In FIG. 1, the OFDM resource that is being allocated is a 20 ms frame. Time is shown in the horizontal direction. In the vertical direction, there is a plurality of sub-carriers, not shown. Each 20 ms frame 300 is divided into slots 302,303,304,305. In the illustrated example, each frame contains four slots. Four different user groups are defined referred to as User Group 1 306, User Group 2 308, User Group 3 310 and User Group 4 312. The users of the User Group 1 306 have their first sub-packet transmissions occurring during the first slot 302. The users in User Group 2 308 have their first sub-packet transmissions occurring during the second slot 303. The users in User Group 3 310 have their first sub-packet transmissions occurring during the third slot 304. The users in User Group 4 312 have their first sub-packet transmissions occurring during the fourth slot 305. The re-transmission resources for the users groups other than User Group 1 306 will rollover into the frame in a cyclic manner. A first transmission and re-transmissions for a given wireless station or group of wireless stations occur on the same interlace in each respective slot of the frame.

In a second approach to improving VoIP capacity, users are divided into different classes with different numbers of maximum HARQ retransmissions. For example, users with more reliable CQI estimates can be grouped together, and allowed fewer re-transmissions.

Figure 2:
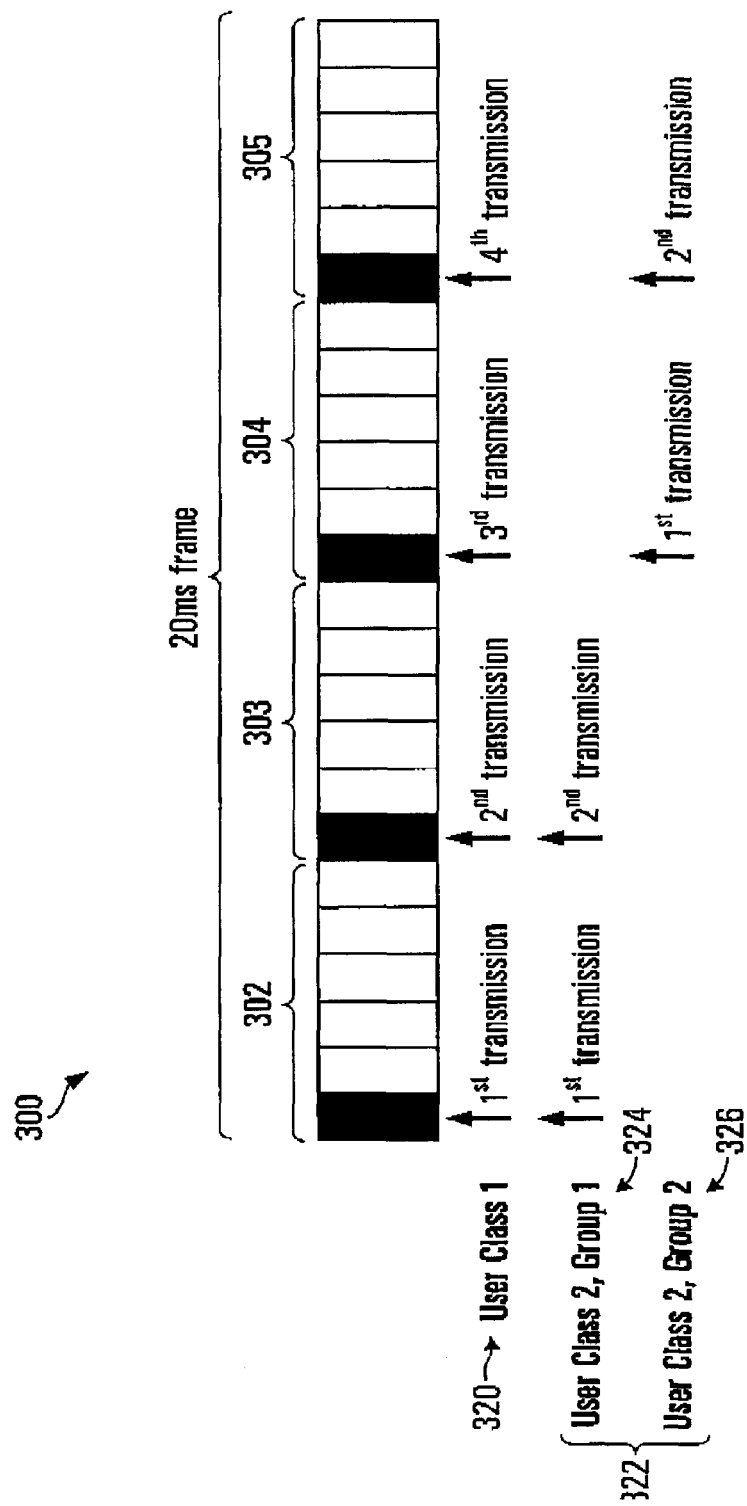

In a specific example shown in FIG. 2, two classes are defined, although any number N of classes is possible. Then, each VoIP frame is divided into multiple sub-frames. This might for example involve dividing 20 ms frame into two 10 ms sub-frames (or four 5 ms). In the example of FIG. 2, the same frame structure as was described above for FIG. 1 is used. A first user class is indicated at 320. A second class of users is indicated at 322, and this includes two sub-groups 324,326. The users in the first class 320 are allowed an original packet transmission and three re-transmissions. The users of the second class 322 are allowed an original transmission and a single re-transmission. The sub-frame for this example consists of the first two slots 302,303 used for user class 2, group 1 324 and the second sub-frame consists of the third and fourth slots 304,305 that are used for user class 2, group 2 326. Within any of these users groups, the above-discussed approach of distributing the first sub-packet transmission across the slots utilized for the class can also be used.

In some embodiments, a high speed user (more generally a user with a lower quality channel) uses a 4-transmission 20 ms frame for increased reliability.

In some embodiments, a low speed user (more generally a user with a better quality channel) uses a 2-transmission 10 ms frame as CQI feedback is more reliable.

In some embodiments, a user does not need to know what class it belongs to. If a packet fails after two transmissions, the user will send a NAK. If this user is intended to have two transmissions, the BS sets the corresponding bit on the HARQ ACK-NAK-echo to 'ACK'.

The receiver will then know its resources have been temporarily suspended for the second half of the frame.

In a third approach to increasing VoIP capacity, for some VoIP users, larger frames are allocated in multiples of 20 ms frames.

In a specific example, for a 40 ms case: one packet is delayed ~20 ms and/or two packets are combined to form composite packet. Composite packets can have up to eight transmissions, rather than four for a 20 ms frame size. A benefit of this implementation is a larger number of re-transmissions are possible, which is useful for cases when CQI estimates are unreliable. Also, in some embodiments, this implementation provides improved handling of packet jitter.

Figure 3:
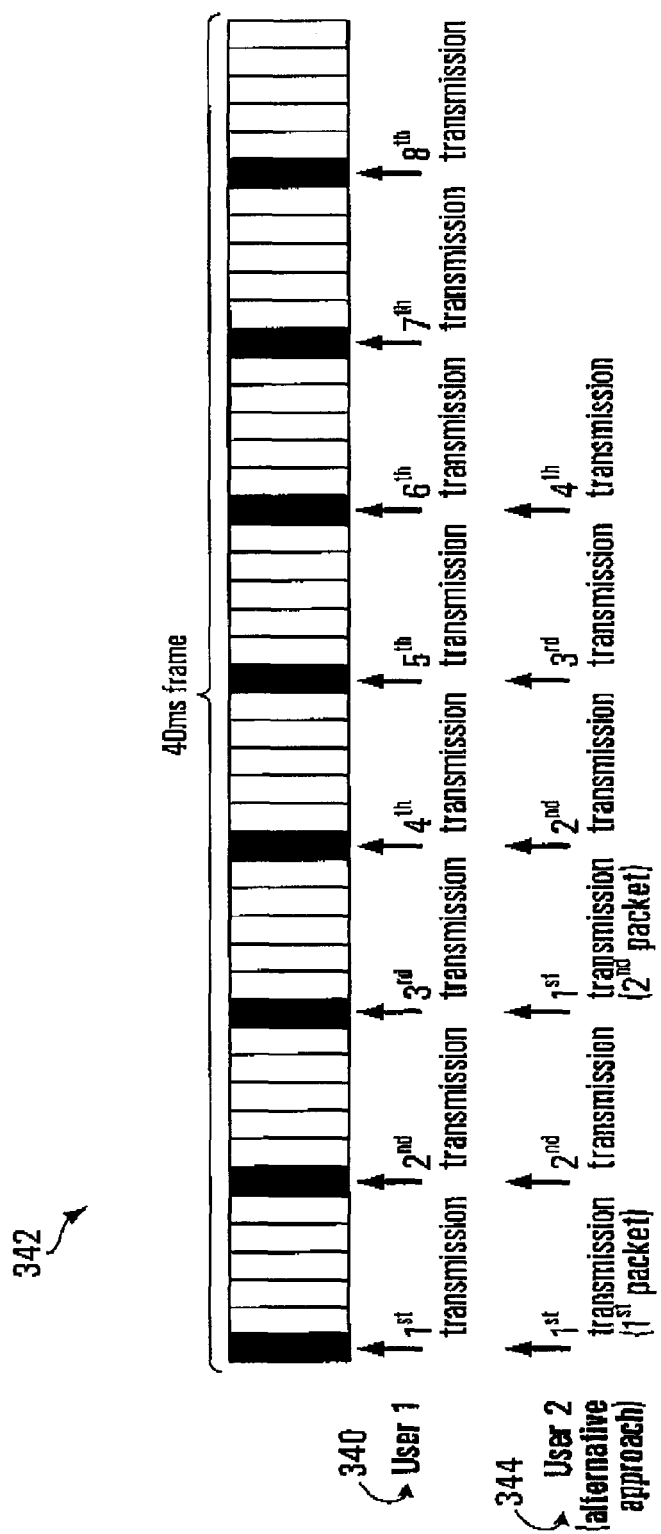

A specific example of this is indicated in FIG. 3 for user 1 340. In this case, a 40 ms frame 342 has been defined that contains eight slots. The first slot is used for the first transmission for the user 340 and then there are seven available slots for re-transmission. Each packet is a composite packet formed of two packets for the user. More generally, any number of packets can be combined into a composite packet and any number of re-transmissions for the composite packet can be allowed. Of course if too many packets are combined in a composite packet, the delay experienced by earliest of those packets may become unacceptable.

In an alternative, the transmission of consecutive packets is such that the second packet is transmitted immediately (i.e. next slot in the same HARQ interlace) following the successful reception of the first packet (i.e. ACK returned). The number of re-transmissions for each packet can be limited. A specific example is shown in FIG. 3 for a user indicated at 344. For this user, a first packet transmission has taken place in the first slot and a re-transmission in the second slot. Immediately following the re-transmission, which is assumed to be successful for this case, the second packet is transmitted using the third slot. Up to four re-transmissions are made available for the re-transmission of either the first or second packet in this case. The resources for user 2 344 that would have been allocated in the seventh and eighth slots can be re-allocated to other users.

Implicit Indication of MCS by Unique Mapping of MCS to Resource Allocation Size

VoIP may use one of several modulation and coding schemes (MCS). In some embodiments, the MCS levels are chosen such that there is a unique mapping of MCS to physical resource allocation size. Assuming this unique mapping is known to the receiver, the MCS can be uniquely determined by the receiver from the size of the physical resource assigned to that transmission. The following is a specific example where one DRCH (dedicated resource channel, an example of a minimum resource allocation unit) is assumed to be 81 logical tones (i.e. sub-carriers may or may not be contiguous, may or may not be part of a single OFDM symbol) and a full rate packet carries 208 bits:

QPSK, code rate ⅓—4 DRCH (more generally a first resource allocation size)
QPSK, code rate ⅔—2 DRCH (more generally a second resource allocation size)
16 QAM, code rate ⅔—1 DRCH (more generally a second resource allocation size).

The MCS is determined at the receiver by knowing the number of DRCH's assigned to this transmission. The allocation size will be made available to the receiver, through signalling, or some other manner.

In some embodiments, the resource allocation and modulation schemes do not change for ½, ¼ and ⅛ (when applicable) transmissions so the same mapping applies.

A benefit is that the MCS does not have to be signalled. The unique mapping of MCS to physical resource allocation size for VoIP that enables the implicit indication of MCS from the combination index (a method of control signalling) is described in U.S. Patent Application No. 60/748,555 filed Dec. 8, 2005 incorporated by reference in its entirety and in U.S. Patent Application No. 60/792,486 also incorporated by reference in its entirety.

Specific OFDMA frame sizes, slot sizes, OFDM symbols, coded frame rates, HARQ re-transmission schemes have been described for the purpose of example only.

FURTHER RESOURCE ASSIGNMENT EXAMPLES

In some embodiments, during a given slot, a user must be able to determine if it is being assigned resources for transmission or re-transmission of a VoIP packet. The user needs to be able to determine which resources have been assigned to it.

In some embodiments described above, the resources are re-packed to prevent holes within the resource block. However, a user assigned resources still needs to be able to determine where its resources are located after each re-packing process (every slot).

In embodiments in which a persistent allocation is used, resources are in a fixed location for a user's first transmission. A user will know exactly where its resources are for the first HARQ transmission of a packet which is beneficial as it does not require signalling. Re-packing should not affect this resource assignment for first HARQ sub-packet transmission, and all users will need to be able to understand the re-packing mechanism when persistent allocation is used.

Bitmap

In some embodiments, a user bitmap is employed. The user bitmap indicates if resources have been assigned to a user, and is structured such that the relative users' positions in the bitmap are associated with some resource allocation. In some embodiments, the relative users' positions in the bitmap are also associated with "user groups". That is to say, each position in the bitmap is associated with a user group, and the users belonging to a specific group can be uniquely identified by their position in the bitmap.

Figure 9:
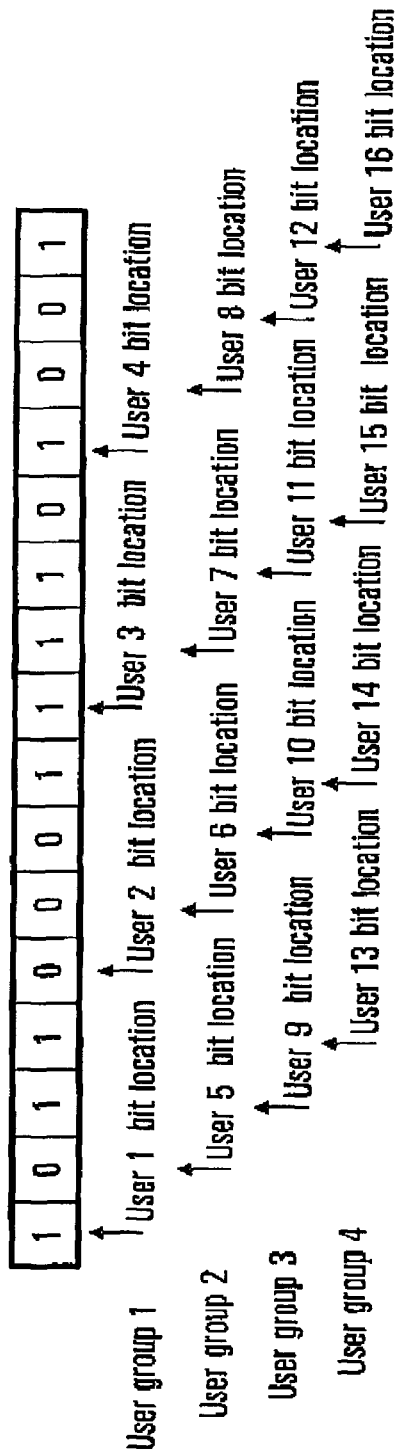

A specific example is illustrated in FIG. 9. Here, there is a 16 bit bitmap containing a respective bit for each of 16 users. Each "user group" consists of the set of positions that are separated by four bit positions in the bitmap. Thus "user group 1" is positions 1,5,9,13; "user group 2" is positions 2,6,10,14 and so on. More generally, the allocation of bitmap positions to user groups can be arbitrarily defined.

In some embodiments, a "user group" is defined as a group of users who have their first HARQ sub-packet transmission occurring in the same slot within a HARQ interlace as described in detail with reference to the example of FIG. 1.

The value at a position in the bitmap, indicates whether or not a resource has been assigned to the user associated with that bitmap position. The bitmap can contain positions for all or some users in the system. There may be multiple bitmaps for different sets of users, each bitmap having associated groups.

In some embodiments, users are assigned to the same bitmap on the basis of commonality among factors such as long-term channel condition, modulation and coding scheme (MCS), resource allocation size, etc.

In the context of embodiments where the spreading of the first sub-packet transmissions for multiple wireless stations across a VoIP frame is performed, there will be a number of positions that the first sub-packet can be. In some embodiments, bitmap positions for different users in the same group are separated by the total number of possible start points for a given HARQ interlace. For the example of FIG. 9, this would be true for an implementation in which there are four positions for first sub-packet transmission (consistent with the example of FIG. 1).

In some embodiments, the separation is equal to the total number of transmissions allowed per packet. In some embodiments, the number of transmissions allowed per packet is the same as the number of start positions for first sub-packet transmission.

The bitmap described above is for a single interlace, however a single bitmap can have information for more than one interlace. Each interlace may refer to a respective slot, of a set of grouped slots. In this case, the users belonging to the same group can be separated by a total number of possible start positions per interlace multiplied by a number of interlaces assigned by the bitmap.

Such a bitmap can also be used to indicate that a user's resources are in use. The bitmap supports re-packing of resources even with persistent allocation. Detailed examples are given below.

Addition of New Users to Bitmap

In some embodiments, new users are added at the end of the bitmap (and vacant spots in bitmap) in such a manner as to ensure uniform distribution of users across groups and to allow the assignment of a user to a group without additional signalling.

Non-Persistent Assignment Using Bitmap

In some embodiments, a bitmap is used to indicate non-persistent resource assignments. A bitmap is created, with the bitmap indicating which users will be assigned resources in the slot. This step is being described first, but the order is not important.

In some embodiments, the non-persistent assignment is done groupwise. In the event groups are not defined, the following approach can be used with all the users in one group.

Users in a first "user group" are processed first for the purpose of resource allocation. The first user group can be arbitrarily defined. In some embodiments, the first user group contains users that are to receive a first HARQ sub-packet transmission in the current slot.

The resources are allocated in a predetermined manner to users that are to be scheduled as indicated by the bitmap. The predetermined manner is known to the transmitter, and is known to the receiver such that any receiver can read the bitmap and determine if and where its allocated resource is. In the examples that follow, first, second . . . Nth resources are allocated. These resources are known to receivers such that if a given receiver is allocated the first resource, it knows what that is. Note that the sequence "first", "second", "Nth" does not necessarily imply any temporal and/or frequency relationship between the resources.

The following allocation method is described from the perspective of a receiver reading the bitmap. Of course, the transmitter is responsible for generating the bitmap, and for transmitting packets to the appropriate users using the resources thus allocated. The bitmap is read by starting at the position of the first user in the first user group (for example the user group that is receiving its first HARQ sub-packet transmission in the current slot). If the bitmap indicates that a resource is to be allocated to the first user, then the first resource is allocated to this user. If the bitmap does not indicate a resource allocation to the user, the first resource is available to be assigned to the next user.

The next position read is that of the second user belonging to that user group. If the first resource was assigned via the bitmap in the previous step, the next resource (second) is assigned to this user. If resources were not assigned to the first user, than the second user is assigned the first resource.

Each user from this first "user group" is assigned resources in this manner. Each user, that is assigned resources via the bitmap, is assigned the next available resource.

Users from the next group are assigned resources in the manner as the first. Those users assigned resources will occupy the "next" resources after the last assigned resources. This process is continued until all users from all groups have been processed.

Figure 10:
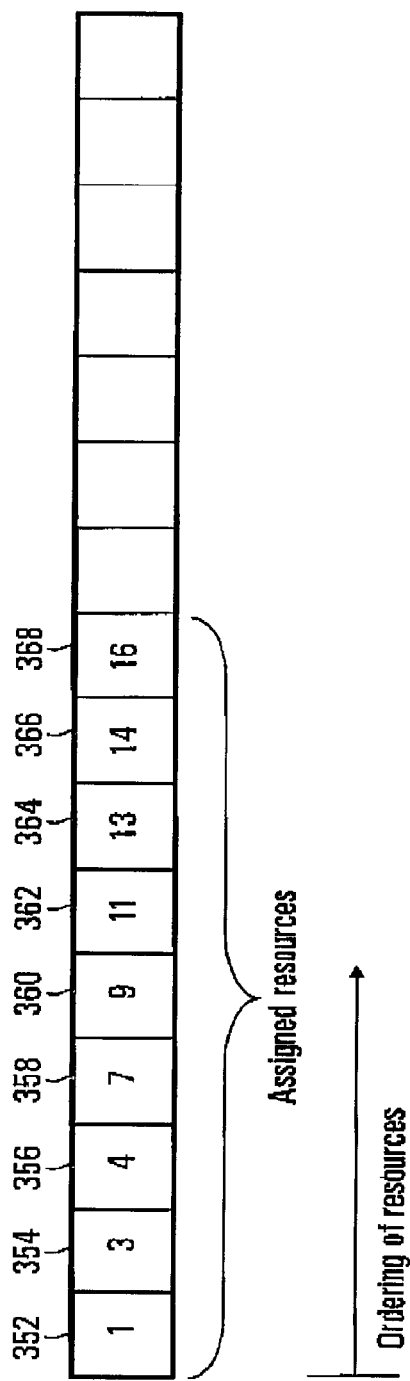

FIG. 10 shows a first example of resource assignment for the bitmap of FIG. 9, where numbers indicate which resource has been assigned for the case where the current slot is a slot in which users of "user group 1" are receiving its first HARQ sub-packet transmission. For user group 1, assumed to include users 1, 2, 3 and 4, it can be seen from the bitmap of FIG. 9 that only users 1, 3 and 4 are allocated resources. Thus, in the assignment of resources shown in FIG. 10, the first, second and third resources 352,354,356 are allocated to users 1, 3 and 4 respectively. Similarly, for the second user group, FIG. 9 shows that only user 7 is to be allocated a resource. Thus, in FIG. 10 in the ordering of resources, the fourth resource 358 is allocated to user 7. The bitmap of FIG. 9 shows that for user group 3, users 9 and 11 are to be allocated resources. Thus, in FIG. 10, resources 360,362 are allocated to users 9 and 11 respectively. Finally, in user group 4, the bitmap of FIG. 9 shows that users 13, 14 and 16 are to be allocated resources. The resource mapping of FIG. 10 shows that the seventh, eighth and ninth resources 364,366,368 are allocated to users 13, 14 and 16 respectively.

Figure 11:
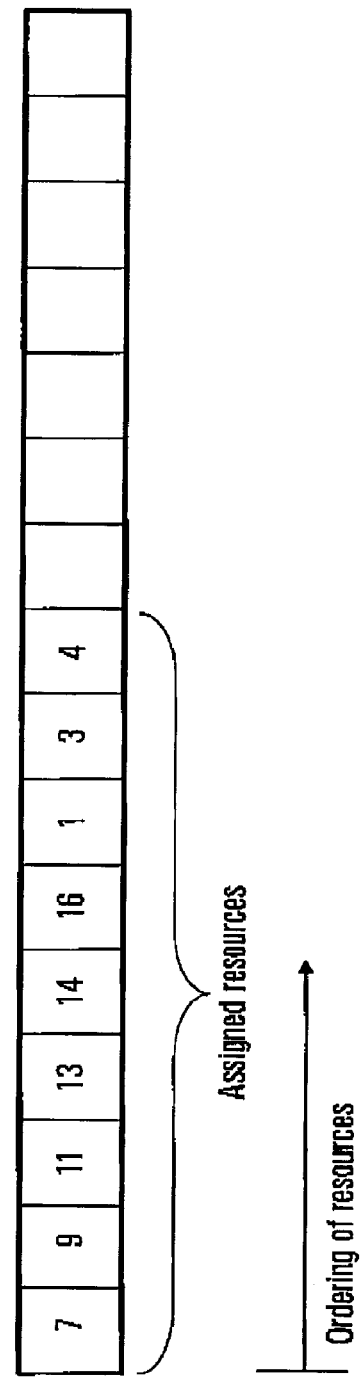

FIG. 11 shows a second example of resource assignment for the bitmap of FIG. 9, where numbers indicate which resource has been assigned for the case where resource assignment starts with the users of user group 2, for example if they are receiving their first HARQ sub-packet transmission in the current slot.

Having generated the bitmap, and performed the allocations, the following is an example of a specific method of users determining their non-persistent assignment from the bitmap thus transmitted.

For a user in the user group receiving its first HARQ sub-packet transmission, the user determines whether resources have been assigned to it via the bit indicator at the position corresponding to it. If resource assignment is indicated by the bitmap, the user's resource location is determined as follows: the bitmap is read starting from the position of the first user in the group receiving its first HARQ sub-packet transmission, followed by the next user in that group, and so forth until the position corresponding to the given user is reached. A user in this group reads the bitmap noting the number of resources assigned before the user's position in the bitmap, given the method of reading the bitmap described. Given the resource assignments to other users in bitmap positions before it, the user identifies its resources as the next resource segment immediately following those already assigned.

For a given user in any other group, the user determines whether resources have been assigned to it via the bit indicator at the position corresponding to it. If resource assignment is indicated by the bitmap, the user's resource location is determined as follows: A user in a given group reads the bit map noting the number of resources assigned before the user's position in the bitmap, given a certain method of reading the bitmap. The bitmap is read starting from the position of the first user in the group receiving its first HARQ sub-packet transmission, followed by the next user in that group, and so forth until all users in the that group have been read. The next position read is that of the first user in the next group, and follows as before for all users in this group. The bitmap is read in this fashion until the position for the given user is reached. Given the resource assignments to other users in bitmap positions before it, the user identifies its resources as the next resource segment immediately following those already assigned.

Persistent Assignment Using Bitmap

In some embodiments, the bitmap is used to perform persistent resource assignment. At the transmitter, a bitmap is created, with the bitmap indicating which user will be assigned resources in the slot. Users in the "user group" that is receiving its first HARQ sub-packet transmission in the current slot are processed first. If a user in this group is to be assigned resources, the user is assigned in a known location associated to its order in the group, which is not dependent or whether other users in the group have been assigned resources. For example, the $3^{rd}$ user in the group might be assigned the $3^{rd}$ resource segment, regardless of whether or not the $2^{nd}$ resource was assigned to a user in this group. In other words, these resource positions are not re-packed as in the previous non-persistent resource assignment example.

Users from the next "user group" are now assigned resources. Each user that is assigned resources via the bitmap is assigned to the next available resources starting with any available resource not assigned to the first group. This process is continued until all users from all groups have been processed. In other words, the packing approach described previously is applied for groups other than the first group.

In the case of persistent assignment, each user in the user group receiving its first HARQ sub-packet transmission has a known location for its resources as described in the resource allocation method.

The user can determine whether resources have been assigned to it via the bit indicator at the position corresponding to it, if the bitmap is available. If the bitmap is unavailable due to error or otherwise, users in this group do not have to read the bitmap as resource allocation is known, and the user will assume it has been assigned resources in this location as the default operation. The user may unsuccessfully try to decode packet intended for a different user. Even though it is not required, users in this group may read the bitmap for other purposes such as tracking resource allocation of other users.

For a given user in any other group, the user determines whether resources have been assigned to it via the bit indicator at the position corresponding to it. If resource assignment is indicated by the bitmap, the user's resource location is determined. A user in a given group reads the bit map noting the number of resources assigned before the user's position in the bitmap, given a certain method of reading the bitmap. The bitmap is read starting from the position of the first user in the group receiving its first HARQ sub-packet transmission, followed by the next user in that group, and so forth until all users in the that group have been read. The next position read is that of the first user in the next group, and follows as before for all users in this group. The bitmap is read in this fashion until the position for the given user is reached. Given the resource assignments to other users in bitmap positions before it, the user identifies its resources as the next resource segment immediately following those already assigned.

A specific example of this type of persistent resource assignment, again assuming the bitmap of FIG. 9, is shown in FIG. 12 for the case where the current slot it the slot in which the users of "user group 1" are scheduled first, for example if they are receiving their first HARQ sub-packet transmission during the current slot. In this example, the users of group 1 are assumed to be persistently assigned the first four resources 370,372,374,376. However, as indicated by the bitmap of FIG. 9, only users 1, 3 and 4 are actually to be allocated resources, and as such they are allocated the first, third and fourth resources 370,374,376. The second resource, 372 is available for re-assignment to another user. The allocation continues with the next user group namely user group 2, and the first user to be allocated a resource there is user 7 and as such that user is slotted into the second resource 372. The remaining resources are allocated as described previously for non-persistent allocations.

A specific example of this type of persistent resource assignment, again assuming the bitmap of FIG. 9, is shown in FIG. 13 for the case where the current slot it the slot in which the users of "user group 2" are scheduled first, for example if they are receiving their first HARQ sub-packet transmission during the current slot. For this example, for user group 2, only user 7 is to be allocated resources and its persistent allocation will be in third resource 374. The remaining resources persistently allocated to the second group, namely resources 370,372,376 are available for re-assignment to non-persistent users of the next group.

More generally, if the bitmap indicates that a receiver is to receive a resource allocation, a receiver determines from the bitmap the resources allocated to persistent receivers and to previous allocations to non-persistent receivers, and processes a next resource that has not been allocated as the non-persistently allocated resource for that receiver.

An additional example order of reading the bitmap in is to first assign resources to the user group having their first HARQ transmission opportunity. If the resources are persistently assigned for the first transmission they will be in a known location. The remainder of assignments are processed observing what assignments are available or not available based on the assignments for all users in the user group that is having its first HARQ transmission, and then assigning resources in sequential order from the beginning of the bitmap. If an assignment is indicated, a user is assigned the first available resource.

In some embodiments with persistent assignment of a first HARQ transmission, the number of possible start points for transmitting a new packet, or interlace offsets, may be different from the number of HARQ transmissions of a packet. That is, even though an interlace in a particular slot is identified as a possible start point for a first transmission, the interlace may be used for further re-transmissions of sub-packets if the packet being transmitted has not been properly received. An example is described below in detail with reference to FIG. 30. In some cases, more than one transmission of a packet may be persistently assigned. The frequency of the persistent assignments may be equal to the number of VoIP interlace offsets.

As an example, if the number of VoIP interlace offsets is three, and the number of HARQ transmissions is five or six, than the first and fourth transmission can be persistently assigned.

Addition of Users to the Bitmap

In some embodiments, users are added to the bitmap in ways that do not impact the bitmap positions of users who have previously been assigned a position. In some embodiments, new users can be added to the end of the bitmap. In embodiments in which the bitmap positions within each group are separated by a spacing equal to the number of groups, this will result in a uniform distribution of users over the different first HARQ sub-packet transmission positions. In some embodiments, users can also be added into vacant bitmap positions created by a user leaving (or being deleted from) the bitmap. This does not effect bit map positions of existing already assigned users that are not being deleted.

With the user group definition presented above, a user can therefore be assigned to a user group, strictly from their position in the bitmap without the requirement for additional signalling.

Temporary Allocation of Resources to Users Who are not Part of the Bitmap

Some embodiments allow for the temporary allocation of resources to receivers that are not part of the bitmap. The base station may determine a particular receiver identified in the bitmap does not require resources in a given slot. In this case, the resources can be allocated to a receiver that is not part of the bitmap. This receiver can be signalled by some other method such as another bitmap, another grouped control, unicast control channel, or some other mode.

The receiver can determine the location of the allocation by reading the bitmap in the manner described for receivers who are part of the bitmap or through the use of another form of signalling with channel identification such as combination index, or node ID, etc.

The bitmap will indicate that the resource has been assigned, so that users reading the bitmap will know it is occupied by some other user and factor that in accordingly in determining their own resource allocations. The user whose bitmap position is associated with the resource in this slot will unsuccessfully attempt to decode the transmission.

Full Persistent Resource Allocation

In some of the embodiments described, persistent allocation of resources for the first transmission is provided for at least some of the users so that such users will not have to successfully receive the bitmap in order to receive the first HARQ transmission.

In another embodiment, for some users, persistent assignment is provided for the first transmission and subsequent HARQ retransmissions. This will be termed 'full persistent allocation'. This feature can be used to support some users with poor channel conditions. Furthermore, in some embodiments users receiving single frequency network (SFN) transmissions, possibly during soft-handoff with other sectors or cells, are also be supported using this feature.

Combined Bitmap for Fully Persistent Users and Persistent First Transmission Users First Example In some embodiments, a first subset of users are fully persistent, and a second subset, possibly all remaining users, have a only their first allocation a persistent first allocation.

In an example of full persistent allocation using a combined bitmap, the users with full persistent allocation for all HARQ transmissions are designated as a special user group in the bitmap. The users' positions in bitmap could be all at the beginning, or distributed throughout the bitmap in some known way. In some embodiments, a separate bitmap is employed. The locations in the bitmap are known for all other users to see. In some embodiments, the number of the first subset is fixed, and in known locations, so that all users can tell which bits in the bitmap relate to full persistent resource allocations.

In some embodiments, the full persistent allocation users are further segmented into groups that have different HARQ sub-packet start points, as described for other embodiments above. With this approach, users are distributed across multiple groups so that a different group starts a packet transmission at a different slot in the same interlace. For full persistent allocations, the resource allocation is a fixed and known resource allocation for each HARQ transmission, and the resource location is unique for each user.

In some embodiments, SFN can be supported for all HARQ transmissions by assigning the same resources to a single receiver across multiple sectors or cells.

For the remaining user groups, only the first HARQ transmission is a persistent assignment. Assignments for this case can be the same as detailed above and involve persistent first transmission allocation for each group in a different slot of the interlace. Re-packing of other users groups in free resources can be performed. Persistent locations are fixed for the users receiving their first transmission.

In some embodiments, the resource locations for the first transmission persistent allocation are immediately after the resource locations of the users with persistent allocation for all HARQ transmissions. More generally, the persistent allocations simply need to be located in a manner known to both the transmitter and receiver.

The unused (not allocated) resources for one or both of a) the users with persistent allocation for all HARQ transmissions and b) the users with persistent allocation for the first HARQ transmission can be re-packed and reassigned to other users. Users can determine what resources are not assigned by reading the bitmap, and deriving the location of the free resources.

Combined Bitmap for Full Persistent Users and Persistent First Transmission Users Second Example In a second example of the use of a combined bitmap for full persistent users and persistent first transmission users, a cyclic shift within full persistent resources is employed.

More generally, for any of the embodiments described herein, a cyclic shift can be performed for any resource allocation, meaning that the location of a resource associated with particular signalling will move cyclically through the available resource. More generally still, for any of the embodiments described herein, an arbitrary shift of the resource allocation can occur, so long as the shift is known to both the transmitter and receiver.

In an example of full persistent allocation using a combined bitmap, the users with full persistent allocation for all HARQ transmissions are designated as a special user group in the bitmap. The users' positions in the bitmap could be all at the beginning, or distributed throughout the bitmap in some way. In some embodiments, a separate bitmap is employed. The locations in the bitmap are known for all other users to see.

In some embodiments, the full persistent allocation users are further segmented into groups that have different HARQ sub-packet start points, as described for other embodiments above. With this approach, users are distributed across multiple groups so that a different groups starts a packet transmission at a different slot in the same interlace. The resource allocation is a fixed and known resource allocation for each HARQ transmission, and the resource location is unique for each user.

In some embodiments, SFN can be supported for all HARQ transmissions by assigning the same resources to a single receiver in multiple sectors or cells.

For this embodiment, the location of the full persistent resource shifts in each slot within a set of resources for this user type. For example if a set of four resources 1,2,3,4 (not necessarily contiguous) have been allocated for full persistent users, then the mapping could be:

slot 1: user 1→resource 1
user 2→resource 2
user 3→resource 3
user 4→resource 4 slot 2: user 1→resource 2
user 2→resource 3
user 3→resource 4
user 4→resource 1
slot 3: user 1→resource 3
user 2→resource 4
user 3→resource 1
user 4→resource 2
slot 4: user 1→resource 4
user 2→resource 1
user 3→resource 2
user 4→resource 3

For this example, it is assumed the users all have their original sub-packet transmission during slot 1, and that slots 2,3,4 are available for retransmissions if necessary. Resource locations are known for each user and each HARQ transmission, however the locations cyclically shift with the HARQ. This does not require the fully persistent users to read the bitmap as locations are known for each HARQ transmission.

In some embodiments, users with persistent assignment for all HARQ transmissions, but who are receiving their first HARQ sub-packet transmission, are assigned the 'first' resources in a given slot, but in any case persistent for this example.

In some embodiments, users receiving their second HARQ sub-packet transmission in the given slot are assigned the 'next' set of resources, etc, but in any case persistent for this example.

It is to be understood that while cyclic shift of resources is described in this embodiment, other resource shifting patterns can be used provided they are known at the receiver and transmitter.

For the remaining user groups, only the first HARQ transmission is a persistent assignment. Assignments for this case can be the same as detailed above and involve persistent first transmission allocation for each group in a different slot of the interlace. Re-packing of other users groups in free resources can be performed. Persistent locations are fixed for the users receiving their first transmission.

In some embodiments, the resource locations for the first transmission persistent allocation are immediately after the resource locations of the users with persistent allocation for all HARQ transmissions.

In some embodiments, SFN can be supported for the first HARQ transmission by assigning the same resources to a single receiver across multiple sectors or cells for the first transmission.

The unused (not allocated) resources for one or both of a) the users with persistent allocation for all HARQ transmissions and b) the users with persistent allocation for the first HARQ transmission can be re-packed and reassigned to other users. Users can determine what resources are not assigned be reading the bitmap, and deriving the location of the free resources.

Multiple Resource Assignment to a Single Persistent Resource

In some embodiments, multiple users may be assigned the same resources during persistent allocation. In these embodiments, the persistent resource for each user is known, but is not unique. Only one user will receive transmissions on this resource in a given slot.

Each of the users which have the same persistent resource have an individual entry in one or more assignment bitmaps. One bitmap is assumed in the following examples.

The bitmap assigns persistent resources from some start point to users based on bitmap position and user groups. Multiple positions in the bitmap refer to the same resource.

For example, in some embodiments a first set of bitmap positions refer to set of resources starting from a start point, and then a second set of bitmap positions that may follow the first set refers to the same set of resources starting again from the start point. In this manner, multiple bitmap positions can refer to the same resource. The point in the bitmap where this occurs can be signalled with any useful timing, for example often, occasionally. Alternatively, the point in the bitmap where this occurs may be fixed and/or derived from system parameters.

The bitmap will indicate to other users which of the multiple users occupies the resource. Each of the multiple users can determine if the transmission on the resources is their own by a) attempting to decode the resources and failing (and possibly continuing to do so for all re-transmissions) or b) reading the bitmap and determining the resources are assigned to another user. A bitmap may not be necessary for these users. However, the bitmap will be useful for other users as detailed below.

Users that are not receiving a persistent assignment in the slot can be assigned a persistently assigned resource if it is not assigned to any of the persistent users. For these users, the resource location is derived from the bitmap. For example, unused persistently assigned resources are allocated in sequence to users that are not receiving a persistent assignment. The same or a different bitmap may be used to signal resource allocation to these additional users. After all the persistent assignments are used up, additional non-persistently assigned resources may be allocated non-persistently, again using the bitmap.

In some embodiments, the same resource can be persistently allocated to multiple users for a first HARQ transmission. In some embodiments, the same resource can be persistently allocated to multiple users for some number of HARQ transmissions, possibly all HARQ transmissions.

Additional Comments

Resources are ordered in some manner so that it is known which resources the "first" and "next" resources. This order is arbitrarily defined. For example, the first resource maybe known or signalled by some other method. Resources refer to physical or logical resources, and can be distributed or concentrated in any manner Each resource can consist of one or more logical resource elements. The size of each resource can be pre-determined and known for all users, or associated with this bitmap (as there may be other bitmaps associated with other parameters in the same system), or determined by another bitmap, or signalled in some other manner Resources do not have to be all the same size.

It can be seen that a starting point for reading the bitmap changes with each slot, as in different slots a different group will receive its first HARQ sub-packet transmission. Alternatively, it is also possible to transmit the bitmap in such a manner that it always starts with the bit-position of the first user in the "user group" that will receive its first HARQ sub-packet transmission in the given slot.

For most receivers, the process for reading the bitmap at a receiver starts by determining if resources have been assigned to the receiver, and then determining what resources have been assigned to other users. Alternatively, the receiver may read the bitmap, determining resource allocation to other receivers prior to determining if resources have been assigned to it.

The bitmap can also be interpreted in other ways and associated with resource allocation at the transmitter and the receiver so long as allocation is consistent with the group definition, e.g. persistent vs. non-persistent.

In some embodiments, the relative bitmap positions of users may not be associated with "users groups". The assignment of resources to users may follow an order not related to user groups. Assignment may be consistent with persistent with or non-persistent assignment, whichever appropriate, for a given user in a given slot.

The same bitmap is used for many of the examples presented above for simplicity. In normal operation the bitmap may change every scheduling period, for example each slot, a slot being a portion of a frame during which the entire content of a VoIP packet can be transmitted.

For non-persistent allocation, the start position and order of reading the bitmap is arbitrary provided that both receivers and transmitter have knowledge of the order. The allocation or placement of any resource can be changed as often as every scheduling period.

For persistent allocation, the order of reading the bitmap is arbitrary provided that 1) both receivers and transmitter have knowledge of the order 2) users that are receiving their first HARQ sub-packet transmission receive allocation in a known location. The allocation or placement of any resource can be changed as often as every scheduling period.

The creation, reading, interpretation and/or deviation of the bitmap is arbitrary so long as the transmitter and receiver are aware of at least part of the process and the methods of persistent and/or non-persistent allocation, whichever may apply, are followed.

In some embodiments, a user can be assigned a persistent resource for one or multiple HARQ transmissions, and a non-persistent resource indicated by the assignment bitmap for those HARQ transmissions which are not assigned persistent resource.

As an additional example of bitmap organization, each user group may occupy a set of consecutive bitmap positions. The first set of positions may be bitmap positions that correspond to users in user group 1, the next set of positions may correspond to user group positions, and so on.

In some embodiments, the organization of the bitmap positions may be changed as often as every slot.

The separation of users belonging to the same user group in the bitmap is arbitrary and does not need to be regular, so long as the positions are understood by the transmitter and receivers.

In some of the described embodiments, a persistent allocation is provided only for the first HARQ transmission. In other embodiments, persistent allocation is provided for more than just the first HARQ transmission, optionally all of the HARQ transmissions for some or all receivers.

In some embodiments where persistent allocation is used for at least some HARQ transmissions for the purpose of SFN across sectors or cells, each sector may use identical resource allocation for at least some HARQ transmissions for these users so that a composite signal from at least some of the sectors or cells is received on the allocated resource at the receiver.

In some embodiments that include persistent allocation for one or more HARQ transmissions, it is possible that one or more groups can have their first HARQ sub-packet transmission in a given slot. The sub-division of these groups for services (possibly SFN) or classes is arbitrary. Each of these persistently allocated groups can be allocated one of the 'first' sets of resources (contiguously, or otherwise), followed by the re-packing and assignment of unassigned or 'free' resources to other users in that slot.

As a specific example, in a configuration with three possible first HARQ transmission start positions, a bitmap may contain five user groups. Three user groups may be for wireless station with persistently allocated resources for the first HARQ transmissions, with each group corresponding to a different start position. The other two may be for wireless stations without persistent assignment for any HARQ transmission. The groups without persistent assignment may or may not be associated with a particular start point for the first HARQ packet transmission.

Various other specific examples will now be presented with reference to FIGS. 14 to 18.

FIG. 14 shows an example of non-persistent assignment using a sequential reading of bitmap. The resource assignment is a based on the bitmap of FIG. 9. Numbers indicate which users have been assigned. Again, the assumption is that the current slot is the slot in which "User group 1" is receiving its first HARQ sub-packet transmission.

FIG. 15 is another example of non-persistent assignment using a sequential reading of bitmap. Resource assignment is again based on the example bitmap on FIG. 9. Numbers indicate which users have been assigned. The current slot is the slot in which "Users group 2" is receiving its first HARQ sub-packet transmission. However, in this case the sequential reading starts with user 1 with the result that the bitmap is the same as FIG. 14.

Figure 16:
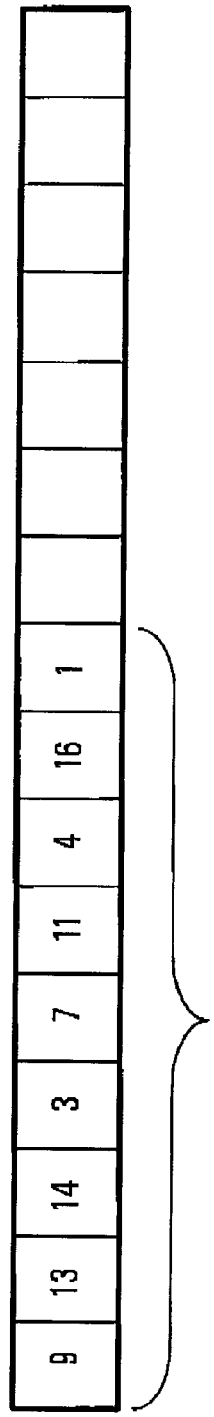

FIG. 16 shows an example of non-persistent assignment using sequential reading of the bitmap. Resource assignment is again based on the example bitmap of FIG. 9. Numbers indicate which users have been assigned. The current slot is the slot in which "Users group 2" is receiving its first HARQ sub-packet transmission. In this case, the sequential reading starts with user 5. FIGS. 14,15,16 illustrate the arbitrariness of at which user the sequential reading starts.

Figure 17:
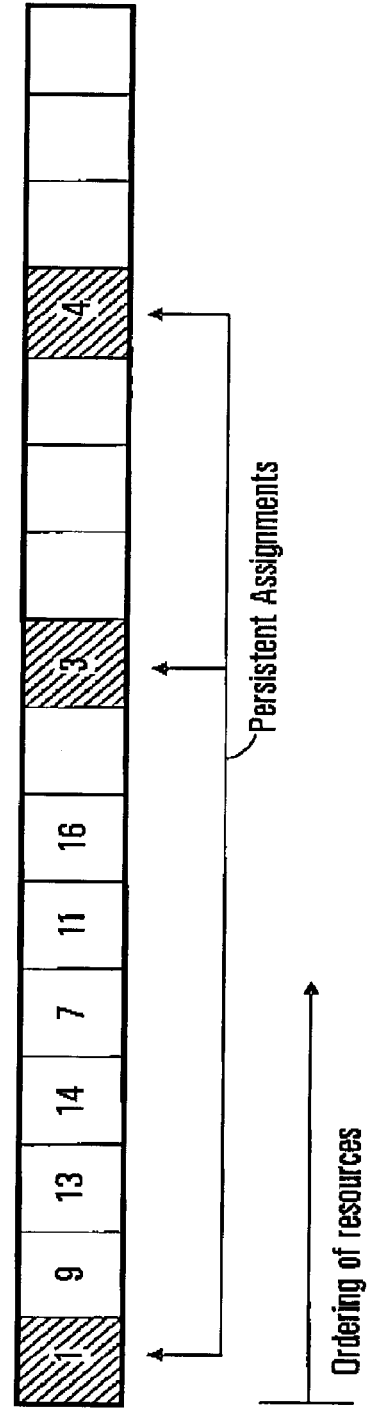

FIG. 17 shows an example of persistent assignment using sequential reading of the bitmap. Resource assignment is again based on the example bitmap of FIG. 9. Numbers indicate which users has been assigned. The current slot is the slot in which "User group 1" is receiving its first HARQ sub-packet transmission. In this example, users 1, 3 and 4 have a persistent assignment and are not re-packed. Persistent assignments that are not used are available for re-assignment (shown as a blank or re-assigned).

Figure 18:
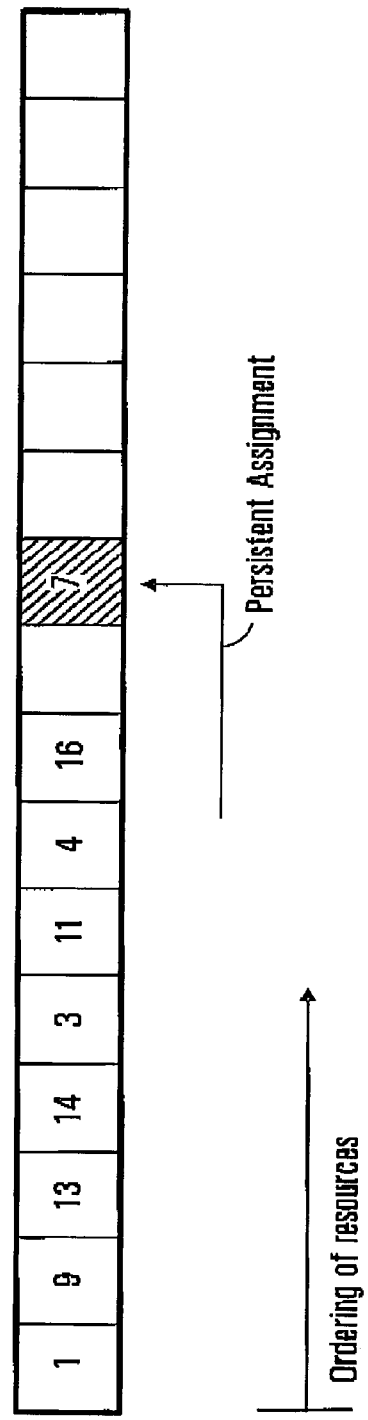

FIG. 18 shows an example of persistent assignment using sequential reading of the bitmap. Resource assignment is again based on the from example bitmap of FIG. 9. Numbers indicate which user has been assigned. The current slot is the slot in which "Users group 2" is receiving its first HARQ sub-packet transmission. In this case, user 7 has a persistent assignment. Persistent assignments that are not used are available for re-assignment (shown as a blank or re-assigned).

Multiple Concurrent Allocations

Some embodiments of the invention can be applied to any grouped resource allocation scheme and includes those signalled by a bitmap, combination index, or other methods. In some embodiments, there are multiple groups that are concurrently being allocated, for example using multiple bitmaps, combination indexes or other methods. In the embodiments described below, multiple bitmaps each associated with a respective set of users are contemplated, but more generally they can be applied to other allocation schemes as well.

For each bitmap, a set of resources is assigned. After allocation and repacking, some of these resources may remain unused. In some embodiments, users from another bitmap can be assigned resources from these unused resources. In some implementations, users that are receiving such unused resources will need to read their own bitmap and the bitmap of others to determine where their resources are. Users allocated in the first such bitmap will only need to read their own bitmap to figure out their resource allocations. Users allocated in the second bitmap will need to be able to read the first bitmap and their own bitmap to figure out their resource allocations and so on until users allocated in the last bitmap will need to be able to read all of the bitmaps to figure out their resource allocations.

In some embodiments, where there are multiple bitmaps being used to allocate resources, the bitmaps are allocated in sequence according to some criterion. For example, the resource allocation may begin with the bitmap associated with users with the worse channel conditions, and then proceed in sequence according to channel conditions until concluding with the allocation for the bitmap associated with users with the best channel conditions. This is advantageous because a user with poor channel conditions will only have to read its own bitmap, and it should be able to read its own bitmap assuming that bitmap is sent with sufficient power, but the same user may not be able to read a bitmap sent for other users as the bitmap for others may have been sent with less power accounting for the better channel conditions being experienced by the other users. Thus, if a user with poor channel conditions is allocated in a later bit map, that user may not be able to read all of the bitmaps required to figure out its resource assignment. Assigning the users with poor channel conditions first avoids this problem.

In some embodiments, where multiple bitmaps are employed, resource allocation of the next bitmap begins with unused resources of the previous bitmap.

In some embodiments, only those users not receiving persistent allocation are repacked into unused resources of another bitmap.

In some embodiments, users of a given bitmap are repacked only within the resources assigned to that bitmap. Unused resources may be re-assigned to non-persistent users that are not part of the bitmap. Such re-assignment may be signalled by some other method.

Bulk Resource Allocation

In some embodiments, a user may be allocated a bulk resource by starting with a first resource allocation from which a subset is removed due to its having been assigned to other users by a bitmap, grouped signalling scheme, or some to other scheme. The user can derive which resources are already assigned to other users from knowledge of the first resource allocation and the bitmap, bitmaps, or other assignment scheme signalling the subset to be removed. What is left over after this removal is what has been allocated to that user. For example, a first user may nominally be allocated a set of 20 DRCHs in a slot. Then, other users are assigned individual DRCHs in the same slot. The first user examines these assignments of individual DRCHs to other users, and determines the remaining ones of the 20 DRCHs to be its own resource allocation.

In some embodiments, a non-persistent user with favorable channel conditions can be assigned resources in this manner as these users are more able to correctly receive the bitmaps of other users.

In some embodiments, in order to avoid the necessity of such users to always examine the bitmaps of other users, a field in the assignment signalling can be used to indicate whether or not the user must also read the bitmap(s), or other signalling scheme intended for other users, in order to derive which resources have already been assigned to other users.

For example a single bit field might be used to indicate either 1) the user is allocated all resources specified excluding those allocated to other users or 2) the bitmap does not need to be read as all resources specified are assigned to the user.

In some embodiments, a user can be assigned unused resources, possibly in addition to other resources, from grouped scheme using a unicast signaling message. As an example, a unicast SCCH (shared control channel) assignment message for a user indicates a bulk set of resources. The bulk set of resources may be indicated, for example by a chanID (channel identification) field in a FLAM (forward link assignment message). A bit field of the SCCH may indicate if checking the group resource assignments is required. The location of the signalling scheme may also be signalled. The user may also read the grouped resource allocation bitmap, or bitmaps, to determine what portion of the resource has been assigned to other users, and subtract these resources from its bulk assignment indication.

In some embodiments, it is understood that grouped resource assignments may change for each HARQ transmission. It is also possible that for some or all HARQ transmissions, including the first, the grouped resources assignments do not conflict with the bulk resources assignment.

In some embodiments, unicast signalling is used for the bulk resource assignment methods, and grouped resource allocation signaling may be comprised of a bitmap, or bitmaps.

In some embodiments, for a HARQ transmission of a packet, there are cases which correspond to receiving a signaling message or not receiving it. These cases can apply to the same transmission as a user may receive an assignment signal for none of or one or more of its re-transmissions.

As will be described below in further detail, in some embodiments it may be desirable to configure HARQ transmissions into portions which are a) transmitted using unused grouped signalled resources and b) transmitted over a non-shared resource space. In some other cases, the packet transmission may be contained in only one of shared or non-shared resources.

In some embodiments when a signalling message is received, the bulk resource assignment indication is processed in a manner by removing resources assigned to other users by a grouped signalling method. In some embodiments, the resultant resource assignment may be a different resource size then previous transmissions.

In some embodiments, a different packet format, and/or MCS may be used in comparison to a previous transmission. The change in packet format and/or MCS may be signalling in a signalling message. In some embodiments, the signalling to the user is a unicast SCCH signal with the chanID field and a PF (packet format) field in the FLAM. RAS-HARQ (resource adaptive synchronous-HARQ) support may be enabled.

In other embodiments when a signalling message is received, the resource assignment may be of the same size as a previous transmission. For example, a unicast signalling message may be used to indicate the bulk resource assignment.

In some embodiments, when a signaling message is not received, the user may continue to use the same resource(s) for the retransmission or retransmissions. The user may not have to determine grouped resource assignments for each of its retransmissions, after determining this for the first HARQ transmission. In some embodiments, the resources used by this user for transmissions are indicated as unavailable to users receiving assignments from the grouped resource allocation signaling.

In some embodiments when a signaling message is not received, the user may use the same amount of resources as assigned for a previous HARQ transmission. The user may observe the grouped resource assignments for the transmission opportunity, and determine which resources are available. In some cases, the user may determine the 'first' resources available have been assigned to it. In some embodiments, the user may limit its assignment to be within the previous bulk resource assignment. Furthermore, the assignment size may be the same size as a previous transmission, or different.

In some embodiments, as will be described in detail below, when a signalling message is not received, the user may assume there is no portion of the shared resource space for group resource allocation assigned to it for this transmission.

Transmission Power

In some embodiments, the maximum transmit power to a given user is capped at a level related to the longer term channel conditions, such as average signal to noise ratio or geometry (path loss and shadowing conditions), of the user. In some embodiments, the relationship is an inverse relationship. An OFDM signal may contain allocations to multiple different users with each allocation having a different transmit power.

In a specific example of this, the maximum transmit power to a user during power control operation is limited to a fixed value, such as 3 dB, above the inverse of the geometry of the user.

In some embodiments, additional signalling, for example a second bitmap, is used to indicate the size of a resource and/or MCS's for each user assigned by a first bitmap. The second bitmap might for example contain a bit for each user that is actively being assigned by the first bitmap to indicate small or large resource assignment. As in other embodiments, a single bit per entry is the most efficient, but larger fields may be employed at the expense of increased overhead.

In some embodiments, the second bitmap may always contain entries for persistently assigned users, regardless of whether or not they are assigned. The size of the persistently assigned resource is always signalled in this case. In this case, the other users can derive where their resources are from the second bitmap.

In some embodiments, the second bitmap does not contain entries for persistently assigned users. In this case, there would be an assumed default size for a persistent resource allocation.

In some embodiments, there are separate bitmaps for each HARQ interlace. In some embodiments, some users may be assigned to multiple positions thereby providing the option of increased bandwidth to such users. These multiple positions can be on one or more bitmap, and can be in one or more user groups.

In some embodiments, a user group refers to a set of users having the same start position of the first HARQ transmission of a sub-packet for a given interlace.

Primary and Secondary Assignments

In some embodiments, users can be assigned to a bitmap, and possibly a user group, for a primary assignment, and another position on another or the same bitmap, in another or the same user group, for the purpose of a secondary assignment. These assignments may be on the same or different HARQ interlaces.

Assignments may be persistent for all transmissions, persistent for the first transmission, persistent for at least one transmission or non-persistent for all transmission. Assignments may consist of bitmap or other methods of signalling for one or more transmissions for the purpose of resource re-packing or otherwise.

In some embodiments the first transmission may be persistently assigned for either the primary or secondary assignments, or both.

In some embodiments, the secondary assignment may be shared by more than one user while the primary assignment is unique. In case of persistent assignment with bitmap signalling, multiple positions on the bitmap assigned to different users are associated with the same persistent resource. The bitmap indicates which user is assigned resources. In some embodiments, this applies to persistent allocation of one or more transmissions.

In some embodiments, a primary or secondary assignment refers to a bitmap position associated with an interlace and first sub-packet transmission's start position. An assignment can follow the rules of persistent first slot assignment, and further assignments by the bitmap for other transmissions as described previously. Transmission of an assignment may occur in the same interlace until finished, or assignments are switched.

In some embodiments, the user will be assigned its primary resources by the bitmap for a given transmission. The user may also be assigned a different transmission on its secondary resources. The start slots and interlaces may be different for the primary and secondary interlaces.

In some embodiments, a packet that begins transmission for the primary assignment continues all re-transmissions using the allocations for the primary assignment. The packet that begins transmission for the secondary assignment follows assignments for the secondary assignment. The secondary assignment may or may not be present.

In some embodiments, the resources are persistently assigned for the first transmissions on one or both primary and secondary assignments.

In some embodiments with persistent allocation of the first sub-packet transmission, the user can receive the first transmission and attempt to decode it. If the user cannot, the user will store the information and use it the decoding attempts of further transmissions until 1) the user identifies the packet is not intended for it by assignment signalling (bitmap or otherwise) or another means, 2) the packet finishes the maximum number of transmissions and/or 3) the packet is decoded successfully.

In some embodiments with shared secondary persistent assignments, the secondary assignment may be assigned to another user.

In some embodiments the shared secondary persistent assignment is used when there are more re-transmissions required, or additional packets for transmission due to packet buffer jitter.

An example is depicted in FIG. 19. A primary assignment is shown in the top row, this consisting of a repeating pattern having a persistent assignment followed by five non persistent assignments all for a given user. The persistent assignment is used for the first transmission of a packet, and the remaining assignments are for re-transmission as required. The secondary assignment is shown in the bottom row. There is a persistent assignment followed by non-persistent assignments for retransmission as required. In some embodiments, even though the first assignment on the primary and secondary assignment is persistent, one or both of these first assignments are shared as described for previous embodiments. The need to use the secondary assignment may result from more packets arriving than can be accommodated by the normal persistent assignment, for example due to packet buffer jitter.

FIG. 19 also illustrates the general concept that the start times, interlacing structure, etc. can be defined differently for the secondary assignments than for the primary assignments.

In some embodiments, a packet that begins transmission for the primary assignment will switch to the secondary assignment after some number of re-transmissions. In some embodiments, this switch occurs at the start point of the secondary assignment. A new packet can begin transmissions using the primary assignment.

In some embodiments, resources are persistently assigned to the first transmission of the primary and secondary assignments, where the first transmissions of the secondary assignment may not be the first transmission of the packet.

Figure 20:
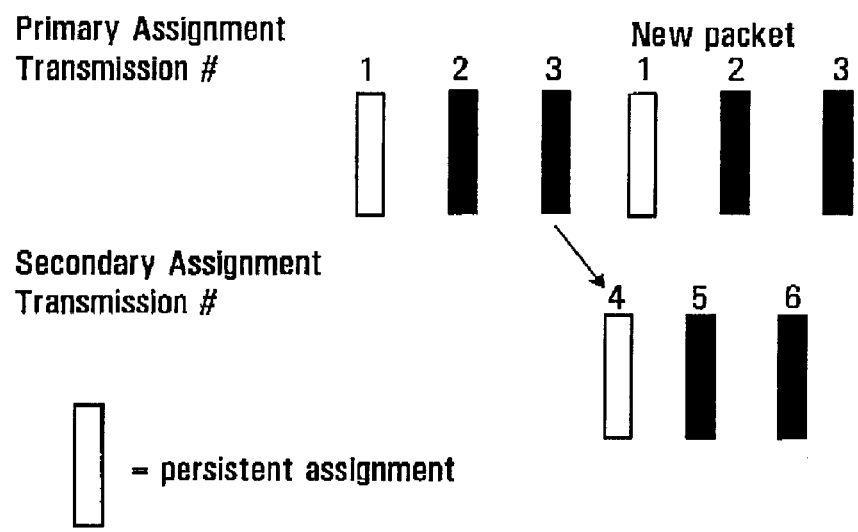

An example is depicted in FIG. 20. A primary assignment is shown in the top row, this consisting of a repeating pattern having a persistent assignment followed by two non-persistent assignments. The persistent assignment is used for the first transmission of a packet, and the remaining assignments are for re-transmission as required. The secondary assignment is shown in the bottom row. There is a repeating pattern consisting of a persistent assignment followed by two non-persistent assignments. The secondary assignment is available for further retransmissions of packets sent for the first time using the primary assignment, but not yet successfully delivered after the available non-persistent assignments for re-transmission have been used. As before, even though the first assignment is persistent, it can still be shared as described for previous embodiments.

Figure 21:
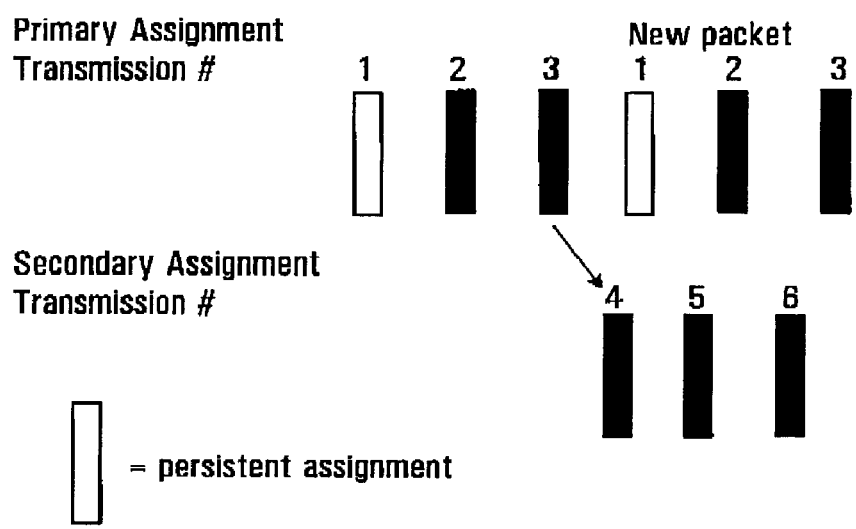

In some embodiments, resources are persistently assigned to the first transmission of the primary but not the secondary assignments. An example is depicted in FIG. 21 which differs from FIG. 20 only in that there is no persistent assignment for the secondary assignment.

In some embodiments pertaining to systems with primary and secondary resource assignments, it is useful to select the number of HARQ transmission to be twice the number of possible packet start points.

In some embodiments, some user groups of a given bitmap refer to users with start positions of the first HARQ transmission of a sub-packet in a given slot, and may be persistently assigned, while other user groups in same bitmap may not be persistently assigned.

In some embodiments, the presence of a secondary first slot persistent assignment may require the wireless station to monitor the secondary channel as described in the previous embodiments. This may lead to two modes of operation:

1) Jitter protection and high QOS—Attempt to receive secondary assignment for each possible packet transmission. Send NAK and keep if undecodable. The user will store the information and use it the decoding attempts of further transmissions until 1) the user identifies the packet is not intended for it by assignment signalling (bitmap or otherwise) or another means, 2) the packet finishes the maximum number of transmissions and/or 3) the packet is decoded successfully. (see the examples of FIG. 20 or 21).

2) Re-transmission protection. (for example FIG. 21)

In some embodiments, the secondary resource is only used when needed due to re-transmissions being exhausted on the primary channel, as in the example of FIG. 20. This reduces the need to check secondary resources.

Supplementing a Bitmap Resource with Non-Persistent Assignment

In some embodiments, a given wireless station may be assigned a bitmap position. This bitmap position may be a secondary assignment in addition to a primary bitmap position. The secondary assignment position in the bitmap may be assigned to only the given wireless station, or may be shared with the secondary bitmap location for other wireless stations. In some embodiments, the primary and secondary position(s) are on the same bitmap and may correspond to the same user group.

In some embodiments, the secondary assignment(s) can be used to supplement the resources assigned to a user for the purpose of a concurrent sub-packet transmission.

In some embodiments, the primary and secondary assignment(s) may provide a benefit to system performance in the presence of feedback errors.

In some embodiments, supplementing a bitmap resource with non-persistent assignment involves supplementing only when needed for concurrent packet transmissions at the interlace offset corresponding to a wireless station or a user group the wireless station belongs to.

The wireless station may be assigned a secondary bit location within the same user group. This secondary bit location can collide with another wireless station's primary bit location. In some embodiments, multiple wireless stations share the same secondary bit location.

When the wireless station sends an ACK (acknowledgement) for a third HARQ transmission, the wireless station may not monitor the secondary bit location.

In a case where an NAK (negative acknowledgement) is detected by the BS instead of an intended ACK (ACK-to-NAK error), the BS transmits a new packet on the secondary bit location. In some embodiments, the wireless station may perform hypothesis testing to determine of there is an ACK-to-NAK error on the primary location. If an ACK-to-NAK error is determined, then the wireless station will monitor the secondary bit location.

In some embodiments, the sub-packet sent on the wireless station's secondary bit location may not be for the wireless station. The wireless station is unable to decode the transmission, and thus keeps sending NAKs. The wireless station assumes the secondary bit location does not contain a new packet until all the HARQ transmission trials of the current packet have completed. This is appropriate since any new packet is started in the primary bit location.

When the wireless station sends a NAK for the third HARQ transmission, the wireless station will monitor the secondary bit location for a new packet transmission.

The BS may send another wireless station's packet on the secondary bit location of a given wireless station. The given wireless station does not know that the secondary bit location is for another wireless station and will fail in decoding the received transmission. The given wireless station keeps sending NAKs until a maximum number of allowed transmissions is reached.

In the case of the NAK-to-ACK error (0.1% probability), the wireless station may still monitor the secondary bitmap assuming there may be new packet transmission. The wireless station will fail decoding and send NAKs until a maximum number of allowed transmissions is reached. On the BS side, the BS will transmit a new packet on the primary bit location. The handling of NAK-to-ACK error detection on a primary bit location is similar to a baseline case where the wireless station is only assigned a primary bit location. The wireless station performs hypothesis testing to decide if a sub-packet transmitted on its designated interlace offset is a sub-packet for a new transmission or retransmission.

In some embodiments, the first transmission of a packet at a given first HARQ transmission opportunity may not be possible due to retransmissions of other sub-packets.

In some embodiments, the sub-packet is delayed and sent at the next first HARQ transmission opportunity. In some cases, one or more sub-packets can be concatenated into a single physical layer packet.

In some embodiments, the resources assigned to a wireless station may be supplemented to allow transmission of a packet comprised of concatenated packet(s).

As an example, for a wireless station, if an interlace offset resource corresponding to the user group the wireless station belongs to is occupied by retransmission of a another packet, a new packet will wait until the next occurrence of the interlace offset corresponding to the user group. In this case, at the next occurrence of the interlace offset, there may be more than one packet pending for transmission at a buffer. The BS can concatenate the multiple packets into one single physical layer packet for transmission to the wireless station. In this case, the amount of physical channel resource assigned to the wireless station may be supplemented.

In some embodiment, the secondary assignment(s) can be used to supplement the resources assigned to a user for the purpose of a larger assignment for transmission of concatenated packets.

In some embodiments, an approach to supplement a resource to the wireless station for a particular interlace offset corresponding to the user group is by assigning a secondary bit location(s) to the wireless station.

It is to be understood that while a primary and a secondary bit location and primary and secondary resources have been discussed, it is possible that there are additional bit locations and/or resources beyond the primary and secondary. Furthermore, a secondary assignment may be used without a primary assignment.

Since there are no concurrent transmissions, the supplement resource indicated by the secondary bit location(s) is only present when AN sends a new packets to the AT, i.e. when the HARQ transmissions of current packet have completed.

Allocation of Unused Resources

Embodiments have been described above in which a grouped resource assignment is used to assign resources to members of a group from a set of resources within a group of shared resources. An example of this is a group of resources that are assigned to users by a bitmap. Some resources within a shared resource may be unused in a given slot. The unused resources may be contiguous or non-contiguous. The boundary of a shared resource segment maybe fixed or stationary. The unused resources of the shared resource can be used to send sub-packets to the wireless station. The sub-packets sent on the shared resource can be combined with the sub-packets sent on the non-shared resource to aid in decoding the packet.

In some embodiments, the assignment of non-shared resources to wireless stations may be performed utilizing unicast signalling messages and proper reception of transmissions or portions of transmissions using unused shared resources may require information from a shared resource allocation scheme, such as a bitmap.

The unused resources may be assigned to:

a wireless station notified by a signalling scheme, such as a unicast signalling message;

a wireless station that is designated to use the unused resources of this shared resource segment or segments;

one or more wireless stations may be designated to use unused portions of one or more shared resource segments In some embodiments, the base station can choose to assign resources in addition to the unused resources. These additional resources can be outside the shared resource segment(s).

In some embodiments, the transmission is divided such that reception of the portion inside the shared resource will facilitate proper reception of the transmission.

In some embodiments, the portion of the transmission sent within the shared resource space is chosen such that if the intended wireless station cannot receive it, reception of the packet can proceed without it, that is the portion of the transmission outside the shared resource area can be decoded.

A turbo encoded packet (possibly after interleaving, and permuting) can be considered to be a vector of encoded symbols. A portion of this vector may be transmitted during each HARQ transmission. Once the minimum code rate of the encoder is reached, further HARQ transmission may consist, in whole or in part, of repetitions of the previously transmitted encoded symbols.

The vector of encoded symbols can be thought of as placed on the circumference of a circle. Each consecutive HARQ transmission is a segment of this circle, proceeding around the circumference. After all segments of the circumference have been transmitted, the segments begin to contain repetitions of the segments of the circumference.

The encoded symbols can be transmitted in one of several modes. For example, in a first mode the encoded symbols are transmitted over both shared and non-shared resources and in a second mode the encoded symbols are transmitted over only a shared resource.

MODE 1: In some embodiments, the encoded symbols transmitted over the non-shared resource for each HARQ transmission have a specific starting point, in the analogy described above a particular starting point along the circumference of the circle. Similarly, the encoded symbols transmitted over the shared resource for each HARQ transmission have a specific starting point along the circumference of the circle of encoded packets.

In some embodiments, the encoded symbols of the first HARQ transmission transmitted over the non-shared resources may start at a particular position, possibly starting with the transmission of systematic bits. The systematic bits are the data bits prior to being encoded with parity bits. Referring again to the analogy of the circle described above, the encoded symbols transmitted over the shared resources for the first HARQ transmission start from the same point on the circle, but are taken from around the circumference in the opposite direction.

The segments of the HARQ transmissions over non-shared resource portions may be contiguous segments of the vector of encoded symbols.

In some embodiments, the transmission start points of segments of the HARQ transmissions over shared resource portions are separated by the maximum size of a transmission of the shared resource for that wireless station. Having a fixed duration between start points in this manner results in the wireless station always being aware of the location of the next starting point for a transmission transmitted over shared resource.

Start points for the portions transmitted over shared resources are associated with HARQ transmission of the packet, and not necessarily the number of HARQ transmissions over the shared resources, as assignments using shared resources may not be used for every transmission.

MODE 2: In some embodiments, it may be advantageous to transmit the whole packet using only shared resources. The wireless terminal can be signalled by unicast signalling methods, or as part of the grouped resource allocation scheme.

This can be beneficial if the available resources are large enough to accommodate proper transmission of the desired packet.

Assignment Message and Resource Usage Bitmap

In some systems, an assignment message may be used to indicate assignment of resources. This assignment message may be used to assign resources in conjunction with a resource usage bitmap.

In some embodiments, the assignment message and resource usage bitmap may be sent in a single bitmap, or separately.

In some embodiments, the resource usage bitmap has entries that correspond with all or a subset of resources in the system. The entries indicate which resources are available. More than one resource usage bitmap can be used.

In some embodiments, signalling of an assignment message may be in the form of an assignment bitmap. The assignment bitmap may contain entries each corresponding to a wireless station or group of wireless stations. A wireless station may also have multiple entries corresponding to it.

In some embodiments, the assignment bitmap indicates the wireless stations for which a packet transmission is to start transmission. As an example, the assignment bitmap indicates only wireless stations for which a packet transmission is to start transmission in a given slot.

In some embodiments, when a wireless station is assigned to a group, a unicast signalling message may be sent to the wireless station from the base station. The signalling message may contain one or more of the following types of information:

persistent resource assignment for one or multiple HARQ transmissions;

bit position or positions within the assignment bitmap;

a set of positions, one for each interlace offset corresponding to the HARQ transmissions which are not assigned a persistent resource;

size, modulation and coding schemes of the assignment bitmap and other associated bitmaps that the user needs to decode in order to identify the resource allocation.

The number of transmission start points or interlace offsets may not be equal to the maximum number of HARQ transmissions allowed for a packet. An interlace offset can consist of a slot or group of slots.

As with some previously described embodiments, user groups can be defined as having their first HARQ transmission in a given slot, or a group of slots, or an interlace offset within a given HARQ interlace. The first HARQ transmission positions can be the same or different than the maximum number of HARQ transmissions of a packet.

In some embodiments, a wireless station can belong to one or more user groups. The user groups may or may not be all in the same HARQ interlace.

In some embodiments, the assignment bitmap for a slot contains entries for wireless stations assigned to the corresponding user group or groups.

In some embodiments, the wireless stations starting a transmission can determine their resource locations from the resource usage bitmap and assignments to other wireless stations. As an example, the 'first' assignment indicated in the assignment bitmap may be assigned to the 'first' set of available resources indicated by the resource usage bitmap, and continue sequentially for all assignments.

In some embodiments, a wireless station is assigned to only one user group so that it is assigned one position, in a single assignment bitmap. In this manner, if the number of HARQ transmissions is greater then the number of first HARQ transmission positions, a new packet transmission can be started on a different resource prior to an earlier packet completing all HARQ transmissions. This new assignment does not require additional bitmap positions. In general, a new packet transmission to a given wireless station can be started each time the assignment bitmap that includes that wireless station is sent, and does not conflict with any ongoing packet transmission to that wireless station.

In some embodiments, if a wireless station is transmitted multiple packets in the same interlace offset, the packets may be distributed across composite time slots of the interlace offset. As an example, if VoIP packets are being transmitted to a given wireless station in a single interlace offset, and the interlace offset consists of two grouped time slots, the packet transmissions may be multiplexed so that different transmissions are sent over resources in the two different time slots of the interlace offset.

In some embodiments, the assignment bitmap for user groups can be sent on different interlaces or interlace offsets. When a packet transmission is started, all further HARQ transmissions, as needed, may be completed on the same interlace. Other assignments can be made on other interlaces in order to reduce or prevent the processing on multiple incoming packets in the same slot.

As an example, a wireless station may be assigned to a user group that is assigned a first HARQ packet transmission in interlace 0, and interlace offset 0 for a given VoIP frame. The packet transmission is started and remains in interlace 0 for all HARQ transmissions. In the next VoIP frame for interlace offset 0, the assignment bitmap for this group is in interlace 1. A new packet is started and stays in interlace 1, and so on.

Shifting to different interlaces in a sequential pattern for different VoIP frames, or cyclically shifting resources, is an example of a manner of changing interlaces for different VoIP frames. Cyclically shifting resources is an example of a manner that can also be used for changing interlace offsets for different VoIP frames.

In some embodiments, a user group can be subdivided into more than one user group, such that more than one user group corresponds to a given slot. For example, a user group can be divided into smaller user groups based on for example, similar user channel conditions, MCSs, or resource allocation size.

In some embodiments, separate assignment messages, for example bitmaps, may be used for each user group associated with a given slot.

In some embodiments, one or more assignment messages, for example bitmaps, are transmitted in a given slot along with one or more resource usage bitmaps.

In some embodiments, in a given slot, one or more assignment bitmaps are used to indicate assigned wireless stations, and a single resource usage bitmap is used to indicate available resources in the system due to all assignments from bitmaps or otherwise. The resource usage bitmap may be sent separately, or encoded with the assignment bitmap intended for the wireless stations with poorest channel conditions, or the assignment bitmap intended to have the largest coverage.

As an example, a system can use three assignment bitmaps, each for different geometry wireless stations, and a single resource usage bitmap. Wireless stations in the bitmap corresponding to the lowest geometry would be sequential assigned resources by observing if they are assigned from the assignment bitmap. The resource for a given wireless station is located in the first available resource indicated by the resource usage bitmap, taking into account the resources assigned to other wireless stations in bitmap positions that are read first.

Assignment for wireless stations of the second bitmap would follow in a similar manner, taking into account the resources already assigned to the first assignment bitmap.

Assignment for wireless stations of the third bitmap would follow in a similar manner, taking into account the resources already assigned to the first and second assignment bitmaps.

In some embodiments, assignment messages are resource assignment messages generally intended for a single user, for example shared control channel messages (SCCH), and a single resource usage bitmap is used to indicate available resources in the system due to all assignments from bitmaps or otherwise.

In some embodiments, the resource usage bitmap may have entries for a subset of resources in the system, or may have entries for all resources in the system including those used for broadcast, assignment, and control channel messages.

Method of Resolving Feedback Errors

In some embodiments, it is advantageous to have a system where the maximum number of allowed HARQ transmissions for a packet is not an integer multiple of the number of interlace offsets. When the maximum number of allowed HARQ transmissions for a packet is not an integer multiple of the number of interlace offsets the wireless station can determine and recover from possible feedback errors, as opposed to when the maximum number of allowed HARQ transmissions for a packet is an integer multiple of the number of interlace offsets.

In some embodiments, if a negative acknowledgement (NAK) sent by the wireless station is mistaken for a positive acknowledgement (ACK), the system will be able to recover.

Figure 30:
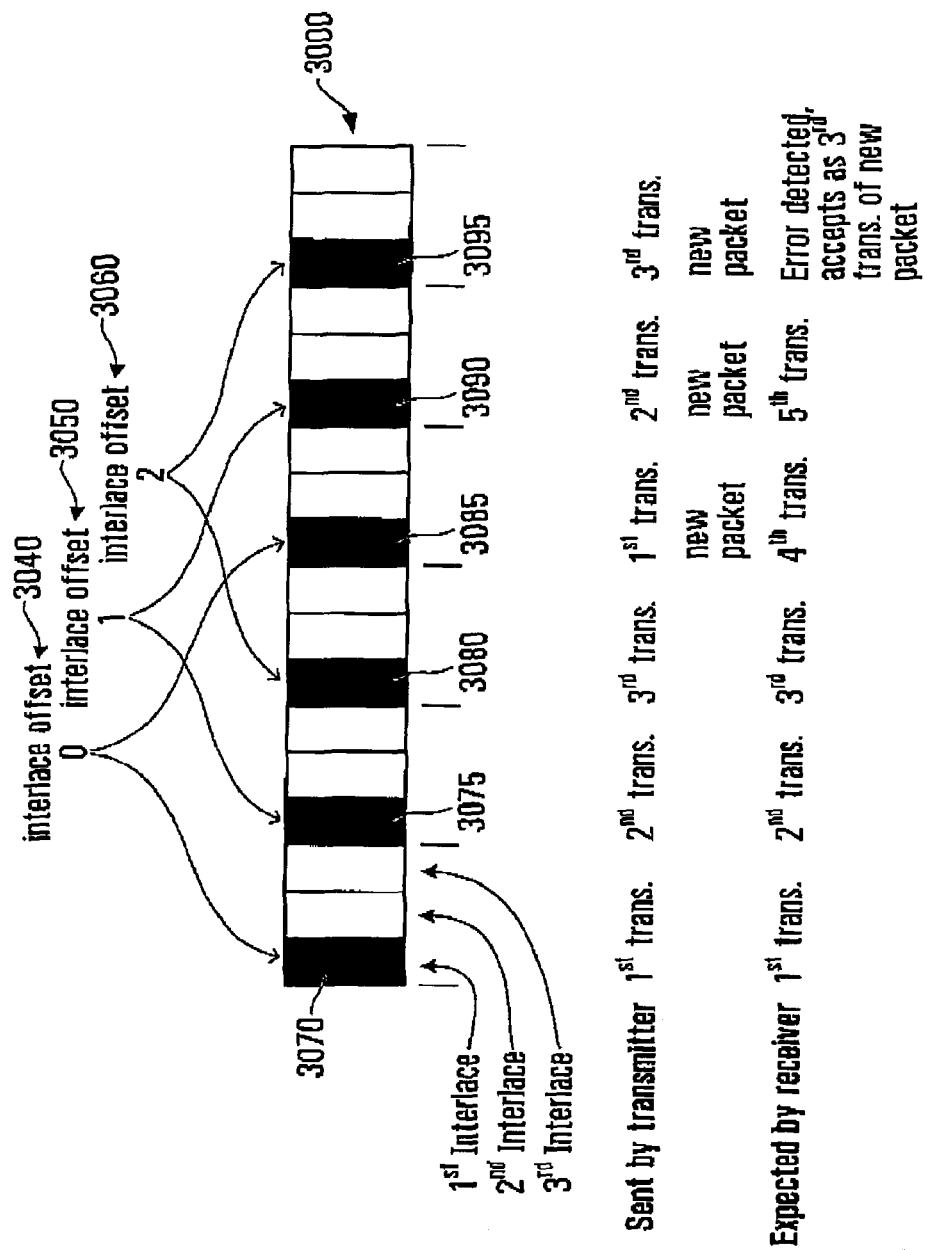
FIG. 30 is a schematic diagram of a portion of a VoIP frame illustrating an example of how a wireless station can recover from a mistakenly detected NAK (negative acknowledgement) when an ACK (acknowledgement) was sent.

An example of recovering from a mistakenly determined ACK when a wireless station sent a NAK will now be described in relation to FIG. 30. In the specific example, a portion of a frame including multiple transmission resource is generally indicated at 3000. The portion includes three interlaces, interlace '0' 3010, interlace '1' 3020, interlace '2' 3030 each with three interlace offsets, interlace offset '0' 3040, interlace offset '1' 3050, interlace offset '2' 3060. Allowing a maximum five HARQ transmissions per packet will ensure recovery if a NAK is mistaken for an ACK by the transmitter after the third transmission.

Transmission for a given wireless station is assigned to start transmission of packets on the interlace offset 0 of interlace 0 indicated at 3070. A first transmission is sent by the base station. The wireless station does not successfully receive and decode the first transmission so it sends a NAK back to the base station. A first re-transmission, a second transmission, is sent by the base station on interlace 0, interlace offset 1 indicated at 3075. The wireless station does not successfully receive and decode the second transmission so it sends a NAK back to the base station. A second re-transmission, a third transmission is sent by the base station on interlace 0, interlace offset 2 indicated at 3080. The wireless station does not successfully receive and decode the third transmission so it sends a NAK back to the base station, but the base station mistakenly determines the NAK is an ACK. In response to the mistakenly determined ACK, the base station sends a first transmission for a new packet on interlace 0, interlace offset 0 indicated at 3085. However, the wireless station expects a fourth transmission in the form of a third re-transmission. The wireless station attempts to combine the first transmission of the new packet with the first through third transmissions of the original packet unsuccessfully, and sends a NAK to the base station. In interlace 0, interlace offset 1, indicated at 3090 the base station sends a second transmission for the new packet, which the wireless station unsuccessfully attempts to combine as a fifth transmission of the original sub-packet and send a NAK to the base station. The base station sends a third transmission for the new packet on interlace 0, interlace offset 2 indicated at 3095. At interlace 0, interlace offset 2 3095, the wireless station determines that an error has occurred as it should not be receiving a sixth packet transmissions as only five transmissions are allowed. The wireless station clears its buffer and attempts to decode the transmission received at interlace 0, interlace offset 2 3095 as the third transmission of a new packet. The wireless station than proceeds with receiving further retransmissions for the new packet if necessary.

In some embodiments, a wireless station will employ multiple packet buffers in order to recover from possible acknowledgment feedback errors, and receive packet based on multiple hypothesis as to the identity of packet is being transmitted.

Referring again to the above example, after a NAK has been sent for the third transmission in interlace 0, interlace offset 2 3095, a wireless station utilizes an additional packet buffer to store a possible new transmission in case an error occurs, as well as combining the transmission with previous ones in a manner consist with the fourth transmission of a sub-packet. In the next interlace, the transmission is combined as the fifth transmission of the sub-packet in the main buffer, and as the second transmission of a new packet in the additional packet buffer. In this manner, after determination that an error occurred in interlace 0, interlace offset 2 3095, the wireless station can discard its main buffer and continue receiving and combining transmissions of new packets in its additional packet buffer.

In another example, allowing a maximum seven HARQ transmissions per packet will ensure recovery if a NAK is mistaken for an ACK by the transmitter after the third transmission.

Figure 4:
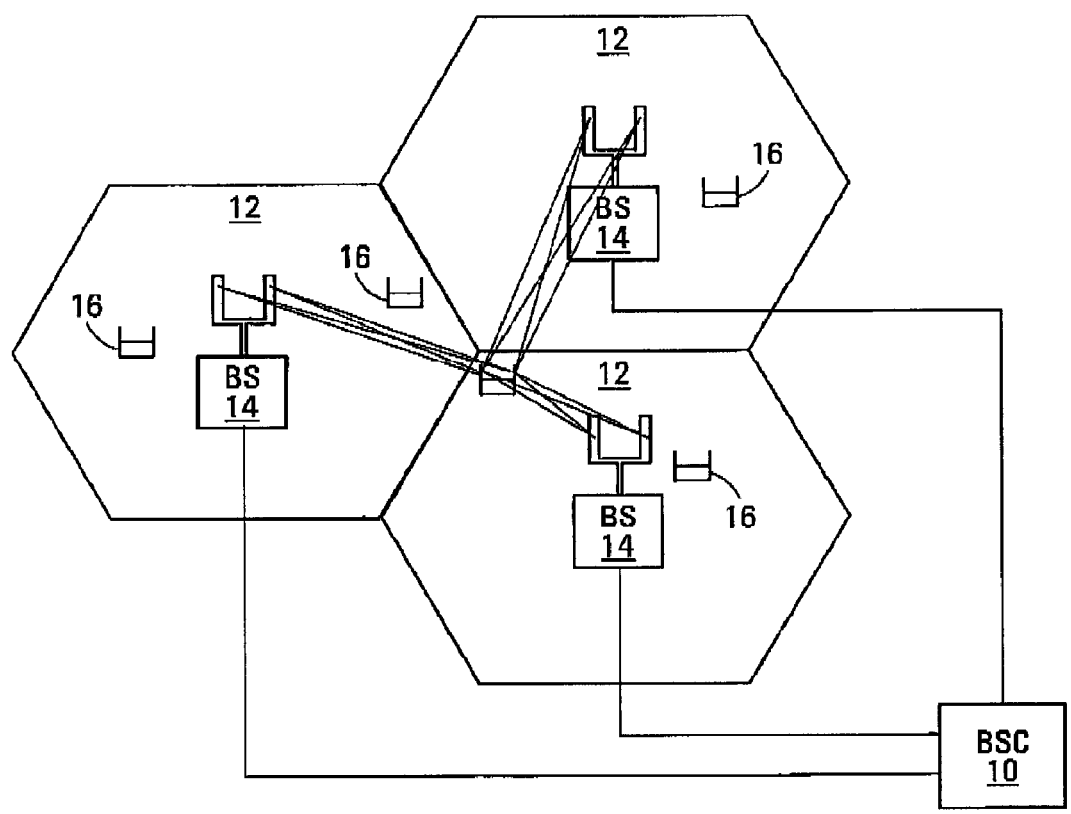
FIG. 4 is a block diagram of a cellular communication system.

In some embodiments, in a similar fashion to the above example, if a positive acknowledgement (ACK) sent by the wireless station is mistaken for a negative acknowledgement (NAK), the system will be able to recover. For the purposes of providing context for embodiments of the invention for use in a communication system, FIG. 4 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 5:
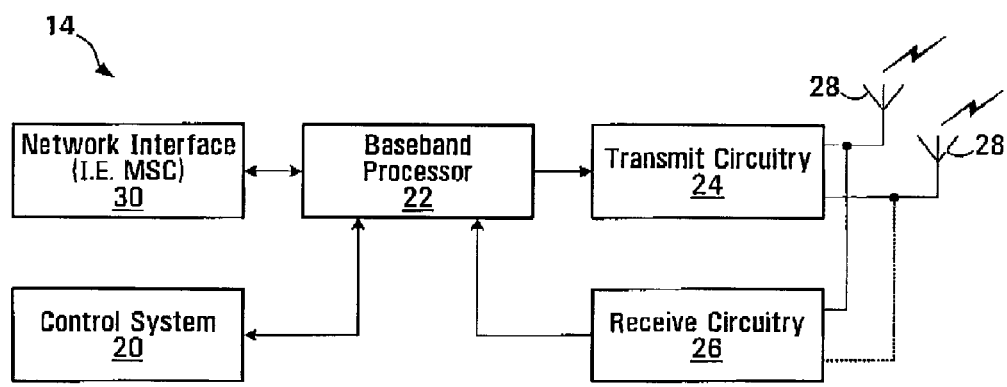
FIG. 5 is a block diagram of an example base station that might be used to implement some embodiments of the present invention.

With reference to FIG. 5, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 6:
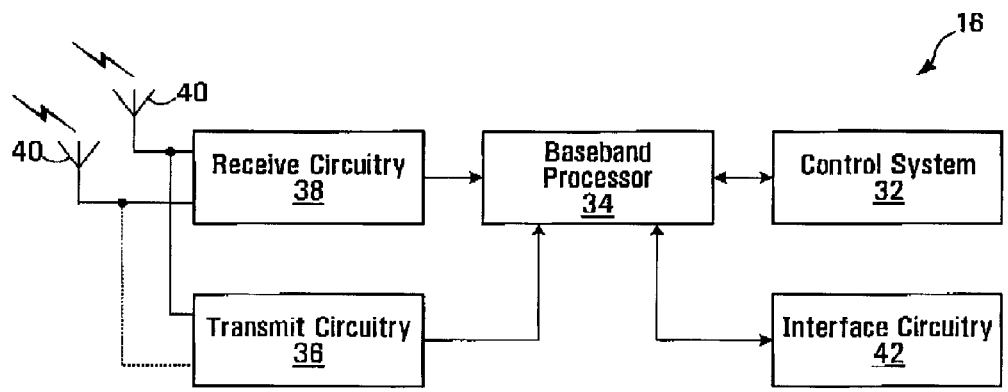
FIG. 6 is a block diagram of an example wireless terminal that might be used to implement some embodiments of the present invention.

With reference to FIG. 6, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OEDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 ($n >= 1$), and each mobile terminal 16 is equipped with "m" receive antennas 40 ($m >= 1$). Notably, the respective antennas can be used for reception and transmission using appropriate duplexers or switches and are so labelled only for clarity.

Figure 7:
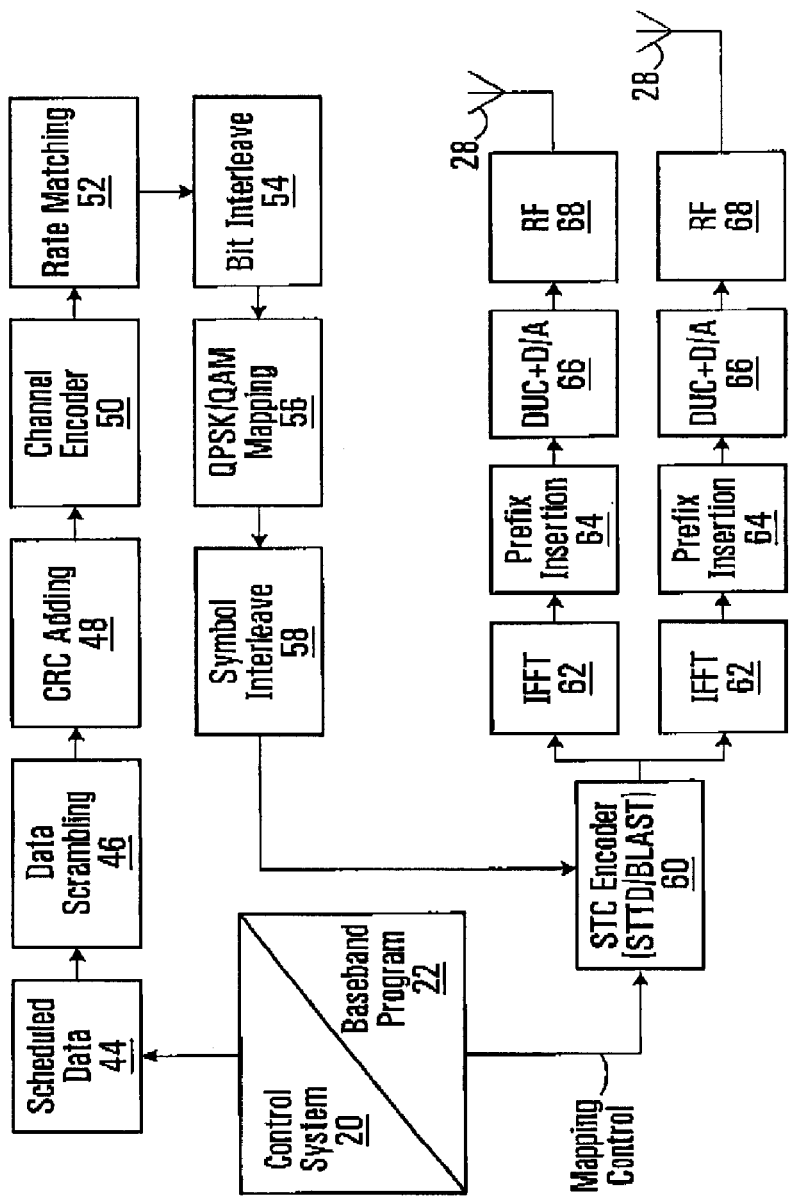
FIG. 7 is a block diagram of a logical breakdown of an example OFDM transmitter architecture that might be used to implement some embodiments of the present invention.

With reference to FIG. 7, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 8:
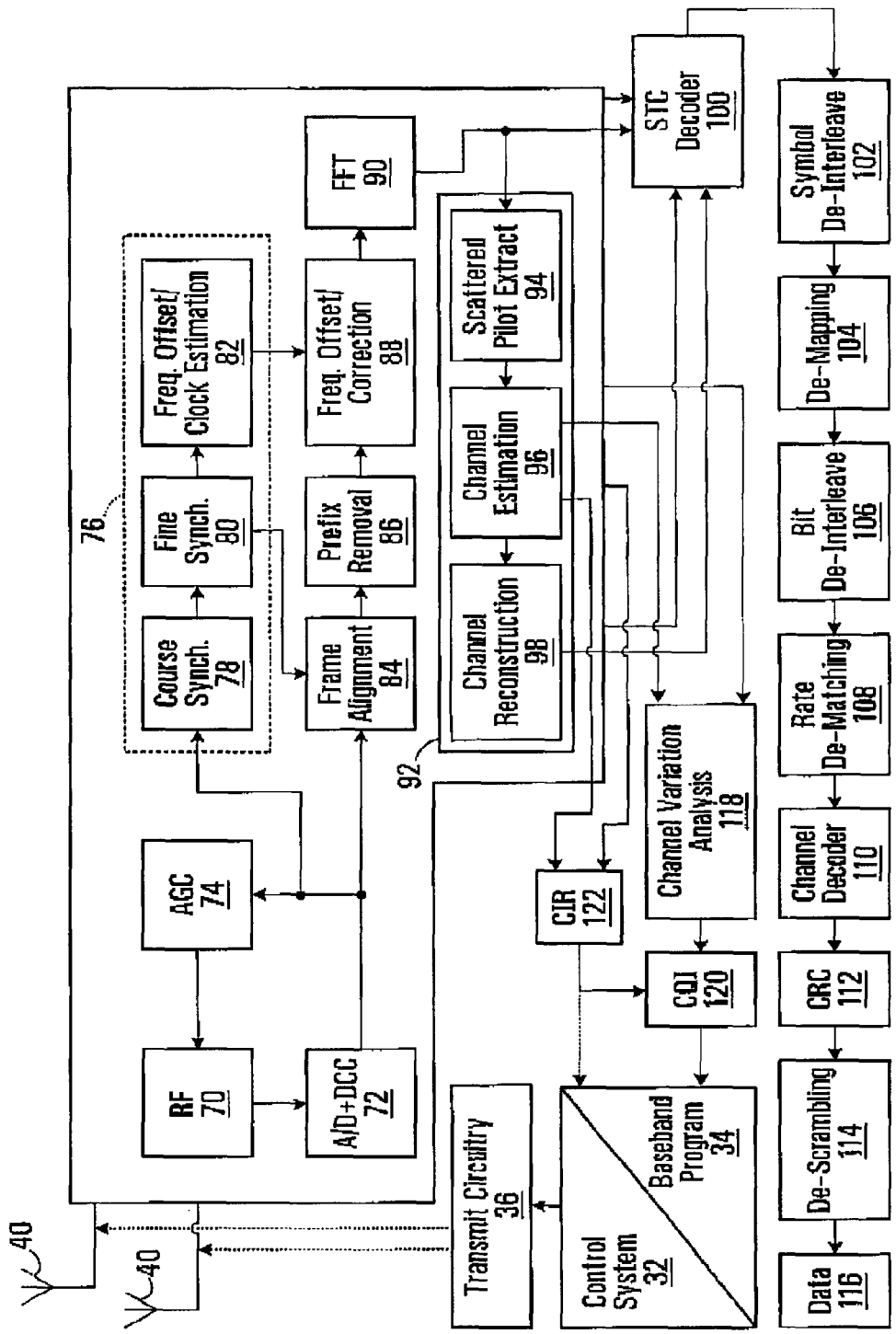
FIG. 8 is a block diagram of a logical breakdown of an example OFDM receiver architecture that might be used to implement some embodiments of the present invention.

Reference is now made to FIG. 8 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 8, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The deinterleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 4 to 8 provide one specific example of a communication system that could be used to implement embodiments of the invention. It is to be understood that embodiments of the invention can be implemented with communications systems having architectures that are different than the specific example, but that operate in a manner consistent with the implementation of the embodiments as described herein.

Figure 28:
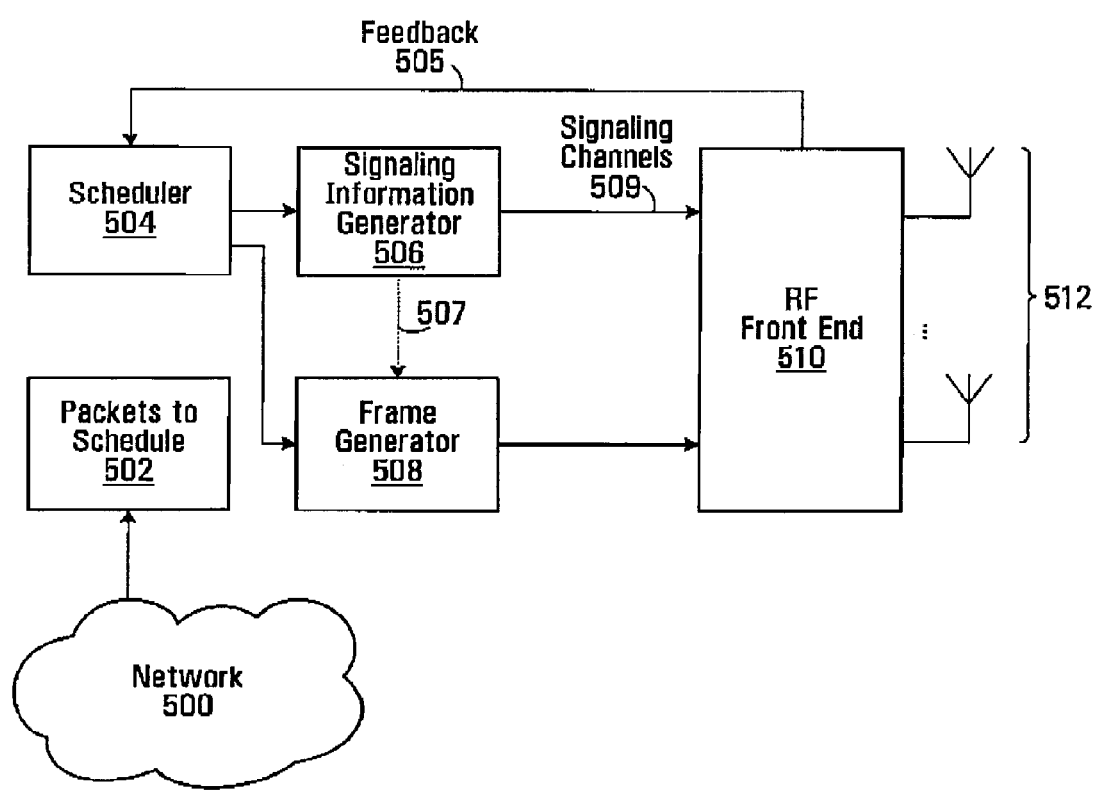
FIG. 28 is a block diagram of an example of a base station that performs scheduling for downlink transmissions.

FIG. 28 is a block diagram of an example of a base station that performs scheduling for downlink transmissions. A scheduler 504 is shown. Packets to schedule 502 are shown, these having been received from a network 500. This may include original sub-packets and/or retransmission sub-packets in respect of packets to transmit. The scheduler 504 has access to the packets, either through a physical connection or access to stored memory. The scheduler 504 also receives feedback 505 from receivers indicating whether or not transmissions have been successful. On the basis of the feedback 505 the scheduler 504 makes resource allocation decisions and signals these to a signalling information generator 506 which generates signalling information. This signalling information can take the form of any of any of the examples described herein. The decisions are also communicated to frame generator 508 which is responsible for taking the resource allocation decisions, and constructing OFDM frames accordingly. In some embodiments, the OFDM frames will include the signalling information itself in which case dotted path 507 is implemented which represents the communication of the signalling information from the signalling information generator 506 to the frame generator 508, but alternatively separate channels for the signalling information will be employed in which case path 509 is implemented which represents the independent communication of the signalling information. RF front end 510 prepares signals for transmission using one or more antennas 512, depending on the implementation. Feedback 505 is shown originating from the RF front end 510, but there may be additional intervening components that perform processing on received signals in order to generate the feedback 505.

A specific arrangement of components has been shown with specific interconnections. It is to be understood that these functions may be implemented in any suitable way, and that physical interconnections may be implemented as logical connections/relationships.

Figure 29:
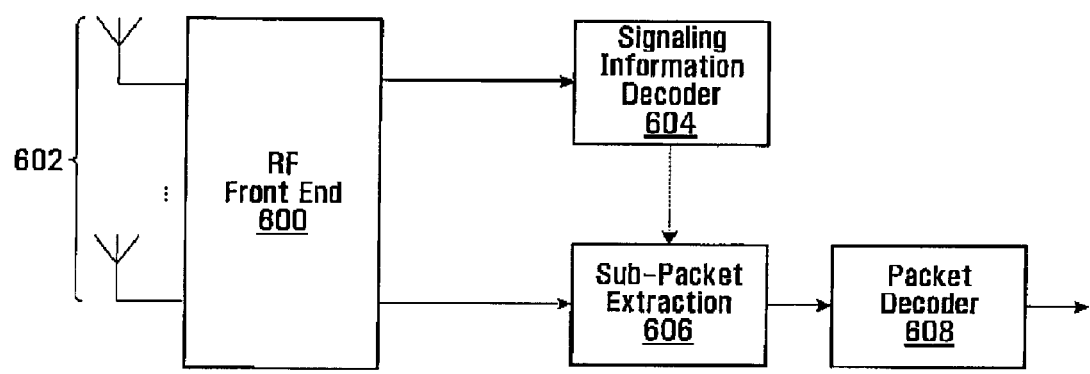
FIG. 29 is a block diagram of an example of a wireless station that receives scheduled downlink transmissions.

FIG. 29 is an example of a receiver, such as a wireless station that receives and decodes sub-packets transmitted using one or more of the above-described methods. Shown is an RF front end 600 with one or more antennas 602, depending on the implementation. A signalling information decoder 604 extracts signalling channels from received signals and determines whether a resource has been scheduled for that receiver, and if so where. This can involve looking at whatever signalling is necessary to deduce where the current sub-packet for that receiver is located. Many detailed examples have been presented above. Having determined where the sub-packet is, the sub-packet extraction module 606 extracts the relevant parts from the received OFDM symbol stream, and passes these on to packet decoder 608. Where multiple sub-packets for a given packet have been received, these are used in combination to perform the decoding operation.

Structures, methods and features of various embodiments of the invention have been described separately, however in many combinations of the individual structures, methods and features may exist.

Numerous modifications and variations of the present invention are possible in light of the above teachings. It is therefore to be understood that within the scope of the appended claims, the invention may be practiced otherwise than as specifically described herein.

We claim:

1. A method comprising:
    transmitting full rate vocoder frames using an amount of OFDM time/frequency resource;
    for at least one non-full rate vocoder frame, transmitting a first sub-packet transmission of each non-full rate vocoder frame using the same amount of OFDM time/frequency resource as used for the full rate vocoder frames;
    matching vocoder frame size for each non-full rate vocoder frame to the amount of OFDMA time/frequency resource by employing an increased coding rate relative to a full rate frame, wherein the matching causes early termination of a HARQ retransmission; and
    using resources freed up by the early termination for allocation to other wireless stations.

2. The method of claim 1, wherein the different coding rate used for full rate, and non-full rate are predetermined and known to a wireless station.

3. The method of claim 1, applied for downlink transmission from a base station to a plurality of wireless stations, the method further comprising:
    at least one wireless station using blind rate detection to detect an actual frame rate transmitted by the base station.

4. The method of claim 1, wherein the at least one non-full rate comprises rates ½ and ¼.

5. A system, comprising:
    radio circuitry; and
    a controller coupled to the radio circuitry, wherein the controller is configured to:
        transmit full rate vocoder frames using an amount of OFDM time/frequency resource;
        for at least one non-full rate vocoder frame, transmit a first sub-packet transmission of each non-full rate vocoder frame using the same amount of OFDM time/frequency resource as used for the full rate vocoder frames;
        match vocoder frame size for each non-full rate vocoder frame to the amount of OFDMA time/frequency resource by employing an increased coding relative to a full rate frame, wherein matching the vocoder frame size causes early termination of a HARQ retransmission; and
        use resources freed up by the early termination for allocation to other wireless stations.

6. The system of claim 5, wherein the different coding rate used for full rate, and non-full rate are predetermined and known to a wireless station.

7. The system of claim 5, wherein at least one wireless station uses blind rate detection to detect an actual frame rate transmitted by the controller.

8. The system of claim 5, wherein the at least one non-full rate comprises rates ½ and ¼.

9. A non-transitory, computer accessible memory medium storing program instructions executable by one or more processors to:
    transmit full rate vocoder frames using an amount of OFDM time/frequency resource;
    for at least one non-full rate vocoder frame, transmit a first sub-packet transmission of each non-full rate vocoder frame using the same amount of OFDM time/frequency resource as used for the full rate vocoder frames;
    match vocoder frame size for each non-full rate vocoder frame to the amount of OFDMA time/frequency resource by employing an increased coding rate relative to a full rate frame, wherein matching the vocoder frame size causes early termination of a HARQ retransmission; and
    use resources freed up by the early termination for allocation to other wireless stations.

10. The non-transitory, computer accessible memory medium of claim 9, wherein the different coding rate used for full rate, and non-full rate are predetermined and known to a wireless station.

11. The non-transitory, computer accessible memory medium of claim 9, wherein the at least one non-full rate comprises rates ½ and ¼.

12. A method comprising:
a wireless station receiving full rate vocoder frames using an amount of OFDM time/frequency resource;
the wireless station receiving at least one non-full rate vocoder frame, wherein a first sub-packet of each non-full rate vocoder frame uses the same amount of OFDM time/frequency resource as used for the full rate vocoder frames, wherein the vocoder frame size for each non-full rate vocoder frame is matched to the amount of OFDMA time/frequency resource by employing an increased coding rate relative to a full rate frame, wherein matching the vocoder frame size causes early termination of a HARQ retransmission; and
use resources freed up by the early termination for allocation to other wireless stations.

13. The method of claim 12, further comprising:
storing the different coding rate used for full rate, and non-full rate prior to performing said receiving the at least one non-full rate vocoder frame.

14. The method of claim 12, wherein the at least one non-full rate comprises rates ½ and ¼.

15. A wireless station, comprising:
one or more antennas for performing wireless reception; and
processing hardware coupled to the one or more antennas;
wherein the wireless station is configured to:
receive full rate vocoder frames using an amount of OFDM time/frequency resource;
receive at least one non-full rate vocoder frame, wherein a first sub-packet of each non-full rate vocoder frame uses the same amount of OFDM time/frequency resource as used for the full rate vocoder frames, wherein the vocoder frame size for each non-full rate vocoder frame is matched to the amount of OFDMA time/frequency resource by employing an increased coding rate relative to a full rate frame wherein matching the vocoder frame size causes early termination of a HARQ retransmission; and
use resources freed up by the early termination for allocation to other wireless stations.

16. The wireless station of claim 15, wherein the wireless station comprises a memory and wherein the wireless station is further configured to:
store the different coding rate used for full rate, and non-full rate prior to performing said receiving the at least one non-full rate vocoder frame.

17. The wireless station of claim 15, wherein the at least one non-full rate comprises rates ½ and ¼.

* * * * *